United States Patent
Maso et al.

(10) Patent No.: US 11,956,834 B2
(45) Date of Patent: Apr. 9, 2024

(54) METHODS FOR UL RACH COVERAGE EXTENSION

(71) Applicant: Nokia Technologies Oy, Espoo (FI)

(72) Inventors: Marco Maso, Issy les Moulineaux (FR); Simon Svendsen, Aalborg (DK); Axel Mueller, Paris (FR); Matthew Baker, Cambridge (GB); Karri Ranta-Aho, Espoo (FI); Jun Tan, Glenview, IL (US)

(73) Assignee: Nokia Technologies Oy, Espoo (FI)

( * ) Notice: Subject to any disclaimer, the term of this patent is extended or adjusted under 35 U.S.C. 154(b) by 254 days.

(21) Appl. No.: 17/374,715

(22) Filed: Jul. 13, 2021

(65) Prior Publication Data
US 2022/0046724 A1    Feb. 10, 2022

Related U.S. Application Data

(60) Provisional application No. 63/062,887, filed on Aug. 7, 2020.

(51) Int. Cl.
*H04W 74/0833* (2024.01)
*H04W 16/28* (2009.01)
*H04W 74/08* (2009.01)

(52) U.S. Cl.
CPC ....... *H04W 74/0841* (2013.01); *H04W 16/28* (2013.01); *H04W 74/0891* (2013.01)

(58) Field of Classification Search
CPC ............. H04W 74/0841; H04W 16/28; H04W 74/0891; H04W 74/0833
See application file for complete search history.

(56) References Cited

U.S. PATENT DOCUMENTS

| | | | |
|---|---|---|---|
| 2014/0362806 A1* | 12/2014 | Liu ................ | H04W 72/23 370/329 |
| 2015/0023281 A1* | 1/2015 | Wu ................ | H04W 72/21 370/329 |
| 2018/0049238 A1 | 2/2018 | Frenne et al. | |
| 2019/0159264 A1 | 5/2019 | Zhang et al. | |
| 2019/0313345 A1* | 10/2019 | Jiang ............. | H04W 74/0833 |

(Continued)

FOREIGN PATENT DOCUMENTS

| | | |
|---|---|---|
| EP | 3530056 A1 | 8/2019 |
| WO | 2017/135803 A1 | 8/2017 |

(Continued)

OTHER PUBLICATIONS

Extended European Search Report received for corresponding European Patent Application No. 21183338.9, dated Dec. 20, 2021, 11 pages.

(Continued)

*Primary Examiner* — Ivan O Latorre
(74) *Attorney, Agent, or Firm* — Barta Jones, PLLC

(57) ABSTRACT

Methods and apparatus, including computer program products, are provided for increasing uplink beamforming gain. In one aspect there is provided a method of identifying user equipment which makes use of the proposed new beam-sweeping random access channel procedure that enables the base station to identify the best uplink transmit beam rather than the first beam that the base station managed to detect. Related apparatus, systems, methods, and articles are also described.

20 Claims, 31 Drawing Sheets

(56) References Cited

U.S. PATENT DOCUMENTS

| | | | |
|---|---|---|---|
| 2020/0037365 A1* | 1/2020 | Takahashi | H04L 5/0023 |
| 2020/0068616 A1* | 2/2020 | Qian | H04W 74/002 |
| 2021/0112602 A1* | 4/2021 | Li | H04W 74/008 |
| 2021/0337602 A1* | 10/2021 | Liu | H04W 74/008 |
| 2022/0030607 A1* | 1/2022 | Liu | H04L 27/2602 |
| 2022/0408478 A1* | 12/2022 | Christoffersson | H04W 74/0833 |

FOREIGN PATENT DOCUMENTS

| | | | |
|---|---|---|---|
| WO | WO-2018058574 A1 * | 4/2018 | |
| WO | 2018/110857 A1 | 6/2018 | |
| WO | WO-2018137512 A1 * | 8/2018 | |
| WO | 2018/202536 A1 | 11/2018 | |
| WO | 2018/228580 A1 | 12/2018 | |
| WO | 2019/018542 A1 | 1/2019 | |

OTHER PUBLICATIONS

"RACH Procedures and Resource Configuration", 3GPP TSG RAN WG1 Meeting #88, R1-1701724, Agenda: 8.1.1.4.2, Huawei, Feb. 13-17, 2017, pp. 1-7.

"4-Step Random Access Procedure", 3GPP TSG RAN WG1 NR Ad-hoc#2, R1-1709897, Agenda: 5.1.1.4.4, ZTE, Jun. 27-30, 2017, 14 pages.

"3rd Generation Partnership Project; Technical Specification Group Radio Access Network; NR; Physical layer procedures for data (Release 16)", 3GPP TS 38.214, V16.1.0, Mar. 2020, pp. 1-151.

"3rd Generation Partnership Project; Technical Specification Group Radio Access Network; NR; Physical layer procedures for control (Release 16)", 3GPP TS 38.213, V16.1.0, Mar. 2020, pp. 1-156.

"3rd Generation Partnership Project; Technical Specification Group Radio Access Network; NR; Medium Access Control (MAC) protocol specification (Release 16)", 3GPP TS 38.321, V16.0.0, Mar. 2020, pp. 1-141.

"3rd Generation Partnership Project; Technical Specification Group Radio Access Network; Study on New Radio Access Technology Physical Layer Aspects (Release 14)", 3GPP TR 38.802, V14.2.0, Sep. 2017, pp. 1-144.

"3rd Generation Partnership Project; Technical Specification Group Radio Access Network; NR; Radio Resource Control (RRC) protocol specification (Release 16)", 3GPP TS 38.331, V16.0.0, Mar. 2020, pp. 1-835.

"3rd Generation Partnership Project; Technical Specification Group Radio Access Network; NR; Physical channels and modulation (Release 16)", 3GPP TS 38.211, V16.1.0, Mar. 2020, pp. 1-130.

"Details on Nr Prach procedures", 3GPP TSG RAN WG1 #89, R1-1707343, Agenda: 7.1.1.4.2, Intel Corporation, May 15-19, 2017, pp. 1-8.

"The RAR for multi-preamble operation", 3GPP TSG-RAN WG2 Meeting #99, R2-1709081, Agenda: 10.3.1.4.2, ITRI, Aug. 21-25, 2017, pp. 1-5.

"NR 4-Step Random Access Procedure", 3GPP TSG RAN WG1 Meeting #88bis, R1-1704605, Agenda: 8.1.1.4.2, Guangdong OPPO Mobile Telecom, Apr. 3-7, 2017, 4 pages.

"Multiple Preamble Transmissions in NR Random Access", 3GPP TSG-RAN WG2 NR AH#3, R2-1800337, Agenda: 10.3.1.4.2, Ericsson, Jan. 22-26, 2018, pp. 1-3.

"3GPP_TSG_RAN_WG1@LIST.ETSI.ORG", 3GPP_TSG_RAN_WG1 Archives, Retrieved on Jul. 12, 2021, Webpage available at : https://list.etsi.org/scripts/wa.exe?A2=3GPP_TSG_RAN_WG1;747dbc5b.1710E.

* cited by examiner

FIG. 3

Mapping between PRACH configuration period and SS/PBCH block to PRACH occasion association period

| PRACH configuration period (msec) | Association period (number of PRACH configuration periods) |
|---|---|
| 10 | {1,2,4,8,16} |
| 20 | {1,2,4,8} |
| 40 | {1,2,4} |
| 80 | {1,2} |
| 160 | {1} |

FIG. 7

| | RO#1 | | | RO#2 | |
|---|---|---|---|---|---|
| SSB#1 | preID 61 | grp C/D | SSB#3 | preID 61 | grp C/D |
| | preamble15 | grp A/B | | preamble15 | grp A/B |
| | ... | | | ... | |
| | preamble8 | | | preamble8 | |
| SSB#0 | preamble7 | grp A/B | SSB#2 | preamble7 | grp A/B |
| | ... | | | ... | |
| | preamble0 | | | preamble0 | |
| | preID 60 | grp C/D | | preID 60 | grp C/D |

*RACH-ConfigCommon* information element

```
-- ASN1START
-- TAG-RACH-CONFIGCOMMON-START

RACH-ConfigCommon ::=        SEQUENCE {
    rach-ConfigGeneric           RACH-ConfigGeneric,
    totalNumberOfRA-Preambles    INTEGER (1..63)
OPTIONAL,  -- Need S                                                      ┌─ 1102
    numberOfRA-Preambles-Sweeping  INTEGER (1..<Z>)    OPTIONAL,  -- Need S
    ssb-perRACH-OccasionAndCB-PreamblesPerSSB   CHOICE {
        oneEighth                    ENUMERATED
{n4,n8,n12,n16,n20,n24,n28,n32,n36,n40,n44,n48,n52,n56,n60,n64},
        oneFourth                    ENUMERATED
{n4,n8,n12,n16,n20,n24,n28,n32,n36,n40,n44,n48,n52,n56,n60,n64},
        oneHalf                      ENUMERATED
{n4,n8,n12,n16,n20,n24,n28,n32,n36,n40,n44,n48,n52,n56,n60,n64},
        one                          ENUMERATED
{n4,n8,n12,n16,n20,n24,n28,n32,n36,n40,n44,n48,n52,n56,n60,n64},
        two                          ENUMERATED {n4,n8,n12,n16,n20,n24,n28,n32},
        four                         INTEGER (1..16),
        eight                        INTEGER (1..8),
        sixteen                      INTEGER (1..4)
    }
OPTIONAL,  -- Need M
```

FIG. 11A

```
    groupBconfigured            SEQUENCE {
        ra-Msg3SizeGroupA       ENUMERATED {b56, b144, b208, b256, b282, b480, b640,
                                    b800, b1000, b72, spare6, spare5,spare4, spare3,
spare2, spare1},
        messagePowerOffsetGroupB    ENUMERATED { minusinfinity, dB0, dB5, dB8, dB10, dB12, dB15,
dB18},
        numberOfRA-PreamblesGroupA  INTEGER (1..64)
    }
OPTIONAL,  -- Need R                                                           ┌─ 1104
┌─────────────────────────────────────────────────────────────────────────────┐
│    groupDconfigured            SEQUENCE {                                    │
│        ra-Msg3SizeGroupC       ENUMERATED {b56, b144, b208, b256, b282, b480, b640,│
│                                    b800, b1000, b72, spare6, spare5,spare4, │
│spare3, spare2, spare1},                                                      │
│        messagePowerOffsetGroupD    ENUMERATED { minusinfinity, dB0, dB5, dB8, dB10,│
│dB12, dB15, dB18},                                                            │
│        numberOfRA-PreamblesGroupC  INTEGER (1..<Z>)                          │
│    }                                                                         │
│OPTIONAL,  -- Need R                                                          │
└─────────────────────────────────────────────────────────────────────────────┘
    ra-ContentionResolutionTimer    ENUMERATED { sf8, sf16, sf24, sf32, sf40, sf48, sf56,
sf64},
    rsrp-ThresholdSSB               RSRP-Range
OPTIONAL,  -- Need R
    rsrp-ThresholdSSB-SUL           RSRP-Range
OPTIONAL,  -- Cond SUL
    prach-RootSequenceIndex         CHOICE {
        l839                            INTEGER (0..837),
        l139                            INTEGER (0..137)
    },
    msg1-SubcarrierSpacing          SubcarrierSpacing
OPTIONAL,  -- Cond L139
    restrictedSetConfig             ENUMERATED {unrestrictedSet, restrictedSetTypeA,
restrictedSetTypeB},
    msg3-transformPrecoder          ENUMERATED {enabled}
OPTIONAL,  -- Need R
    ...
}

-- TAG-RACH-CONFIGCOMMON-STOP
-- ASN1STOP
```

FIG. 11B

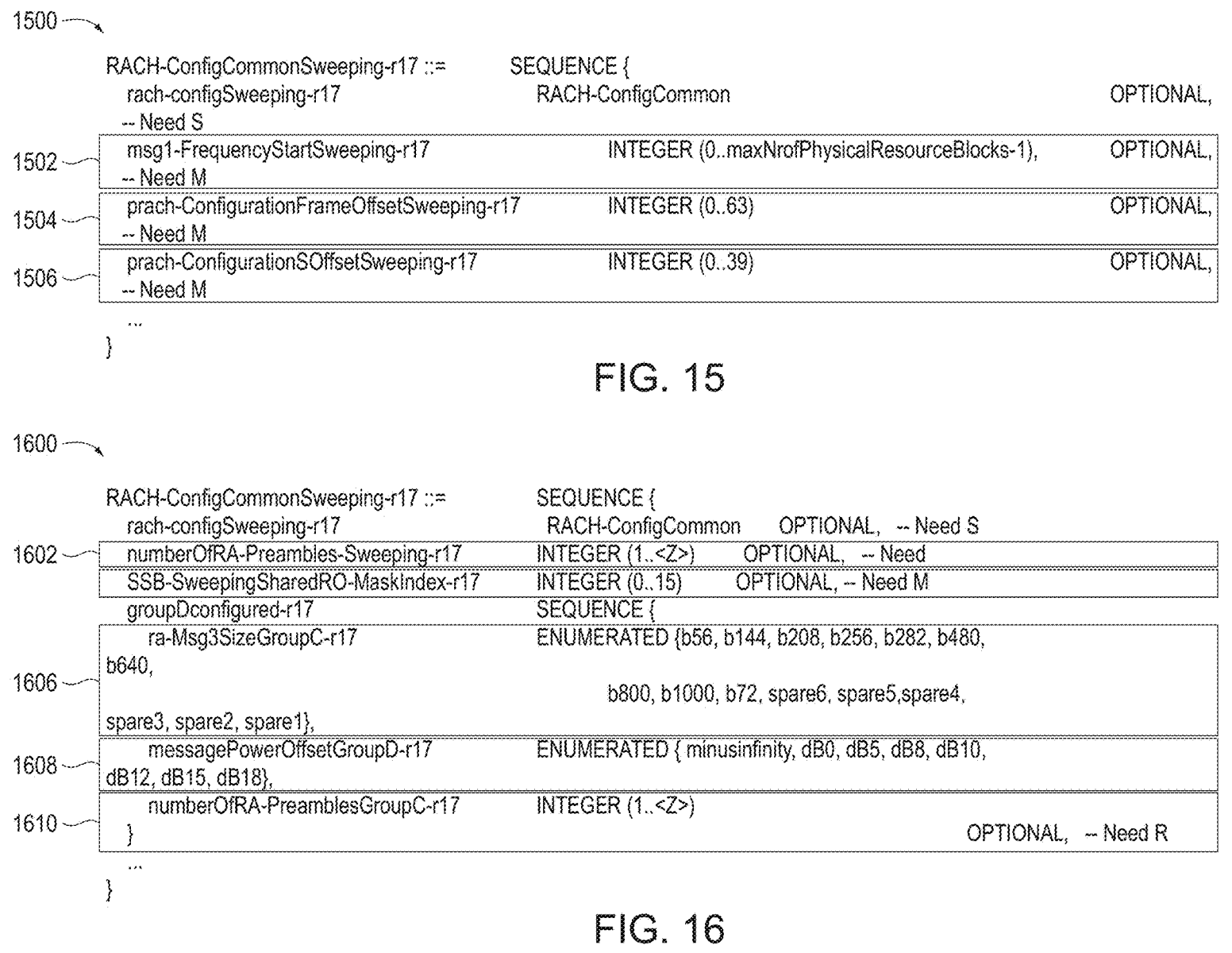

```
1500 ──▶  RACH-CommonSweeping-r17 ::=    SEQUENCE {
           rach-configSweeping-r17           RACH-ConfigCommon              OPTIONAL,
           -- Need S
1502 ──▶   msg1-FrequencyStartSweeping-r17   INTEGER (0..maxNrofPhysicalResourceBlocks-1), OPTIONAL,
           -- Need M
1504 ──▶   prach-ConfigurationFrameOffsetSweeping-r17   INTEGER (0..63)    OPTIONAL,
           -- Need M
1506 ──▶   prach-ConfigurationSOffsetSweeping-r17       INTEGER (0..39)    OPTIONAL,
           -- Need M
           ...
         }
```

FIG. 15

```
1600 ──▶  RACH-ConfigCommonSweeping-r17 ::=   SEQUENCE {
           rach-configSweeping-r17           RACH-ConfigCommon   OPTIONAL,  -- Need S
1602 ──▶   numberOfRA-Preambles-Sweeping-r17  INTEGER (1..<Z>)   OPTIONAL, -- Need
           SSB-SweepingSharedRO-MaskIndex-r17 INTEGER (0..15)    OPTIONAL, -- Need M
           groupDconfigured-r17              SEQUENCE {
1606 ──▶   ra-Msg3SizeGroupC-r17             ENUMERATED {b56, b144, b208, b256, b282, b480,
           b640,
                                              b800, b1000, b72, spare6, spare5,spare4,
           spare3, spare2, spare1},
1608 ──▶   messagePowerOffsetGroupD-r17      ENUMERATED {minusinfinity, dB0, dB5, dB8, dB10,
           dB12, dB15, dB18},
1610 ──▶   numberOfRA-PreamblesGroupC-r17    INTEGER (1..<Z>)                  OPTIONAL, -- Need R
           }
           ...
         }
```

| msg1-FDM = 2 | | | | | | | | |
|---|---|---|---|---|---|---|---|---|
| FDM#1 | SSB#0 | RO#1 (sweeping) | preamble31 ... preamble0 | grp A/B | SSB#1 | RO#3 (sweeping) | preamble31 ... preamble0 | grp A/B |
| FDM#0 | SSB#0 | RO#0 (non-sweeping) | preamble31 ... preamble0 | grp A/B | SSB#1 | RO#2 (non-sweeping) | preamble31 ... preamble0 | grp A/B |

| SSB#1 | RO#5 (sweeping) | preamble31 ... preamble0 | SSB#1 | RO#7 (sweeping) | preamble31 ... preamble0 | grp A/B | SSB#2 | RO#9 (sweeping) | preamble31 ... preamble0 | grp A/B | SSB#2 | RO#11 (sweeping) | preamble31 ... preamble0 | grp A/B |
|---|---|---|---|---|---|---|---|---|---|---|---|---|---|---|
| SSB#1 | RO#4 (non-sweeping) | preamble31 ... preamble0 | SSB#1 | RO#6 (non-sweeping) | preamble31 ... preamble0 | grp A/B | SSB#2 | RO#8 (non-sweeping) | preamble31 ... preamble0 | grp A/B | SSB#2 | RO#10 (non-sweeping) | preamble31 ... preamble0 | grp A/B |

FIG. 19

```
-- ASN1START
-- TAG-RACH-CONFIGCOMMON-START

RACH-ConfigCommon ::=              SEQUENCE {
    rach-ConfigGeneric                 RACH-ConfigGeneric,
    totalNumberOfRA-Preambles          INTEGER (1..63)                                          OPTIONAL,  -- Need S
    ssb-perRACH-OccasionAndCB-PreamblesPerSSB  CHOICE {
        oneEighth                          ENUMERATED {n4,n8,n12,n16,n20,n24,n28,n32,n36,n40,n44,n48,n52,n56,n60,n64},
        oneFourth                          ENUMERATED {n4,n8,n12,n16,n20,n24,n28,n32,n36,n40,n44,n48,n52,n56,n60,n64},
        oneHalf                            ENUMERATED {n4,n8,n12,n16,n20,n24,n28,n32,n36,n40,n44,n48,n52,n56,n60,n64},
        one                                ENUMERATED {n4,n8,n12,n16,n20,n24,n28,n32,n36,n40,n44,n48,n52,n56,n60,n64},
        two                                ENUMERATED {n4,n8,n12,n16,n20,n24,n28,n32},
        four                               INTEGER (1..16),
        eight                              INTEGER (1..8),
        sixteen                            INTEGER (1..4),
    }
    OPTIONAL,  -- Need M
┌─────────────────────────────────────────────────────────────────────────────┐
│   ra-ssb-OccasionMaskIndex-r17        INTEGER (0..15)           OPTIONAL, --│
│   Need M                                                                     │
└─────────────────────────────────────────────────────────────────────────────┘
          2002
    ...
}

-- TAG-RACH-CONFIGCOMMON-STOP
-- ASN1STOP
```

FIG. 20

```
-- ASN1START
-- TAG-SIB1-START

SIB1 ::=      SEQUENCE {
...
   servingCellConfigCommon          ServingCellConfigCommonSIB
OPTIONAL,  -- Need R
...
}

-- TAG-SIB1-STOP
-- ASN1STOP

-- ASN1START
-- TAG-SERVINGCELLCONFIGCOMMONSIB-START

ServingCellConfigCommonSIB ::=          SEQUENCE {
...
   uplinkConfigCommon                UplinkConfigCommonSIB
OPTIONAL, -- Need R
...
}

-- TAG-SERVINGCELLCONFIGCOMMONSIB-STOP
-- ASN1STOP

- ASN1START
-- TAG-UPLINKCONFIGCOMMONSIB-START

UplinkConfigCommonSIB ::=           SEQUENCE {
   frequencyInfoUL                  FrequencyInfoUL-SIB,
   initialUplinkBWP                 BWP-UplinkCommon,           ⎯ 2601
   initialUplinkBWPSweeping-r18     BWP-UplinkCommon,           ⎯ 2602
   timeAlignmentTimerCommon         TimeAlignmentTimer,         ⎯ 2603
   timeAlignmentTimerCommonSweeping-r18  TimeAlignmentTimer     ⎯ 2604
}

-- TAG-UPLINKCONFIGCOMMONSIB-STOP
-- ASN1STOP
```

FIG. 26

```
-- ASN1START
-- TAG-SIB1-START

SIB1 ::=     SEQUENCE {
    ...
    servingCellConfigCommon          ServingCellConfigCommonSIB
OPTIONAL,  -- Need R
    ...
}

-- TAG-SIB1-STOP
-- ASN1STOP

-- ASN1START
-- TAG-SERVINGCELLCONFIGCOMMONSIB-START

ServingCellConfigCommonSIB ::=     SEQUENCE {
    ...
    uplinkConfigCommon               UplinkConfigCommonSIB
OPTIONAL, -- Need R
    ...
}

-- TAG-SERVINGCELLCONFIGCOMMONSIB-STOP
-- ASN1STOP
```

FIG. 29A

```
-- ASN1START
-- TAG-UPLINKCONFIGCOMMONSIB-START

UplinkConfigCommonSIB ::=          SEQUENCE {
    frequencyInfoUL                    FrequencyInfoUL-SIB,        -- 2609
    frequencyInfoULSweeping-r18        FrequencyInfoUL-SIB,        -- 2610
    initialUplinkBWP                   BWP-UplinkCommon,           -- 2601
    initialUplinkBWPSweeping-r18       BWP-UplinkCommon,           -- 2602
    timeAlignmentTimerCommon           TimeAlignmentTimer,         -- 2603
    timeAlignmentTimerCommonSweeping-r18  TimeAlignmentTimer       -- 2604
}

-- TAG-UPLINKCONFIGCOMMONSIB-STOP
-- ASN1STOP

-- ASN1START                      2610
-- TAG-FREQUENCYINFOUL-START frequencyInfoULSweeping-r18 ::=    SEQUENCE {                   2612        2614
    frequencyBandList                  MultiFrequencyBandListNR
    OPTIONAL,  -- Cond FDD-OrSUL
    absoluteFrequencyPointA            ARFCN-ValueNR
    scs-SpecificCarrierList            SEQUENCE (SIZE (1..maxSCSs)) OF SCS-SpecificCarrier,
    additionalSpectrumEmission         AdditionalSpectrumEmission
    OPTIONAL,  -- Need S
    p-Max                              P-Max
    OPTIONAL,  -- Need S
    frequencyShift7p5khz               ENUMERATED {true}
    OPTIONAL,  -- Cond FDD-TDD-OrSUL-Optional
    ...
}

-- TAG-FREQUENCYINFOUL-STOP
-- ASN1STOP
```

FIG. 29B

METHODS FOR UL RACH COVERAGE EXTENSION

CROSS REFERENCE TO RELATED APPLICATIONS

This application claims priority from U.S. Provisional Application No. 63/062,887, filed on Aug. 7, 2020. The entire contents of this earlier filed application are hereby incorporated by reference in their entirety.

TECHNICAL FIELD

The examples and non-limiting embodiments relate generally to communications and, more particularly, to methods for UL RACH coverage extension.

BACKGROUND

It is known to synchronize communication between a user equipment and a radio node such as a base station.

BRIEF DESCRIPTION OF THE DRAWINGS

The foregoing aspects and other features are explained in the following description, taken in connection with the accompanying drawings, wherein:

FIG. 3 shows an example SSB beam and RO association.

FIG. 7 shows an example where when N≤1, the same preamble ID can be reused by sweeping UEs across different ROs in the same system frame.

FIG. 11A and FIG. 11B show an example implementation of an information element, such as a RACH-ConfigCommon IE, based on the examples described herein.

FIG. 15 shows another example of an IE implementation, based on the examples described herein.

FIG. 16 shows another example of an IE implementation, based on the examples described herein.

FIG. 17 illustrates an example of availability of ROs for non-sweeping UEs.

FIG. 18 illustrates an example of availability of ROs for beam-sweeping UEs.

FIG. 19 illustrates an example of availability of ROs for both beam-sweeping and non-sweeping UEs.

FIG. 20 shows an example modification of an information element, based on the examples described herein.

FIG. 26 is an example implementation of a new SIB 1 field in the RRC spec.

FIG. 29A and FIG. 29B show another example sweeping RACH enabled BWP in a CC not previously usable for initial RACH.

SUMMARY

Figure 1:
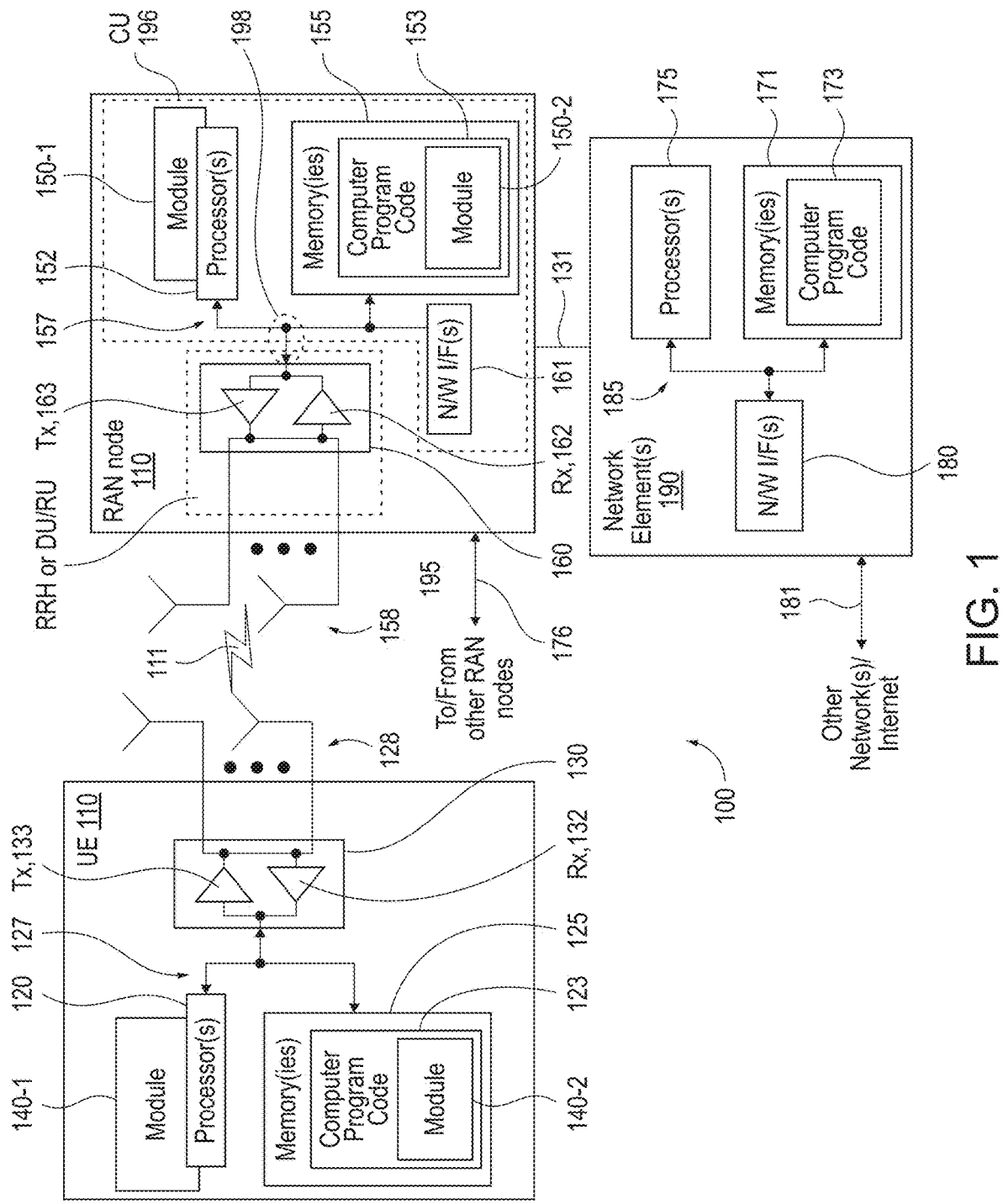
FIG. 1 is a block diagram of one possible and non-limiting system in which the example embodiments may be practiced.

According some aspects, there is provided the subject matter of the independent claims. Some further aspects are defined in the dependent claims. The embodiments that do not fall under the scope of the claims are to be interpreted as examples useful for understanding the disclosure.

In a first aspect thereof the exemplary embodiments of this invention provide an apparatus comprising: at least one processor; and at least one non-transitory memory including computer program code; wherein the at least one memory and the computer program code are configured to, with the at least one processor, cause the apparatus at least to perform: receive from a user equipment a plurality of beam-formed random access signals comprising at least one preamble of a preamble group that indicates a use of beam sweeping by the user equipment; wherein the plurality of beam-formed random access signals are received over a set of random access channel occasions; wherein each of the plurality of beam-formed random access signals are uniquely identifiable by the random access channel occasion over which they are received; select one of the beam-formed random access signals based on a quality metric; and transmit within a random access response message at least an indicator of the selected beam-formed random access signal.

In a further aspect thereof the exemplary embodiments of this invention provide an apparatus comprising: at least one processor; and at least one non-transitory memory including computer program code; wherein the at least one memory and the computer program code are configured to, with the at least one processor, cause the apparatus at least to perform: select at least one preamble group that indicates the use of beam sweeping; transmit a plurality of beam-formed random access signals comprising at least one preamble from the selected preamble group over a set of random access channel occasions, each beam-formed random access signal being transmitted using a different beam; wherein each of the plurality of beam-formed random access signals are uniquely identifiable by the random access channel occasion over which they are transmitted; and receive within a random access response message at least an indicator of one of the beam-formed random access signals.

In another aspect thereof the exemplary embodiments of this invention provide an apparatus comprising: at least one processor; and at least one non-transitory memory including computer program code; wherein the at least one memory and the computer program code are configured to, with the at least one processor, cause the apparatus at least to perform: transmit a plurality of beam-formed random access signals over a set of preconfigured random access channel occasions that indicate that initial access signaling using beam sweeping is performed, each beam-formed random access signal being transmitted using a different beam; wherein each of the plurality of beam-formed random access signals are uniquely identifiable by the random access channel occasion over which they are transmitted; and receive within a random access response message at least an indicator of one of the beam-formed random access signals.

DETAILED DESCRIPTION OF EXAMPLE EMBODIMENTS

The following acronyms and abbreviations that may be found in the specification and/or the drawing figures are defined as follows:

3GPP third generation partnership project (or project partner)
   4G fourth generation
   5G fifth generation
   5GC 5G core network
   AMF access (or core access) and mobility management function
   ARFCN absolute radio-frequency channel number
   ASIC application-specific integrated circuit
   BS base station
   BWP bandwidth part
   CA carrier aggregation
   CB contention-based
   CBRA contention-based random-access
   CC component carrier(s)
   CE control element
   CFRA contention-free random-access
   CORESET control resource set
   C-RNTI cell RNTI
   CU central unit or centralized unit
   DC dual connectivity
   DCI downlink control indication/information
   DL downlink
   DU distributed unit
   DSP digital signal processor
   eNB evolved/enhanced Node B (e.g., an LTE base station)
   EN-DC E-UTRA-NR dual connectivity
   en-gNB node providing NR user plane and control plane protocol terminations towards the UE, and acting as a secondary node in EN-DC
   E-UTRA evolved universal terrestrial radio access, i.e., the LTE radio access technology
   E-UTRA-NR E-UTRA new radio
   F1 control interface between CU and DU
   FDD frequency division duplex
   FDM frequency division multiplexing
   FPGA field programmable gate array
   FR1 frequency range 1
   FR2 frequency range 2
   gNB next generation Node B, base station for 5G/NR, i.e., a node providing NR user plane and control plane protocol terminations towards the UE, and connected via the NG interface to the 5GC
   grp group
   ID identifier
   IE information element
   I/F interface
   I/O input/output
   LTE long term evolution (4G)
   MAC medium access control
   MCG master cell group
   MIB master information block
   MME mobility management entity
   msg1 PRACH
   msg2 MAC RAR
   msg3 RRC request
   msg4 RRC setup
   N/A not applicable
   ng or NG new generation
   ng-eNB new generation eNB
   NG-RAN new generation radio access network
   NR new radio (5G)
   NUL normal UL
   NW or N/W network
   OFDM orthogonal frequency-division multiplexing
   PBCH physical broadcast channel
   PCell primary cell
   PDCCH physical downlink control channel
   PDCP packet data convergence protocol
   PDSCH physical downlink shared channel
   PHY physical layer
   PRACH physical random access channel
   PRB physical resource block(s)
   preID preamble ID
   PsCell primary SCG cell
   PUCCH physical uplink control channel
   PUSCH physical uplink shared channel
   RA random access
   RACH random access channel
   RAN radio access network
   RAR random access response
   RA-RNTI random access RNTI
   RB resource block
   Rel—release
   RF radio frequency
   RLC radio link control
   RNTI radio network temporary identifier RO RACH occasion/opportunity
RRC radio resource configuration/control
RRH remote radio head
RSRP reference signal received power
RU radio unit
Rx or RX receiver or receive
SCell secondary cell
SCG secondary cell group
SDAP service data adaptation protocol
SDL supplemental downlink
SGW serving gateway
SI study item
SIB system information block
SIB1 or SIB 1 system information block type 1
SMF session management function
SoC system(s) on a chip
SpCell special cell
SS synchronization signal(s)
SSB synchronization signal block
SUL supplementary uplink
TA timing advance
TC-RNTI temporary C-RNTI
TR technical report
TRP transmission and reception point
TS technical specification
Tx or TX transmitter or transmit
UE user equipment (e.g., a wireless, typically mobile device)
UL uplink
UPF user plane function Turning to FIG. 1, this figure shows a block diagram of one possible and non-limiting example in which the examples may be practiced. A user equipment (UE) 110, radio access network (RAN) node 170, and network element(s) 190 are illustrated. In the example of FIG. 1, the user equipment (UE) 110 is in wireless communication with a wireless network 100. A UE is a wireless device that can access the wireless network 100. The UE 110 includes one or more processors 120, one or more memories 125, and one or more transceivers 130 interconnected through one or more buses 127. Each of the one or more transceivers 130 includes a receiver, Rx, 132 and a transmitter, Tx, 133. The one or more buses 127 may be address, data, or control buses, and may include any interconnection mechanism, such as a series of lines on a motherboard or integrated circuit, fiber optics or other optical communication equipment, and the like. The one or more transceivers 130 are connected to one or more antennas 128 that may be part of or include an antenna array or other antenna configuration or antenna array configuration. The one or more memories 125 include computer program code 123. The UE 110 includes a module 140, comprising one of or both parts 140-1 and/or 140-2, which may be implemented in a number of ways. The module 140 may be implemented in hardware as module 140-1, such as being implemented as part of the one or more processors 120. The module 140-1 may be implemented also as an integrated circuit or through other hardware such as a programmable gate array. In another example, the module 140 may be implemented as module 140-2, which is implemented as computer program code 123 and is executed by the one or more processors 120. For instance, the one or more memories 125 and the computer program code 123 may be configured to, with the one or more processors 120, cause the user equipment 110 to perform one or more of the operations as described herein. The UE 110 communicates with RAN node 170 via a wireless link 111.

The RAN node 170 in this example is a base station that provides access by wireless devices such as the UE 110 to the wireless network 100. The RAN node 170 may be, for example, a base station for 5G, also called New Radio (NR). In 5G, the RAN node 170 may be a NG-RAN node, which is defined as either a gNB or an ng-eNB. A gNB is a node providing NR user plane and control plane protocol terminations towards the UE, and connected via the NG interface to a 5GC (such as, for example, the network element(s) 190). The ng-eNB is a node providing E-UTRA user plane and control plane protocol terminations towards the UE, and connected via the NG interface to the 5GC. The NG-RAN node may include multiple gNBs, which may also include a central unit (CU) (gNB-CU) 196 and distributed unit(s) (DUs) (gNB-DUs), of which DU 195 is shown. Note that the DU may include or be coupled to and control a radio unit (RU). The gNB-CU is a logical node hosting radio resource control (RRC), SDAP and PDCP protocols of the gNB or RRC and PDCP protocols of the en-gNB that controls the operation of one or more gNB-DUs. The gNB-CU terminates the F1 interface connected with the gNB-DU. The F1 interface is illustrated as reference 198, although reference 198 also illustrates a link between remote elements of the RAN node 170 and centralized elements of the RAN node 170, such as between the gNB-CU 196 and the gNB-DU 195. The gNB-DU 195 is a logical node hosting RLC, MAC and PHY layers of the gNB or en-gNB, and its operation is partly controlled by the gNB-CU 196. One gNB-CU 196 supports one or multiple cells. One cell is supported by only one gNB-DU. The gNB-DU 195 terminates the F1 interface 198 connected with the gNB-CU 196. Note that the DU 195 is considered to include the transceiver 160, e.g., as part of a RU, but some examples of this may have the transceiver 160 as part of a separate RU, e.g., under control of and connected to the DU 195. The RAN node 170 may also be an eNB (evolved NodeB) base station, for LTE (long term evolution), or any other suitable base station or node.

The RAN node 170 includes one or more processors 152, one or more memories 155, one or more network interfaces (N/W I/F(s)) 161, and one or more transceivers 160 interconnected through one or more buses 157. Each of the one or more transceivers 160 includes a receiver, Rx, 162 and a transmitter, Tx, 163. The one or more transceivers 160 are connected to one or more antennas 158. The one or more memories 155 include computer program code 153. The CU 196 may include the processor(s) 152, one or more memories 155, and network interfaces 161. Note that the DU 195 may also contain its own memory/memories and processor(s), and/or other hardware, but these are not shown.

The RAN node 170 includes a module 150, comprising one of or both parts 150-1 and/or 150-2, which may be implemented in a number of ways. The module 150 may be implemented in hardware as module 150-1, such as being implemented as part of the one or more processors 152. The module 150-1 may be implemented also as an integrated circuit or through other hardware such as a programmable gate array. In another example, the module 150 may be implemented as module 150-2, which is implemented as computer program code 153 and is executed by the one or more processors 152. For instance, the one or more memories 155 and the computer program code 153 are configured to, with the one or more processors 152, cause the RAN node 170 to perform one or more of the operations as described herein. Note that the functionality of the module 150 may be distributed, such as being distributed between the DU 195 and the CU 196, or be implemented solely in the DU 195.

The one or more network interfaces 161 communicate over a network such as via the links 176 and 131. Two or more gNBs 170 may communicate using, e.g., link 176. The link 176 may be wired or wireless or both and may implement, for example, an Xn interface for 5G, an X2 interface for LTE, or other suitable interface for other standards.

The one or more buses 157 may be address, data, or control buses, and may include any interconnection mechanism, such as a series of lines on a motherboard or integrated circuit, fiber optics or other optical communication equipment, wireless channels, and the like. For example, the one or more transceivers 160 may be implemented as a remote radio head (RRH) 195 for LTE or a distributed unit (DU) 195 for gNB implementation for 5G, with the other elements of the RAN node 170 possibly being physically in a different location from the RRH/DU 195, and the one or more buses 157 could be implemented in part as, for example, fiber optic cable or other suitable network connection to connect the other elements (e.g., a central unit (CU), gNB-CU 196) of the RAN node 170 to the RRH/DU 195. Reference 198 also indicates those suitable network link(s).

It is noted that description herein indicates that "cells" perform functions, but it should be clear that equipment which forms the cell performs the functions. The cell makes up part of a base station. That is, there can be multiple cells per base station. For example, there could be three cells for a single carrier frequency and associated bandwidth, each cell covering one-third of a 360 degree area so that the single base station's coverage area covers an approximate oval or circle. Furthermore, each cell can correspond to a single carrier and a base station may use multiple carriers. So if there are three 120 degree cells per carrier and two carriers, then the base station has a total of 6 cells.

The wireless network 100 may include a network element or elements 190 that may include core network functionality, and which provides connectivity via a link or links 181 with a further network, such as a telephone network and/or a data communications network (e.g., the Internet). Such core network functionality for 5G may include access and mobility management function(s) (AMF(S)) and/or user plane functions (UPF(s)) and/or session management function(s) (SMF(s)). Such core network functionality for LTE may include MME (Mobility Management Entity)/SGW (Serving Gateway) functionality. These are merely example functions that may be supported by the network element(s) 190, and note that both 5G and LTE functions might be supported. The RAN node 170 is coupled via a link 131 to the network element 190. The link 131 may be implemented as, e.g., an NG interface for 5G, or an S1 interface for LTE, or other suitable interface for other standards. The network element 190 includes one or more processors 175, one or more memories 171, and one or more network interfaces (N/W I/F(s)) 180, interconnected through one or more buses 185. The one or more memories 171 include computer program code 173. The one or more memories 171 and the computer program code 173 are configured to, with the one or more processors 175, cause the network element 190 to perform one or more operations.

The wireless network 100 may implement network virtualization, which is the process of combining hardware and software network resources and network functionality into a single, software-based administrative entity, a virtual network. Network virtualization involves platform virtualization, often combined with resource virtualization. Network virtualization is categorized as either external, combining many networks, or parts of networks, into a virtual unit, or internal, providing network-like functionality to software containers on a single system. Note that the virtualized entities that result from the network virtualization are still implemented, at some level, using hardware such as processors 152 or 175 and memories 155 and 171, and also such virtualized entities create technical effects.

The computer readable memories 125, 155, and 171 may be of any type suitable to the local technical environment and may be implemented using any suitable data storage technology, such as semiconductor based memory devices, flash memory, magnetic memory devices and systems, optical memory devices and systems, fixed memory and removable memory. The computer readable memories 125, 155, and 171 may be means for performing storage functions. The processors 120, 152, and 175 may be of any type suitable to the local technical environment, and may include one or more of general purpose computers, special purpose computers, microprocessors, digital signal processors (DSPs) and processors based on a multi-core processor architecture, as non-limiting examples. The processors 120, 152, and 175 may be means for performing functions, such as controlling the UE 110, RAN node 170, network element(s) 190, and other functions as described herein.

In general, the various embodiments of the user equipment 110 can include, but are not limited to, cellular telephones such as smart phones, tablets, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, tablets with wireless communication capabilities, as well as portable units or terminals that incorporate combinations of such functions.

UE 110, RAN node 170 and/or network element(s) 190 may be configured to implement a method targeting UL RACH coverage extension, based on the examples described herein.

Random-access procedures in 3GPP New Radio (NR) Release 15 (and beyond) have been specified to be compliant with the beam-based architecture underlying physical layer (PHY) operations in 5G networks. Details of such procedures can be found in: TS 38.214 section 5.2; TS 38.213 section 8.1; TS 38.321 section 5.1; and TR 38.802 section 6.1.6.

Figure 2:
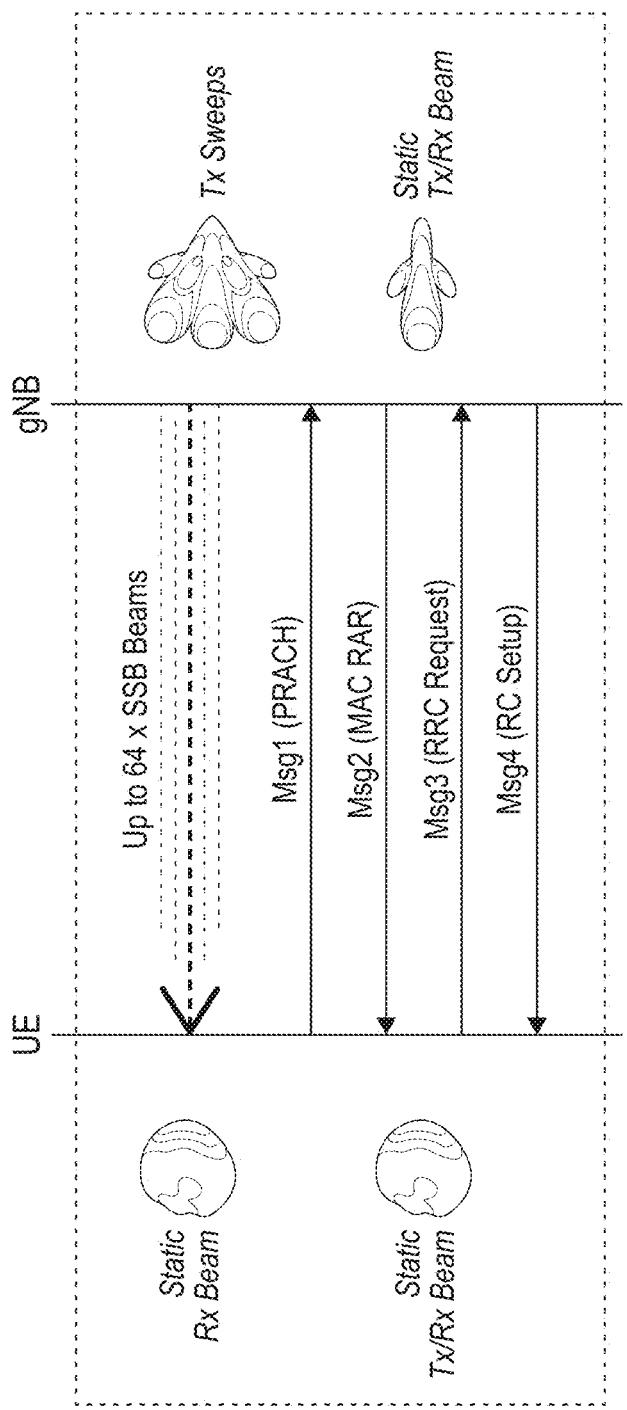
FIG. 2 illustrates the 3GPP Rel-15 random-access procedure.

Broadly speaking two random-access channel (RACH) procedures exist, contention-free (CFRA) and contention based (CBRA). The latter can be articulated in 2 and 4 steps, where a message exchange occurs between UE and gNB in each of the steps. The examples described herein focus on the 4-step version of the CBRA, which entails the exchange of 4 main messages between the gNB and UE and is illustrated in FIG. 2 for convenience. The four (plus one preliminary) steps are as follows:

0. SSB transmission/reception: This step is not formally part of the random-access procedure and is also known as downlink (DL) SSB beam sweeping. It is included here for completeness, given that the actual first step of the procedure depends on the measurements UE performs during the synchronization signal block (SSB) reception. In this preliminary step, gNB sends a sequence of SSB, each of them beamformed using a wide beam. The UE measures the reference signal received power (RSRP) for all received SSB beams using a certain receive (RX) beam. Finally, the UE selects the index of the preferred SSB (and decodes associated PBCH for MIB, SIB and so on).

1. Msg1: Using the same beam configuration as in RX, the UE sends a specific preamble using a specific time and frequency resource, referred to as so-called RACH opportunity (RO), associated to the SSB index selected in step 0. The RO and used preamble are chosen in a random fashion. Two groups of configured preambles exist, i.e., group A and group B, with group choice depending on the potential msg3 size (UL data available for transmission plus MAC header and, where required, MAC CEs) and whether the estimated pathloss at the UE is less than P_CMAX (of the Serving Cell performing the Random Access Procedure, see TS 38.213)-preambleReceivedTargetPower-msg3-DeltaPreamble-messagePowerOffsetGroupB (see TS 38.331).

Relevant higher-layer configured parameters for this step are: i. Preamble type to be used (13 possibilities, including long and short formats); ii. The configuration set of available ROs and their association to SSB index; iii. The number of preambles which can be used for the CBRA. The maximum value for this parameter in the current 3GPP NR specification is 64; and iv. The size of preamble group A and B.

2. Msg2 (MAC RAR): After detecting the preamble sent by UE, gNB responds with a random-access response (RAR), also known as Msg2. Such message includes the detected preamble ID, a time-advance command, a temporary C-RNTI (TC-RNTI), and an uplink grant for scheduling a PUSCH transmission from the UE known as msg3.

3. Msg3 (RRC setup request): The UE transmits msg3 to the gNB over the scheduled PUSCH, in response to the RAR. This message includes an ID for contention resolution.

4. Msg4 (RRC setup): Upon reception of msg3, the gNB transmits the contention resolution message, also known as msg4, with the contention resolution ID. The UE receives msg4. If its contention-resolution ID is carried by msg4, the UE sends an acknowledgement on a PUCCH. This completes the 4-step random-access procedure.

Figure 3:
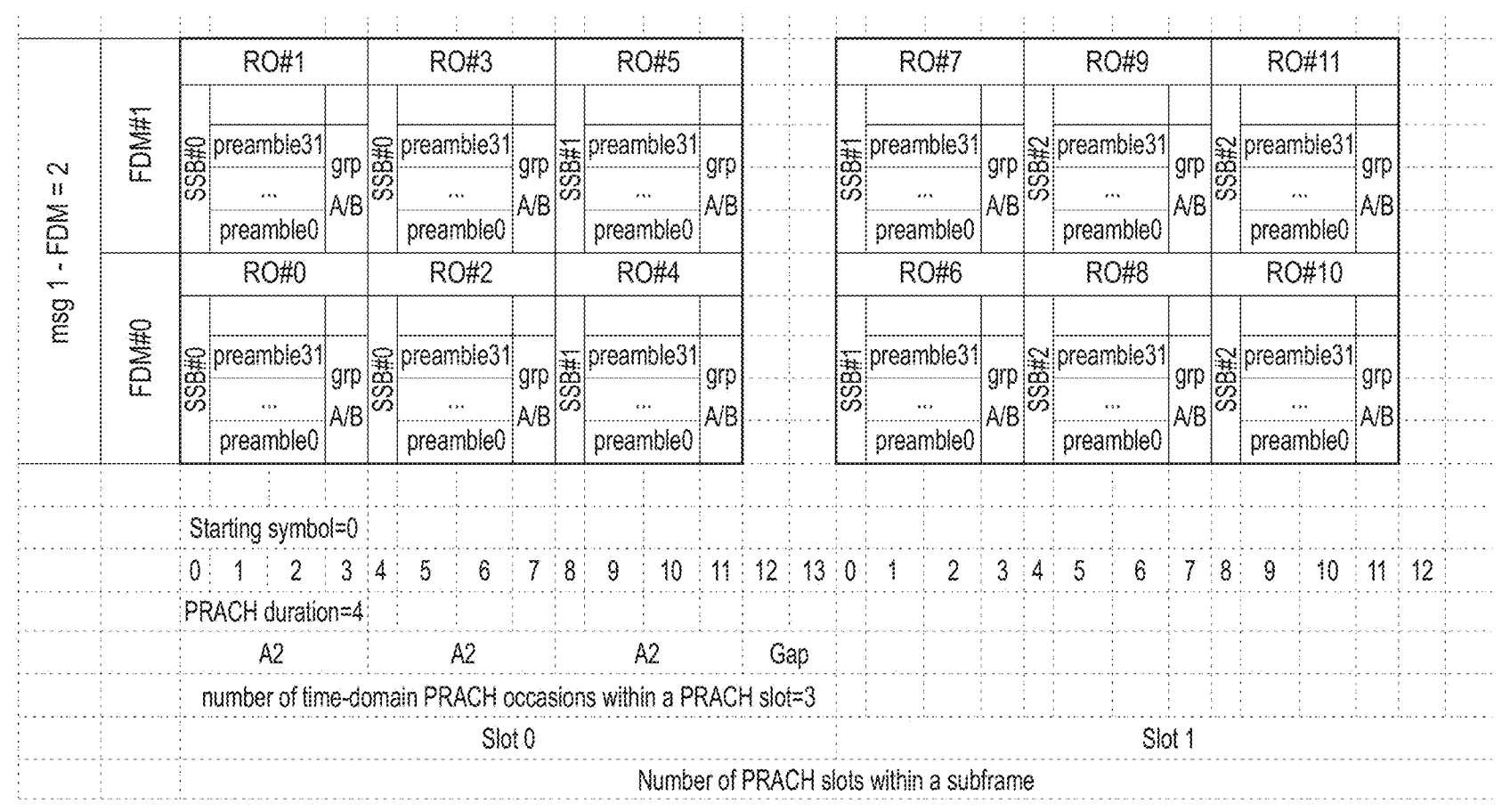

A graphical example of one possible RO to SSB association pattern is given in FIG. 3, for simplicity, which provides several observations. The focus is on 2 consecutive "PRACH slots" (in FIG. 2, Slot 0 and Slot 1). Up to 6 ROs can be chosen per slot, i.e., three ROs per frequency resource per slot are available and two frequency resources are FDMed. The frequency resources are shown as FDM #0 and FDM #1.

In the example shown in FIG. 3, 4 ROs are associated to each SSB index, where the SSB indexes are SSB #0, SSB #1, and SSB #2. If SSB #x is selected by the UE 110, 1 of the 4 available ROs per SSB #x would be chosen at random by the UE 110 to send the chosen preamble. The UE 110 can choose from a pool of 32 preambles (chosen from either group A or B, as explained before). The pool of 32 preambles are shown in FIG. 3 as being preamble0 through to preamble31.

Further shown by the example of FIG. 3, msg1 is shown being associated with FDM=2, the starting symbol is 0, the PRACH duration is 4 (including A2, A2, A2, Gap), and the number of time-domain PRACH occasions within a PRACH slot is 3.

In a practical network, the exact situation depicted in FIG. 3 would be the result of gNB signaling (such as from RAN node 170) in the cell the choice of PRACH configuration index 91 as per Table 6.3.3.2-3 of 3GPP TS 38.211 (Rel-15) and ssb-perRACH-OccasionAndCB-PreamblesPerSSB=oneFourth {n32}.

The root cause for a random-access failure is typically the gNB 170 not being able to receive and successfully decode msg3 transmitted from a connecting UE. This issue directly affects the cell size or, equivalently, the physical limit at which a UE is able to connect to a given gNB.

It is worth observing that 3GPP Rel-15 and 16 only support one directional msg1 transmission, which can be repeated with increased power until either the UE receives msg2 from gNB, and continues the initial access procedure, or the UE reaches the configured max power and the random-access procedure is deemed unsuccessful. The same "unidirectionality" applies to msg3 transmission. This affects the "coverage" of both messages rather significantly, and specifically the one of msg3, due to PUSCH coverage limitations.

In this context, Rel-15 (and beyond) UEs may be equipped with more than one panel (i.e., antenna arrays) and/or make use of several analogue/digital beams to increase the transmit/receive antenna gain and improve the uplink (UL) radio link budget, especially when operating at FR2. However, regardless of the number of available panels at the UE and the number of analogue/digital beams the UE can make use of to steer the transmission, it is only possible to benefit from this potential increase in antenna gain, if the UE knows in which angular direction to steer the beam.

Unfortunately, this is not possible in 3GPP Rel-15/Rel-16 random-access procedure, given that: the UE has a very limited idea of the angular direction of the gNB after SSB beam reception, since the SSB transmissions typically are received with a wide radiation beam-width; the SSB procedure is designed to help the gNB to determine the angular direction of the UE. The UE knows which of its potential multiple panels has received the SSB sweeps with the highest RSRP level and can therefore only select the best panel accordingly, but not the best beam with full directivity (antenna gain); the limited angular knowledge at the UE at this stage of the procedure is thus at antenna panel level at the best. In other words, the UE knows which antenna panel to use, but not which high gain beam to configure that antenna panel for; a panel typically covers an angular sector of 90° and the UE only knows that the gNB is somewhere within that sector and needs to configure a wide angular beam with reduced gain to ensure that the transmitted msg #1 is directed towards the gNB; and the RACH process is currently designed to take the first successfully received msg1 as a sign that the msg3 transmitted in the same "way" leads to equal success, which has been shown to be a false assumption in most cases.

As a result, an option for the UE for msg1 and msg3 transmission is to configure the selected antenna panel with the same wide radiation beam-width as the SSB transmissions was received with. This implies that a fixed beam can be used during the RACH procedure and possible gains cannot be leveraged by UE.

The introduction of UE side transmit beam sweeping in RACH, and consequent selection of beam-swept msg1 at the gNB, is fundamentally incompatible with the non-sweeping RACH procedure, e.g., Rel-15/Rel-16 operation, for two major reasons:

1. Only one preamble ID and RO are used by each UE per access procedure. In practice, UE beams cannot be distinguished at the gNB and the fact that the UE may be employing TX beamforming is not exposed to the gNB. Simply increasing the number of IDs per UE would not solve the problem, since the gNB needs to understand that a UE wants to sweep. A gNB is currently expected to prepare a RAR for each successfully demodulated preamble and the underlying assumption is that if the gNB received it, then the UE TX beam was good enough to use for subsequent communication.
2. The gNB feeds back RAR as soon as a preamble is correctly demodulated within a pre-determined RAR window the UE monitors for the response. The RAR does not contain any information about the quality of the demodulated preamble. In other words, (i) there is no comparison of msg1 quality at the gNB and (ii) there is no means to inform the UE about the beam that gave the strongest received msg1, but essentially the first msg1 the gNB detects is the one the gNB proceeds with as it would not be able to know that two preambles received in two different times (UE transmitting in two different TX beams) were from the same UE.

Enabling such a comparison where the gNB can compare different preambles one UE is sending within a random access attempt over different TX beams, in turn allowing a method of increasing the UL beamforming gain to be identified for msg1/msg3 transmission, is one part of the examples described herein. The idea includes:
1. A method of identifying UEs which make use of the proposed new beam-sweeping RACH procedure that enables the gNB to identify the best uplink TX beam rather than the first beam that the gNB managed to detect. These UEs sweep different TX beams over a set of ROs associated to the chosen SSB beam ID, at least for the initial msg1 transmission (if msg1 retransmission is considered, beam sweeping may or may not take place). This ensures an increase of the effective antenna panel gain by allowing the usage of several focused/high gain beam patterns, as opposed to the legacy state-of-the-art operation, which requires the UE to use a single wide/low gain TX beam for both msg1 and msg3 transmission.
2. Configuration and adoption of at least one new preamble group (here denoted group C, for simplicity), and possibly a second (denoted group D, for simplicity), reserved for TX beam sweeping at the UE. If both preamble groups C and D are configured, the UE's choice of group C or group D could use a similar method as in the prior art for choosing between groups A and B, namely depending on potential/expected msg3 size (UL data available for transmission plus MAC header and, where required, MAC CEs) and on whether the estimated pathloss at the UE is less than $P_{CMAX}$ (of the Serving Cell performing the Random Access Procedure, see TS 38.213)-preambleReceivedTargetPower-msg3-DeltaPreamble-messagePowerOffsetGroupB (see TS 38.331). In other words, the presence of sweeping UEs is communicated by choosing a preamble from group C or D (i.e., non-sweeping UEs would be using only preambles from group A and B).

In this context, embodiments include: i. In a preferred embodiment, group C and group D preambles are subsets of the preamble groups for non-sweeping RACH procedure, i.e., A and B, respectively. Hence, the total number of CBRA preambles (legacy groups A and B, and novel groups C and D, as well as, on-demand SIB triggering group) and CFRA preambles is smaller than or equal to a maximum number of usable preambles for RACH (e.g., 64 in 3GPP Rel-15/Rel-16); ii. In another embodiment, group C and group D preambles are defined as an extension "above" the maximum number of usable Rel-15/Rel-16 preambles, which is possible but increases root sequence usage (which is "expensive"); iii. In another embodiment, only one new preamble group is defined. Such group could be a subset of either group A or group B or comprise the union of a subset of group A and a subset of group B. In this case, the method might be available for only one of the two existing conditions depending on msg3 size as currently used for selection between groups A and B (If both preamble groups C and D are configured, the UE's choice of group C or group D could use a similar method as in the prior art for choosing between groups A and B, namely depending on potential/expected msg3 size (UL data available for transmission plus MAC header and, where required, MAC CEs) and on whether the estimated pathloss at the UE is less than $P_{CMAX}$ (of the Serving Cell performing the Random Access Procedure, see TS 38.213)-preambleReceivedTargetPower-msg3-DeltaPreamble-messagePowerOffsetGroupB (see TS 38.331)), or the existing selection depending on msg3 size might be unavailable if the new beam-sweeping RACH procedure is used.

This would ensure complete distinguishability between UEs using the beam-sweeping RACH procedure described herein and UEs using the legacy RACH procedure, i.e., backward compatibility with legacy devices and procedures is guaranteed.
3. A UE using the new beam-sweeping RACH procedure selects its preamble signatures from the new group C (or D if configured), to indicate to the gNB that it is using the new procedure rather than the legacy procedure. The detection of a preamble from group C (or D) enables the gNB to expect the possibility of receiving multiple preambles from the same beam-sweeping user equipment and to await reception of all the possible beam-formed versions of that preamble before sending the RAR.
4. A UE sweeping TX beams can use the same group C/D preamble index over multiple ROs associated to same SSB beam ID #x, in the same PRACH association pattern period(s). Embodiments include: i. In a preferred embodiment, the UE completes one sweep of all its TX beams within one association period. In this case, the minimum latency to receive msg2 would be no longer than that of non-sweeping operation, e.g., Rel-15/Rel-16; ii. In another embodiment, one PRACH association pattern period does not have enough ROs associated to the chosen SSB ID for the UE to complete one sweep of all its TX beams. In this case, the UE sweeping stretches over more than one PRACH association pattern period and the minimum latency to receive msg2 would be larger than that of non-sweeping operation, e.g., Rel-15/Rel-16.
5. A new procedure is adopted by the gNB to form the RAR message, i.e., msg2, by means of which the gNB waits until all the different beamformed versions of msg1 associated to a given SSB beam ID are received, chooses the best one according to a suitable metric (e.g., highest RSRP) and then acknowledges its reception to UEs via msg2.

The disclosed method at a high-level includes (refer also to FIG. 4): 1. The UE 110 transmits several beam-formed higher gain msg1s sequentially (at 404), each msg1 being transmitted using a different TX beam. Different ROs are used for the transmission of each of the msg1s; 2. Each msg1 is uniquely identifiable by the RO in which it is transmitted. (The UE 110 knows the association between RO and beam); 3. Upon reception of a preamble from the new groups C (or D if defined), the gNB 170 switches to the new UE beam sweeping RACH reception procedure for the msg1 index/RO combinations concerned; 4. At 406, the gNB 170 informs the UE 110 about the best msg1 preamble/RO combination in the context of the msg2 transmission; 5. The UE 110 uses the received information to configure the best beam for msg3 transmission at 408 with high antenna panel gain, which in turn depends on the number of used msg1 sweeps (further details are given herein).

Figure 4:
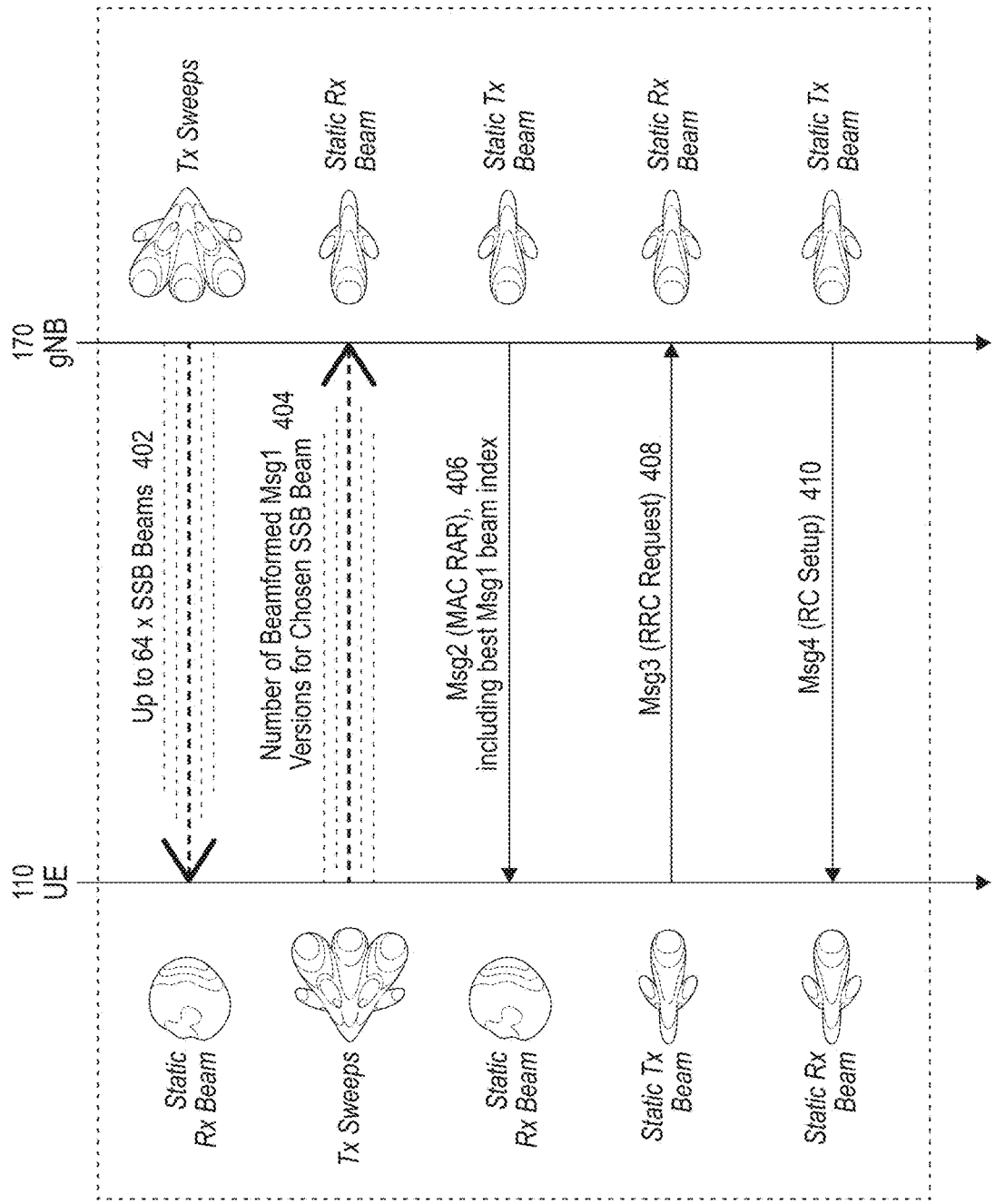
FIG. 4 illustrates an example random-access procedure including TX beam sweep for msg1 transmission, based on the examples described herein.

FIG. 4 depicts how the new preamble group example would be integrated into the current standard procedure illustrated in FIG. 2. Also shown by the example of FIG. 4, at 402, the gNB preliminarily (e.g., prior to 404) transmits up to 64 SSB beams to the UE 110. At 410, the gNB 170 transmits msg4 (RRC setup) to the UE 110.

In summary, information is fed back on the selected one of a plurality of different UE beams using RAR in general, and using suitable preamble indices to identify different UE beams in particular, from the gNB point of view. At the UE side, the UE attempts to transmit RACH msg1 with multiple beams, each of which is associated with a RACH preamble/RO combination. The UE can also select a limited set of beams for its RACH msg1 transmission, depending on its received SSB from the gNB.

Figures 5, 6:
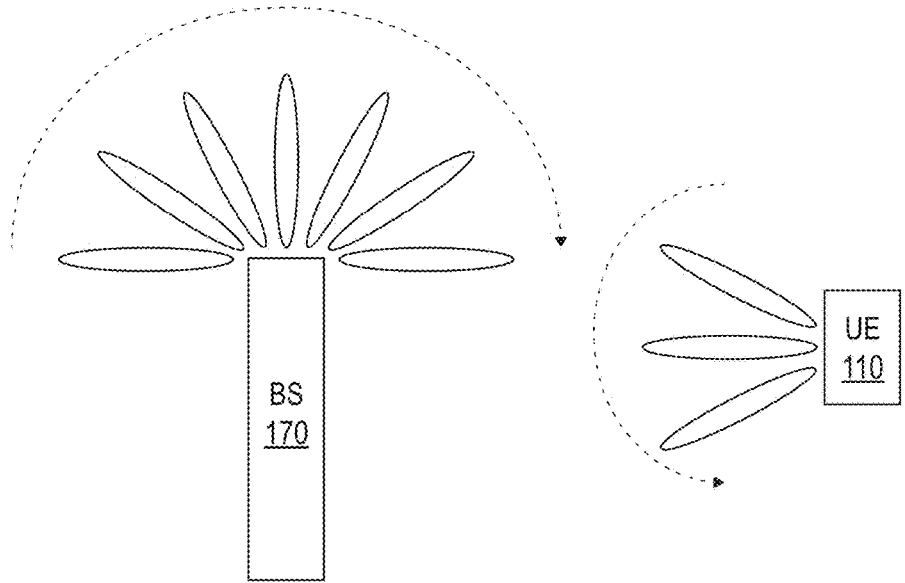
FIG. 5 illustrates UE and gNB sweeping TX/RX beams during RACH, based on the examples described herein.
FIG. 6 is a table showing the relationship between configuration and association periods.

At this stage, it is important to note that both gNB 170 and UE 110 are sweeping their beams during CBRA, according to the described solution, and as demonstrated in FIG. 5. This may cause various synchronization configuration issues, unless a proper procedure design is carried out. This is indeed part of the idea and is discussed in detail herein. In this context, it is of no consequence if the UE 110 has one or more panels, each of which can create beams to transmit msg1/msg3. Even sweeping over all panels and all beams can be accommodated. However, the most realistic use case is that the UE knows the correct panel from listening to SSB and sweeps a limited number of transmission beams (e.g., 4) on this panel. The choice of the limited TX beams is determined by the UE based on its received SSB from the gNB. For illustrative purposes, in FIG. 5 the base station (e.g. gNB) 170 is shown as sweeping 7 beams and the UE is shown as sweeping 3 beams.

Additional definitions and examples are given to simplify the description of the solution.

Rel-15 PRACH-Related Concepts (See 3GPP TS 38.213, s. 8.1):

PRACH configuration period [s]: a measure of time, expressed in multiple of 10 ms, which includes a known number of ROs. The number of ROs is defined by the PRACH configuration index. The PRACH configuration period is repeated a configured number of times, i.e., the so-called PRACH association period in number of PRACH configuration periods (see next definition), until all the SSB beams ID(s) have been mapped to a RO at least once.

PRACH association period [integer]: a period starting from frame 0 of the PRACH configuration, for mapping SSB beam IDs to PRACH occasions, defined as the smallest value in the set determined by the PRACH configuration period according to FIG. 6, such that all the available SSB beam IDs are mapped at least once to the PRACH occasions within the association period. Association periods are powers of 2, so there might be ROs not associated with SSBs left over at the end, which are not used for PRACH preamble transmission.

PRACH association pattern period [s]: a measure of time, expressed in ms, giving the duration of the resulting periods of repeating ROs, i.e., PRACH configuration period*PRACH association period. In this description this quantity may be referred to as "PRACH burst".

Rel-15 CBRA Configuration Parameters:

Let

N be the number of SSB beam IDs per RO (Rd-15 higher layer parameter "ssb-perRACH-Occasion")

R be the number of CBRA preamble IDs associated to 1 SSB indication per RO (Rel-15 higher layer parameter "CB-PreamblesPerSSB")

Q<=64 be the total number of preambles configured by means of the Rel-15 higher layer parameter "totalNumberOfRA-Preambles".

Additionally,

M=R*max{1,N}, to be the total number of CBRA preambles in group A and B.

K=Q−M, to be the number of other preambles used in Rel-15 (e.g., CFRA and msg1_ondemand_SIB preambles).

Y, to be the duration of a PRACH burst in ms, defined as PRACH association period*PRACH configuration period.

Z=max{1,N}*number of uniquely identifiable RO identification periods necessary to span the duration of Y to be the minimum number of preambles needed to introduce the new beam-sweeping UEs PRACH procedure. The duration of such a "uniquely identifiable RO identification period" is, for example, 80 slots in 3GPP NR, but might be different for other radio technologies.

Thus, described herein is a method of identifying UEs that use the new beam-sweeping RACH procedure. Such UEs make use of one or more new preamble groups, (considering the case of two groups, namely groups C and D), which are used to perform a sequence of msg1 transmissions, each one of them beamformed using a different TX beam, and to implicitly signal the presence of a beam sweeping UE to the gNB.

In the general case, more than two new preamble groups could be defined, enabling the UEs that use the new beam-sweeping RACH procedure to be further distinguished according to multiple criteria rather than the single criterion used today, e.g., based on msg3 size, and distinguished by groups A & B.

Each RACH msg1 transmission with a preamble/RO combination is associated with one unique UE TX beam, or a TX spatial filter. The choice of such association is up to the UE's implementation, transparent to the gNB. From the UE point of view, a RACH preamble/RO combination is directly related to one TX beam. The msg2 RAR for one preamble/RO combination is considered as the RACH response to the signal beamformed with its associated TX beam.

The choice of the number of preamble IDs in groups C and D is subject to similar constraints and optimization criteria as for preamble IDs in group A and B. In other words, it is an implementation detail left to the network planning stage. In this sense, a focus is on the minimum number of preamble IDs necessary for the procedure to be implementable in its simplest form.

As described above, UEs operating according to the examples described herein use different ROs associated to the selected beam SSB ID for the transmission of each beamformed msg1 copy. Each msg1 transmission/RO combination (with corresponding beam choice) is unique for the gNB to be able to differentiate between them.

The DCI used to schedule the RAR related to a correctly decoded preamble over the PDSCH is scrambled by the gNB using an RA-RNTI value associated with the PRACH occasion in which the preamble has been transmitted, such value being computed as $$\text{RA-RNTI}=1+s_{id}+14\times t_{id}+14\times 80\times f_{id}+14\times 80\times 8\times ul\_carrier\_id$$

where $s_{id}$ is the index of the first OFDM symbol of the PRACH occasion ($0 \leq s_{id} < 14$), $t_{id}$ is the index of the first slot of the PRACH occasion in a system frame ($0 \leq t_{id} < 80$), $f_{id}$ is the index of the PRACH occasion in the frequency domain ($0 \leq f_{id} < 8$), and ul_carrier_id is the UL carrier used for Random Access Preamble transmission (0 for NUL carrier, and 1 for SUL carrier).

In other words, a 1:1 mapping can be established in each uniquely identifiable RO identification period between one RO and its corresponding RA-RNTI value. Furthermore, if more than one uniquely identifiable RO identification period have the same PRACH configuration, the RA-RNTI associated to the same RO is the same for such uniquely identifiable RO identification period, i.e., the UE cannot differentiate between them. For instance, the duration of such "uniquely identifiable RO identification period" is 80 slots in 3GPP NR but might be different for other radio technologies.

If $N \leq 1$, one RA-RNTI value can also be mapped to one SSB ID, given that at the most one SSB ID is associated to each configured RO. Conversely, if $N>1$, one RA-RNTI value can correspond to more than one SSB ID.

This implies that the minimum number of preamble IDs in group C and group D needed to introduce the new sweeping UE PRACH procedure is given by Z.

Figure 7:
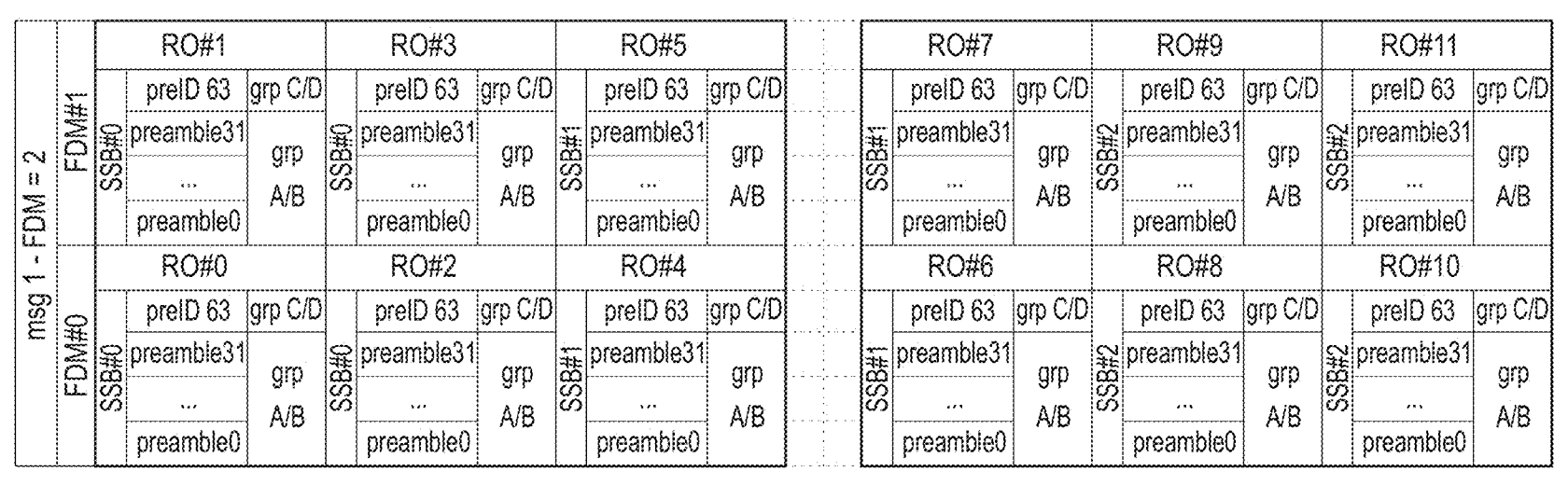
Figures 8, 9:
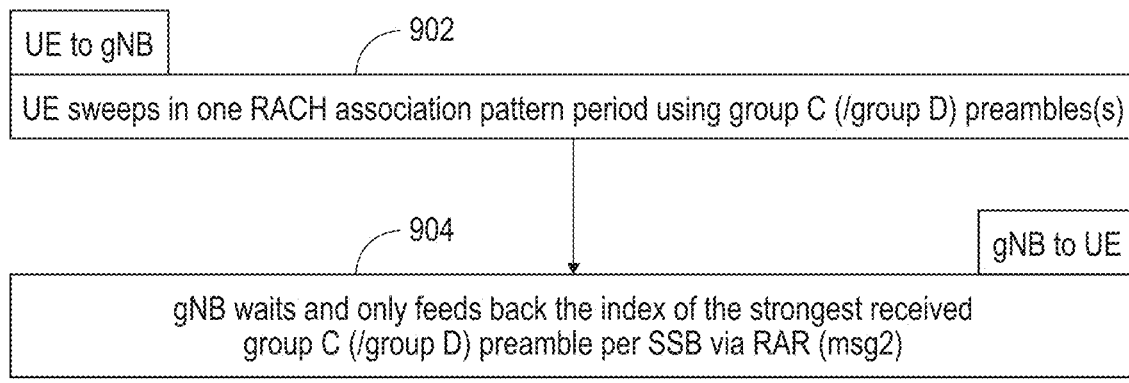
FIG. 8 shows an example where when N>1, the same preamble ID can be reused by sweeping UEs across different ROs in the same system frame but needs to differentiate between SSB IDs mapped to the same RO.
FIG. 9 shows an example minimum latency embodiment, based on the examples described herein.

This situation is graphically illustrated in FIG. 7 and FIG. 8, where two examples are depicted for $N \leq 1$ and $N > 1$, respectively. In particular, only one "new" preamble ID per system frame is needed to enable the TX beam sweeping when $N \leq 1$, whereas N "new" preamble IDs are needed when $N>1$. Thus, FIG. 7 shows an example where when $N \leq 1$, the same preamble ID can be reused by sweeping UEs across different ROs in the same system frame, and FIG. 8 shows an example where when $N>1$, the same preamble ID can be reused by sweeping UEs across different ROs in the same system frame but need to differentiate between SSB IDs mapped to the same RO.

The actual number of preamble IDs of Group C and Group D may be higher-layer configured and can be set according to three configuration methods, where the first two guarantee absence of collisions between sweeping UEs and legacy UEs, e.g., Rel-15/16 UEs. Let c 1 be an integer number. The three methods are:

1. Take cZ<64−M−K preamble IDs from the pool of preamble IDs unused by Rel-15/16. No collision with preambles taken from group A and B occurs in this case. An advantage of this method is that there is perfect transparency to legacy systems, and no collision between legacy and new sweeping UEs. A disadvantage of this method is that it reduces the number of preambles for legacy UEs, potentially increasing collisions among legacy UEs.

2. Take cZ additional preamble IDs outside of the 64 preamble IDs configurable and usable by Rel-15 devices. No collision with preambles taken from group A and B occurs in this case. An advantage of this method is that there is transparency to legacy systems, and no collision between legacy and new UEs. A disadvantage of this method is that it increases root sequence usage, which complicates cell planning 3. Take $cZ \leq M$ preamble IDs from group A and B. Collisions with other preambles taken from group A and B occurs in this case. An advantage of this method is that it is the easiest configuration. A disadvantage of this method is the collisions between legacy and sweeping UEs, which constitutes normal legacy operation, but potentially increases legacy UE latency (if mistaken for a new sweeping UE).

The presence of parameter c allows control of the number of collisions between sweeping UEs during msg1 transmission, and the capability of sweeping UEs to signal the potential msg3 size (UL data available for transmission plus MAC header and, where required, MAC CEs) and the estimated pathloss.

More precisely, if c=1 then group C and group D coincide, i.e., all sweeping UEs use the same preamble ID per PRACH burst. This has a two-fold consequence: 1) the gNB cannot adapt PUSCH resource allocation for future msg3 transmission of sweeping UEs; and 2) if the same SSB beam ID is selected by more than one sweeping UE, then a collision would always occur and the gNB would not be able to differentiate between different UEs. On the other hand, this configuration is the least resource consuming in terms of total number of preambles for beam sweeping purposes.

Conversely, if c>1, then group C and group D may include different preamble IDs and each sweeping UE can choose from more than one preamble ID per PRACH burst. In this case, 1) the gNB can design group C and D to allow the possibility of adapting PUSCH resource allocation for future msg3 transmission of sweeping UEs, and 2) if the same SSB beam ID is selected by more than one sweeping UE, then a collision would only occur if the same preamble ID is randomly chosen by two or more different sweeping UEs. This configuration trades resource consumption for performance. It clearly requires a larger number of preambles but reduces the preamble collision probability as c grows.

Sweeping UEs can make use of ROs available in a RACH association period to perform the TX beam sweeping for msg1 transmission. An example starts by letting $L_{UE_{max}}$ be the number of TX beams the UE uses to sweep. This parameter is known at the gNB, e.g., by specification. Upon reception of preamble ID #p from a preamble group configured from beam-sweeping operation, e.g., group C, the gNB checks how many versions of preamble ID #p have already been received since the last RAR related to that preamble ID has been given. Two possibilities exist, namely $L_{UE_{max}}-1$ versions have already been received, or less than $L_{UE_{max}}-1$ versions have already been received.

If $L_{UE_{max}}-1$ versions have already been received, then the gNB indicates via RAR (msg2) both the preamble ID #p and the RA-RNTI associated to the RO in which its strongest among the $L_{UE_{max}}$ received versions has been detected. If less than $L_{UE_{max}}-1$ versions have already been received, then the gNB waits until such value is attained before creating the RAR. Two embodiments are depicted in FIG. 9 (corresponding to a minimum latency embodiment) and FIG. 10 (corresponding to a normal latency embodiment). These two embodiments include:

1. In a preferred embodiment, the UE completes one sweep of all its TX beams within one association pattern period, i.e., at least $L_{UE_{max}}$ ROs associated to SSB beam ID #x are configured per association pattern period. In this case, the minimum latency to receive msg2 would be identical to that of non-sweeping operation, e.g., Rel-15/Rel-16. A diagram describing the sequence of operations performed by both sweeping UEs and the gNB according to the preferred minimum-latency embodiment is provided in FIG. 9.

Thus in the minimum latency example shown in FIG. 9, at 902 (UE 110 to gNB 170), the UE 110 sweeps in one RACH association pattern period using group C (/group D) preamble(s). At 904 (gNB 170 to UE 110), the gNB 170 waits and only feeds back the index of the strongest received group C (/group D) preamble per SSB via RAR (msg2).

2. In another embodiment, one PRACH association pattern period does not have enough ROs associated to the chosen SSB ID for the UE to complete one sweep of all its TX beams, i.e., less than $L_{UE_{max}}$ ROs associated to SSB beam ID #x are configured per association pattern period. In this case, the UE sweeping stretches over more than one PRACH association pattern period and the minimum latency to receive msg2 would be larger than that of non-sweeping operation, e.g., Rel-15/Rel-16, that is $\lfloor \min\{1,N\} \times L_{UE_{max}} \rfloor$ association pattern periods. A diagram describing the sequence of operations performed by both sweeping UEs and the gNB according to the normal latency embodiment is provided in FIG. 10.

Figure 10:
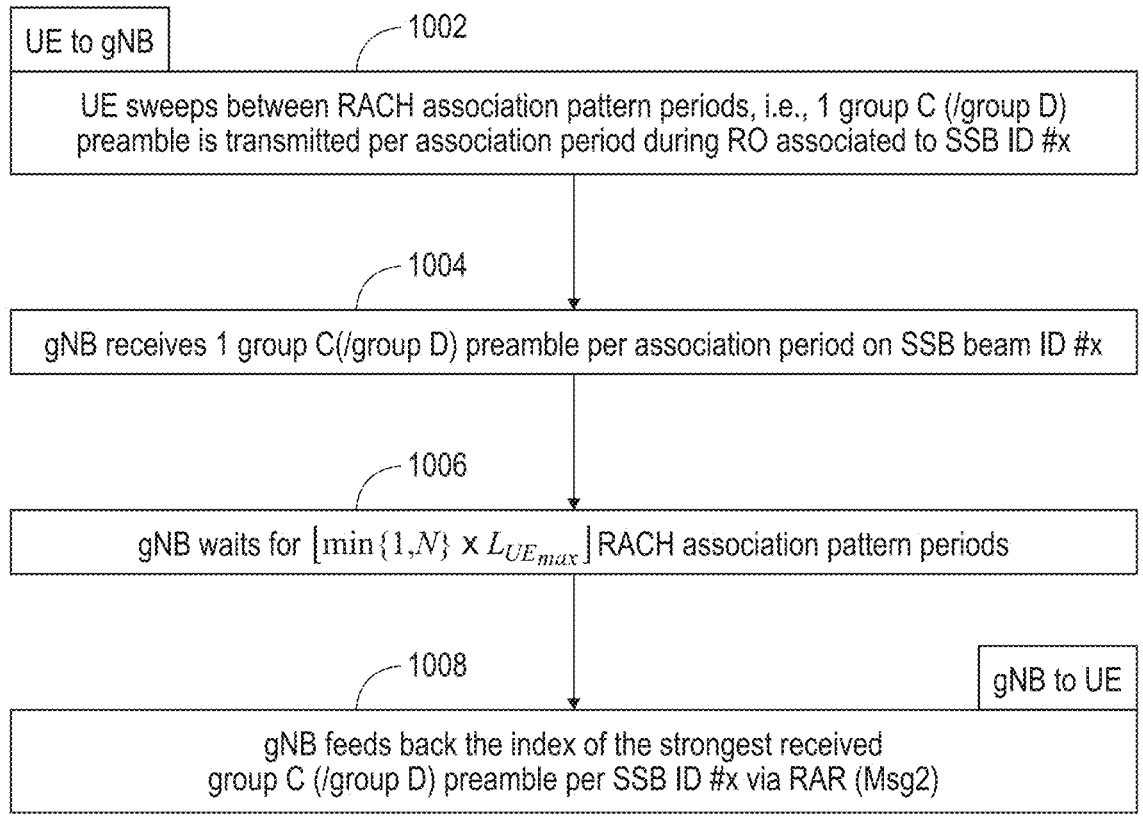
FIG. 10 shows an example normal latency embodiment, based on the examples described herein.

Thus, in the normal latency embodiment shown in FIG. 10, the signaling direction of 1002, 1004, and 1006 is from the UE 110 to the gNB 170, and the signaling direction of 1008 is from the gNB 170 to the UE 110. At 1002, the UE 110 sweeps between RACH association pattern periods, i.e., 1 group C (/group D) preamble is transmitted per association period during RO associated to SSB ID #x. At 1004, the gNB 170 receives 1 group C(/group D) preamble per association period on SSB beam ID #x. At 1006, the gNB 170 waits for $\lfloor \min\{1,N\} \times L_{UE_{max}} \rfloor$ RACH association pattern periods. At 1008, the gNB 170 feeds back the index of the strongest received group C (/group D) preamble per SSB ID #x via RAR (Msg2).

Higher-Layer Signaling Aspects

The procedures and embodiments described so far introduce new concepts and quantities as compared to Rel-15/Rel-16 counterparts. As a result, modification to the content of the IE RACH-ConfigCommon as per TS 38.331 would be required to support the adoption of the idea disclosed herein. More precisely, the new RACH-ConfigCommon IE would need to include additional fields and local IEs as compared to its Rel-15 counterpart (and related values), to configure several aspects.

In one aspect, the new RACH-ConfigCommon IE configures the number of preambles used for contention based random access with TX beam sweeping in the RACH resources defined in RACH-ConfigCommon via a specific field. The setting should be consistent with the setting of ssb-perRACHOccasionAndCB-PreamblesPerSSB, i.e., it should be a multiple of the number of SSBs per RACH occasion. If such specific field is absent, the proposed solution for TX beam sweeping UEs cannot be adopted.

In another aspect, the new RACH-ConfigCommon IE configures the transport block size threshold in bits below which the UE shall use a contention-based RA preamble of a first preamble group for beam-sweeping random access signaling (e.g., group C). In another aspect, the new RACH-ConfigCommon IE configures the number of preambles per SSB in group C. This determines implicitly the number of CB preambles per SSB available in a second preamble group for beam-sweeping random access signaling (e.g., group D). In another aspect, the new RACH-ConfigCommon IE configures the power threshold for group D preamble selection (in dB). Value minusinfinity corresponds to −infinity.

This situation could be achieved in several ways. An example of how this could be realized, provided for the sake of clarity, is shown in FIG. 11A and FIG. 11B, where the additions are given by reference numbers 1102 and 1104.

Other choices could be made. However, the additional content added to the IE RACH-ConfigCommon would need to carry information as given in the list above.

Another example relates to a new PRACH configuration with three approaches. The main difference between the examples is on how to identify the UE as a beam sweeping UE or non-sweeping UE, e.g., Rel-15/Rel-16 UEs. The example using the RACH opportunities, configured by the new RACH configuration as described herein, to identify a beam sweeping UE may use or be combined with any of the embodiments or features previously described relating to the preamble group method.

Enabling a comparison where the gNB can compare different msg1 transmissions performed by the same UE over different TX beams, and within a random access attempt, in turn allowing a method of increasing the UL beamforming gain to be identified for msg1/msg3 transmission, is a part of the examples described herein. Another part is how to enable a legacy-transparent way, e.g., transparent to Rel-15/Rel-16 UEs, for new UEs to make the gNB aware that usage of the sweeping RACH procedure is requested. Major novel aspects of the idea include:

1. A method of identifying UEs which make use of the proposed new beam-sweeping RACH procedure that enables the gNB to identify the best uplink TX beam rather than the first beam that the gNB managed to detect. These UEs sweep different TX beams over a set of ROs associated to the chosen SSB beam ID, at least for the initial msg1 transmission (if msg1 retransmission is considered, beam sweeping may or may not take place). This ensures an increase of the effective antenna panel gain by allowing the usage of several focused/high gain beam patterns, as opposed to non-sweeping operation, e.g., Rel-15/Rel-16, which requires the UE to use a single wide/low gain TX beam for both msg1 and msg3 transmission.

2. Creation of a suitable PRACH configuration used exclusively by beam-sweeping UEs. This ensures complete distinguishability between UEs using the new beam-sweeping RACH procedure and UEs using the non-sweeping RACH procedure, i.e., Rel-15/Rel-16. Three approaches to realize this new PRACH configuration are disclosed:

2.1. The set of ROs assigned to beam-sweeping UEs is orthogonal to the one assigned to non-sweeping UE, e.g., Rel-15/Rel-16 UEs. This can be realized, for instance but not only, by providing the beam-sweeping UE a new PRACH configuration table index, which is different from the one provided via higher-layer signaling to non-sweeping UEs, e.g., Rel-15/Rel-16 UEs. Resource occupation is doubled and collision probability is the same as for non-sweeping operation, e.g., Rel-15/Rel-16. Backward compatibility with non-sweeping devices and procedures is ensured.

2.2. The PRACH configuration table index provided to sweeping and non-sweeping UEs is the same. A new bitmask is used to indicate via higher-layer signaling to beam-sweeping UEs which ROs can be used for the sweeping msg1 transmission. Use of other ROs is not possible. Beam-sweeping UEs use a subset of ROs allocated to non-sweeping UEs. Resource occupation is the same as in the non-sweeping case, e.g., Rel-15/Rel-16 operation. Backward compatibility with Rel-15/Rel-16 devices and procedures is ensured.

RO collisions with non-sweeping UEs, e.g., Rel-15/Rel-16 UEs, are possible, when the latter use shared ROs. Hence, at least one new preamble group (here denoted group C), and possibly a second (denoted group D), reserved for beam-sweeping UEs is configured and adopted according to this method. In other words, beam-sweeping UEs communicate their presence, and can thus be identified by the gNB according to the disclosed method, not only by using the configured shared ROs but also by choosing a preamble from group C or D (i.e., non-sweeping UEs would be using only preambles from group A and B over the same shared ROs). Three embodiments are included:

2.2.a. In a preferred embodiment, group C and group D preambles are subsets of the preamble groups for non-sweeping RACH procedure, i.e., A and B, respectively. Hence, the total number of CBRA preambles (legacy groups A and B, and novel groups C and D, as well as, the on-demand SIB triggering group) and CFRA preambles is smaller than or equal to the maximum number of usable preambles for RACH, e.g., 64 in Rel-15/Rel-16.

2.2.b. In another embodiment, group C and group D preambles are defined as an extension "above" the maximum number of usable Rel-15/Rel-16 preambles, which is possible but increases root sequence usage (which is "expensive").

2.2.c. In another embodiment, only one new preamble group is defined. Such group could be a subset of either group A or group B or comprise the union of a subset of group A and a subset of group B. In this case, the new method might be available for only one of the two existing conditions depending on msg3 size as currently used for selection between groups A and B, or the existing selection depending on msg3 size might be unavailable if the new beam-sweeping RACH procedure is used.

Note that the features/elements involving so-called groups C and D share features/elements of the new preamble group embodiment described previously.

2.3 The PRACH configuration table index provided to sweeping and non-sweeping UEs is the same. A new bitmask is used to indicate to non-sweeping UEs which ROs cannot be used for non-sweeping CBRA, e.g., Rel-15/Rel-16 operation. No explicit RO indication is provided to beam-sweeping UEs, which in turn use the bitmask configured for non-sweeping UEs as negative ROs identification. As a result, this embodiment cannot be made fully transparent to non-sweeping UEs, i.e., Rel-15/Rel-16 UEs, thus it is not backward compatible with Rel-15/Rel-16 devices and procedures. Non-sweeping UEs in this case would in fact need to support and respect the new bitmask. Sweeping and non-sweeping UEs use orthogonal time-frequency resources in the same component carrier, and resource occupation is the same as in the non-sweeping case, e.g., Rel-15/Rel-16 operation. A UE using the new beam-sweeping RACH method selects at least one preamble from the configured preamble group(s) and transmits it over one of the available ROs for the beam-sweeping UE, as per the new PRACH configuration. This serves the purpose of indicating to the gNB that a UE is using the new procedure rather than the non-sweeping procedure. No additional signalling from UE to gNB is required, as compared to Rel-15/Rel-16. The detection of a preamble received over one of the ROs configured for beam-sweeping UEs enables the gNB to expect the possibility of multiple preambles and to await reception of all the possible beam-formed versions of that preamble before sending the RAR to beam-sweeping UE(s).

3. A UE sweeping TX beams can use the same preamble index over multiple ROs associated to same SSB beam ID #x, in the same PRACH association pattern period(s). Embodiments include: i. In a preferred embodiment, UE completes one sweep of all its TX beams within one association pattern period. In this case, the minimum latency to receive msg2 would be no longer than that of non-sweeping operation, e.g., Rel-15/Rel-16; ii. In another embodiment, one PRACH association pattern period does not have enough ROs associated to the chosen SSB ID for the UE to complete one sweep of all its TX beams. In this case, the UE sweeping stretches over more than one PRACH association pattern period and the minimum latency to receive msg2 would be larger than that of non-sweeping operation, e.g., Rel-15/Rel-16. This item shares features/elements with the new preamble group example described previously.

4. A new procedure may be adopted by the gNB to form the RAR message, i.e., msg2, by means of which the gNB waits until all the different beamformed versions of msg1 associated to a given SSB beam ID are received, chooses the best one according to a suitable metric (e.g., highest RSRP) and then acknowledges its reception to UEs via msg2. This item shares elements/features with the new preamble group example discussed previously.

The example method at a high-level includes (refer also to FIG. 12): 1. At 1204, the UE transmits several beam-formed higher gain msg1s sequentially, each msg1 being transmitted using a different TX beam. Different ROs are used for the transmission of each of the msg1s; 2. Each msg1 is uniquely identifiable by the RO in which it is transmitted. (The UE knows the association between RO and beam); 3. Upon reception of a preamble in an RO configured for the new beam-sweeping RACH procedure (or a preamble from group C, or D if defined, in case of shared ROs between beam-sweeping and non-sweeping UEs), the gNB switches to the new UE beam-sweeping RACH reception procedure for the msg1 index/RO combinations concerned; 4. At 1206, the gNB informs the UE about the best msg1 preamble/RO combination in the context of the msg2 transmission; 5. The UE uses the received information to configure the best beam for msg3 transmission at 1208 with high antenna panel gain, which in turn depends on the number of used msg1 sweeps (further details are given herein).

Figure 12:
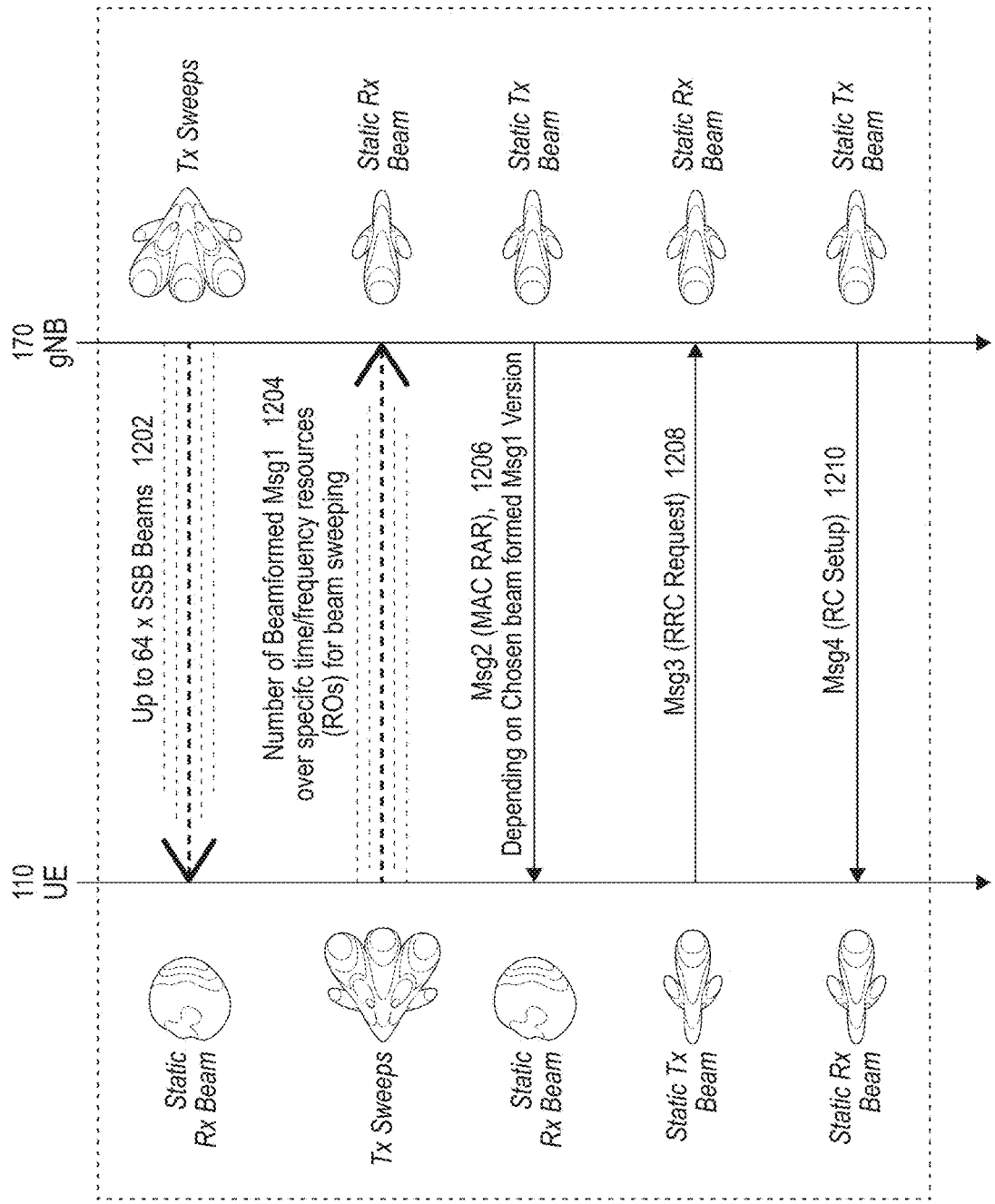
FIG. 12 illustrates an example random-access procedure including TX beam sweep for msg1 transmission, based on the examples described herein.

FIG. 12 depicts how the new PRACH configuration example would be integrated into the current standard procedure illustrated in FIG. 2. Also shown by the example of FIG. 12, at 1202, the gNB 170 preliminarily (e.g., prior to step 1204) transmits up to 64 SSB beams to the UE 110. At 1210, the gNB 170 transmits msg4 (RRC setup) to the UE 110.

Thus, the examples described herein include a method of feeding back information on the selected one of a plurality of different UE beams using RAR in general, and using a preconfigured subset of ROs to identify different UE beams in particular, from the gNB point of view. The method further includes using suitable new preamble indices (i.e., not part of group A/B) to identify UEs transmitting multiple beamformed msg1s, each of which is associated with one RO in a plurality of preconfigured ROs for beam-sweeping UEs and comprises one RACH preamble, when the preconfigured subset of ROs for the beam-sweeping procedure is not exclusively accessible to beam-sweeping UEs. At the UE side, the method includes the UE's attempt of transmitting multiple beamformed msg1s, each of which is associated with one RO in a plurality of preconfigured ROs for beam-sweeping UEs and at least one RACH preamble. The UE can also select a limited set of beams for its RACH msg1 transmission, depending on its selected SSB beam as received from the gNB.

As discussed previously, the introduction of UE side TX beam-sweeping in RACH is fundamentally incompatible with the non-sweeping RACH procedure, e.g., Rel-15/Rel-16 operation. Described herein is a new method and procedure for PRACH configuration whose target is to enable the gNB to identify UEs which perform multiple beam-formed msg1 transmissions, at least for the initial msg1 transmission (if msg1 retransmission is considered, beam-sweeping may or may not take place). Each of these transmissions is performed using a different TX beam and occurs over one RO associated to the chosen SSB beam ID. The new method and procedure for PRACH configuration also enables the gNB to identify the best uplink TX beam, rather than the first beam that the gNB managed to detect, and communicate this choice to the beam-sweeping UE.

Considering the high-level description of the new PRACH configuration idea described above including that which is shown in FIG. 12, additional signaling and algorithmic details are now described, organizing their description according to the following numbered list of items (for simplicity re-summarized here):

1. A new PRACH configuration method is provided to guarantee complete distinguishability at the gNB between UEs using the new beam-sweeping RACH procedure and UEs using the non-sweeping RACH procedure, e.g., Rel-15/Rel-16 operation. Three approaches to realize this new PRACH configuration are disclosed:
1.a. A new PRACH configuration is provided via higher-layer signaling to beam-sweeping UEs, by which orthogonality of time-frequency resources assigned in the same component carrier to non-sweeping UEs is ensured.
1.b. The PRACH configuration table index provided to sweeping and non-sweeping UEs is the same. A new bitmask is provided via a higher-layer (e.g., higher layer signaling) to beam-sweeping UEs to indicate which ROs can be used for the sweeping msg1 transmission. Beam-sweeping UEs use a subset of ROs allocated to non-sweeping UEs, i.e., such ROs are shared between beam-sweeping and non-sweeping UEs. Use of other ROs by beam-sweeping UEs is not possible.
1.c. The PRACH configuration table index provided to sweeping and non-sweeping UEs is the same. A new bitmask is added to the CBRA configuration via a higher-layer to indicate to non-sweeping UEs which ROs cannot be used for the legacy CBRA. No explicit RO indication is provided to beam-sweeping UEs, which in turn use the bitmask configured for non-sweeping UEs as negative ROs identification.
2. A UE sweeping TX beams can use the same preamble index over multiple ROs associated to same SSB beam ID #x, in the same PRACH association pattern period (s).
3. A new procedure is adopted by the gNB to form a new RAR message, i.e., msg2.

Item 1—New PRACH Configuration Method for Enabling Beam-Sweeping Msg1 Transmission.

Described herein is a method of identifying UEs that use a new beam-sweeping RACH procedure over pre-configured time-frequency resources (exclusive or shared). A suitable new PRACH configuration used exclusively by beam-sweeping UEs can be created according to three approaches (described herein as subitem 1.a, subitem 1.b, and subitem 1.c.).

Subitem 1.a—Legacy Transparent Configuration of Time-Frequency Orthogonal PRACH Resources for Beam-Sweeping UEs A PRACH configuration via higher-layer signaling to beam-sweeping UEs identifies a set of time-frequency resources which are orthogonal to the ones assigned to non-sweeping UEs, e.g., Rel-15/Rel-16 UEs. The latter are oblivious of the presence of the beam-sweeping UEs and can be configured in a backward compatible way. Resource occupation is doubled and collision probability is the same as for non-sweeping operation, e.g., Rel-15/Rel-16. Backward compatibility with non-sweeping devices and procedures is ensured.

Several possibilities exist to realize this configuration. Described herein are three examples of suitable higher-layer signaling, for completeness.

Figure 13:
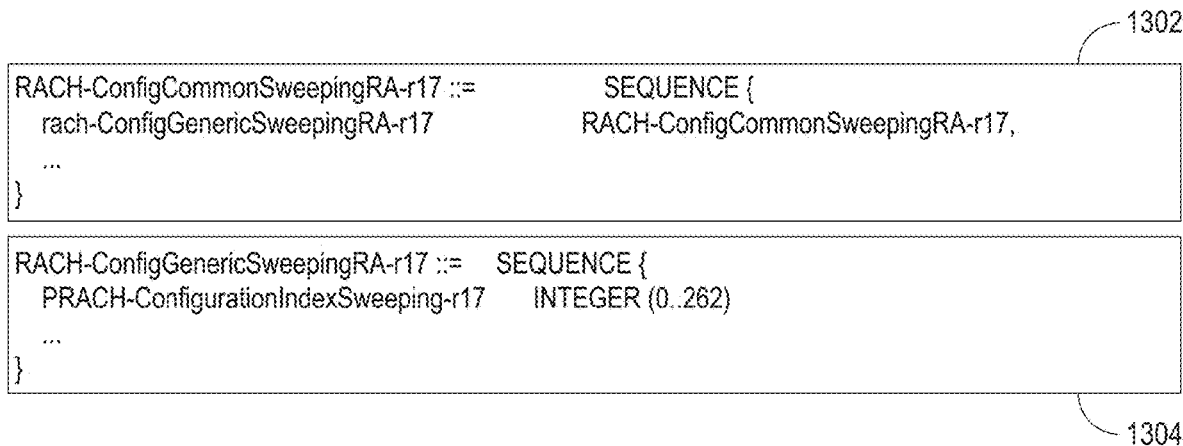
FIG. 13 shows an example of two IEs for beam-sweeping UEs, based on the examples described herein.

In a first embodiment, two new IEs for beam-sweeping UEs are created, e.g., RACH-ConfigCommonSweepingRA-17 and RACH-ConfigGenericSweepingRA-17 by means of which at least a PRACH configuration index different from the one present in the IE RACH-ConfigGeneric (as per, for instance, Rel-15/Rel-16) is given only to beam-sweeping UEs. The PRACH configuration index may be taken from the 262 available indices in 3GPP Rel-16. FIG. 13 demonstrates an example of this embodiment, with implementations of the RACH-ConfigCommonSweepingRA-17 IE 1302 and the RACH-ConfigGenericSweepingRA-17 IE 1304.

Figure 14:
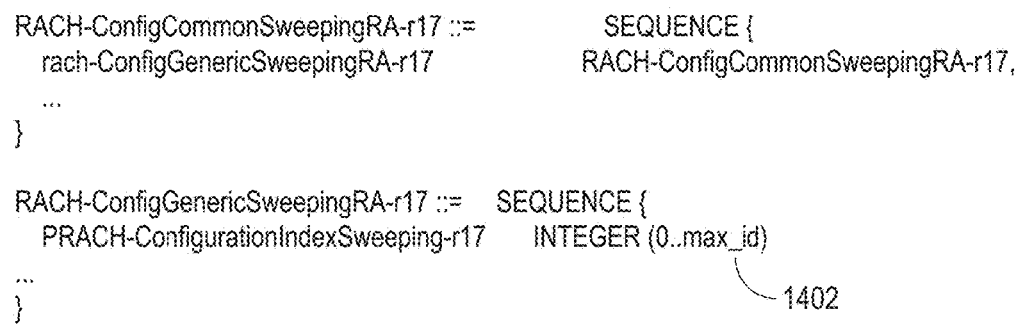
FIG. 14 shows another example of two IEs for beam-sweeping UEs, based on the examples described herein.

In a second embodiment, the PRACH configuration index given to beam-sweeping UEs may be one of the max_id available indices in a future 3GPP release, in which (max_id-262) additional PRACH configuration indices are added on top of the available ones in 3GPP Rel-16. Refer to reference number 1402 of FIG. 14 referring to the max_id.

In a third embodiment, the PRACH configuration table index given to beam-sweeping UEs and non-sweeping UE, e.g., Rel-15/Rel-16 UEs, is the same. However, a different frame offset and/or slot offset and/or offset of lowest PRACH transmission occasion in the frequency domain with respect to PRB 0 is assigned to the PRACH configuration for beam-sweeping UEs. This could be realized, for instance, by adding a new IE RACH-ConfigCommon-Sweeping-r17 in which the three aforementioned parameters are given to and used by beam-sweeping UEs, in three suitable fields. FIG. 15 is an implementation of such a RACH-ConfigCommonSweeping-r17 IE 1500, showing the frame offset 1504, slot offset 1506, and offset 1502 of lowest PRACH transmission occasion in the frequency domain with respect to PRB 0.

Subitem 1.b—Legacy Transparent Configuration of Shared PRACH Resources for Beam-Sweeping UEs Here the PRACH configuration table index provided to both sweeping and non-sweeping UEs is the same. Suitable higher-layer signaling, e.g., and most likely, a bitmask, is added to indicate to beam-sweeping UEs, which ROs they can use for msg1 transmission. In other words, beam-sweeping UEs are configured to use a subset of ROs allocated to non-sweeping UEs. Other ROs cannot be used by beam-sweeping UEs. Resource occupation is the same as in the non-sweeping case, e.g., Rel-15/Rel-16 operation. Backward compatibility with non-sweeping devices and procedures is ensured.

On the other hand, collisions may occur between the msg1 transmissions of beam-sweeping and non-sweeping UEs, when both select the same shared RO. Moreover, the gNB cannot reliably differentiate between beam-sweeping and non-sweeping UEs, based on RO usage for msg1. Hence, at least one new preamble group (here denoted group C), and possibly a second (denoted group D), reserved for beam-sweeping UEs is configured and adopted according to this method. In the general case, more than two new preamble groups could be defined, enabling the UEs that use the new beam-sweeping RACH procedure to be further distinguished according to multiple criteria rather than the single criterion used today based on msg3 size and distinguished by groups A & B (resp. C & D). In other words, beam-sweeping UEs communicate their presence, and can thus be identified by the gNB according to the disclosed method, not only by using the configured shared ROs but also by choosing a preamble from group C or D (i.e., non-sweeping UEs would be using only preambles from group A and B). Embodiments include:

a. In a preferred embodiment, group C and group D preambles are subsets of the preamble groups for non-sweeping RACH procedure, i.e., A and B, respectively. Hence, the total number of CBRA preambles (legacy groups A and B, and novel groups C and D, as well as, the on-demand SIB triggering group) and CFRA preambles is smaller than or equal to the maximum number of usable preambles for RACH, e.g., 64 in Rel-15/Rel-16.

b. In another embodiment, group C and group D preambles are defined as an extension "above" the maximum number of usable Rel-15/Rel-16 preambles, which is possible but increases root sequence usage (which is "expensive"). In another embodiment, group C and group D preambles are defined as an extension "above" the maximum number of usable Rel-15/Rel-16 preambles, which is possible but increases root sequence usage (which is "expensive").

c. In another embodiment, only one new preamble group is defined. Such group could be a subset of either group A or group B or comprise the union of a subset of group A and a subset of group B. In this case, the new method might be available for only one of the two existing conditions depending on msg3 size as currently used for selection between groups A and B, or the existing selection depending on msg3 size might be unavailable if the new beam-sweeping RACH procedure is used.

The discussion herein involving groups C and D, share elements/features with the new preamble group example.

Support for the adoption to this embodiment could be added, for instance, by creating another new IE RACH-ConfigCommonSweeping-r17 1600, as shown in FIG. 16. The new IE would include additional fields and local IEs as compared to its Rel-15/Rel-16 counterpart (and related values), where items from "b)" to "e)" are sharing elements/features with the new preamble group embodiment, to configure: a) An explicitly signalled PRACH bitmask, e.g., SSB-SweepingSharedRO-MaskIndex-r17 1604, that indicates the subset of ROs configured for non-sweeping UEs which are shared with beam-sweeping UEs for each SSB beam ID. This field would be configured when there is more than one RO per SSB. If the field is absent, and this embodiment is adopted, then all ROs are shared; b) The number of preambles used for contention based random access with TX beam-sweeping in the RACH resources defined in RACH-ConfigCommon (refer to 1602). The setting should be consistent with the setting of ssb-perRA-CHOccasionAndCB-PreamblesPerSSB, i.e., it should be a multiple of the number of SSBs per RACH occasion. If the field is absent, the proposed solution for TX beam sweeping UEs cannot be adopted; c) A transport block size threshold in bits below which the UE shall use a contention-based RA preamble of group C—1606; d) The number of preambles per SSB in group C—1610. This determines implicitly the number of CB preambles per SSB available in group D; e) A power threshold for group D preamble selection (in dB)—refer to 1608, where value minusinfinity corresponds to −infinity.

Thus, an example of how this could be realized is the new IE RACH-ConfigCommonSweeping-r17 1600, shown in FIG. 16, in which the three aforementioned parameters are given to and used by beam-sweeping UEs, in three suitable fields.

Subitem 1.c—Non-Backward-Compatible Configuration of PRACH Resources for Beam-Sweeping UEs.

Figures 17, 18:
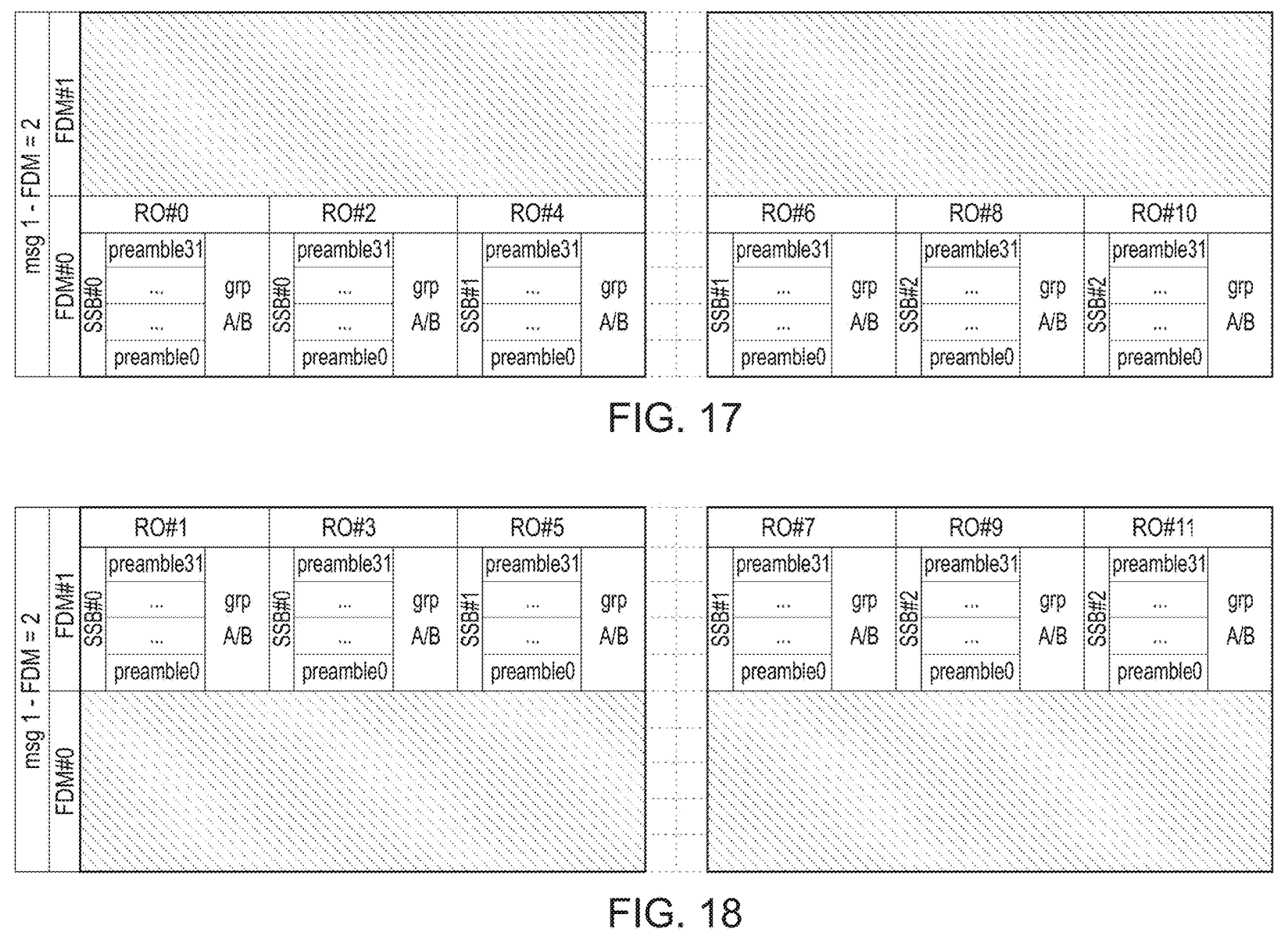

The PRACH configuration table index provided to sweeping and non-sweeping UEs is the same. No new IE is created as compared to Rel-15/Rel-16, but a new bitmask, e.g., ra-ssb-SweepingOccasionMaskIndex-r17, is included in IE RACH-ConfigCommon and used to indicate non-sweeping UEs which ROs cannot be used for the non-sweeping CBRA, e.g., as per Rel-15/Rel-16 operation. No explicit RO indication is provided to beam-sweeping UEs, which in turn use the bitmask configured for non-sweeping UEs as negative ROs identification. This embodiment cannot be made fully transparent to non-sweeping UEs, thus it is not backward compatible with non-sweeping devices and procedures, e.g., as per Rel-15/Rel-16. On the other hand, resource occupation is the same as in the non-sweeping case, e.g., Rel-15/Rel-16 operation, and the two sets of UEs use orthogonal time-frequency resources in the same component carrier. A UE using the new beam-sweeping RACH method selects at least one preamble from the configured preamble group(s) and transmits it over one of the available ROs for the beam-sweeping UE, as per the new PRACH configuration. This serves the purpose of indicating to the gNB that a UE is using the new procedure. In fact, the reception of a preamble over one of the ROs configured for beam-sweeping UEs implicitly indicates to the gNB to await reception of all the possible beam-formed versions of that preamble before sending the RAR to beam-sweeping UE(s). This example situation is graphically illustrated in FIG. 17, FIG. 18, and FIG. 19, where even-numbered ROs are assigned to non-sweeping UEs and odd-numbered ROs are assigned to beam-sweeping UEs.

As discussed earlier, RACH-ConfigCommon as per TS 38.331 could be modified to add support to this embodiment, as demonstrated in FIG. 20, with the single required addition marked as item 2002.

Item 2—Msg1 Transmission for Beam-Sweeping UEs.

Item 2 shares elements/features with the new preamble group examples.

Once a beam-sweeping UEs receives the new PRACH configuration, beamformed msg1 transmission can be performed. For the procedure to be effective, each RACH msg1 transmission with a preamble/RO combination shall be associated with one (and the same) unique UE TX beam, or a TX spatial filter. The choice of such association is up to the UE's implementation, transparent to the gNB. From the UE point of view, a RACH preamble/RO combination is directly related to one TX beam.

In its simplest form, this procedure requires the UE to be able to use a minimum number of Z preamble IDs for indicating the selected SSB ID using beamformed msg1 transmissions.

As described previously, UEs operating according to this idea use different ROs associated to the selected beam SSB ID for the transmission of each beamformed msg1 copy. Each msg1 transmission/RO combination (with corresponding beam choice) is unique for the gNB to be able to differentiate between them.

In 3GPP Rel-15/16, the DCI used to schedule the RAR related to a correctly decoded preamble over the PDSCH is scrambled by the gNB using a RA-RNTI value associated with the PRACH occasion in which the preamble has been transmitted, such value being computed as $$\text{RA-RNTI}=1+s_{id}+14\times t_{id}+14\times 80\times f_{id}+14\times 80\times 8\times ul\_carrier\_id$$

where $s_{id}$ is the index of the first OFDM symbol of the PRACH occasion ($0\leq s_{id}<14$), $t_{id}$ is the index of the first slot of the PRACH occasion in a system frame ($0\leq t_{id}<80$), $f_{id}$ is the index of the PRACH occasion in the frequency domain ($0\leq f_{id}<8$), and ul_carrier_id is the UL carrier used for random access preamble transmission (0 for NUL carrier, and 1 for SUL carrier).

In other words, a 1:1 mapping can be established in each uniquely identifiable RO identification period between one RO and its corresponding RA-RNTI value. This observation implies that, if N≤1, one RA-RNTI value can be mapped to one SSB ID, given that at the most one SSB ID is associated to each configured RO. Conversely, if N>1, one RA-RNTI value can correspond to more than one SSB ID. Thus, when N≤1, only one preamble ID per uniquely identifiable RO identification period between one RO and its corresponding RA-RNTI value is needed to enable the TX beam sweeping. When N>1, N preamble IDs per uniquely identifiable RO identification period between one RO and its corresponding RA-RNTI values are needed to enable the TX beam sweeping.

If more than one uniquely identifiable RO identification period have the same PRACH configuration, the RA-RNTI associated to the same RO is the same for such uniquely identifiable RO identification period, i.e., the UE cannot differentiate between them. In this case, the UE would need a larger number of preamble IDs to complete one beamformed msg1 transmission. For instance, the duration of such "uniquely identifiable RO identification period" is 80 slots in 3GPP NR but might be different for other radio technologies.

These considerations explain why the minimum number of preamble IDs a UE needs to use for the beam-sweeping msg1 transmission is Z≥max{1, N}, where Z=max{1, N} is the most likely (but not the only possible) condition one can expect in practical deployments.

Item 3—Procedure for gNB to Form RAR for Beam-Sweeping UEs.

Item 3 shares elements/features with the new preamble group examples.

Let $L_{UE_{max}}$ be the number of TX beams the UE uses to sweep. This parameter is known at the gNB, e.g., by specification. Upon reception of preamble ID #p in a RO configured for beam-sweeping UEs, the gNB checks how many preamble ID #p versions have already been received since the last RAR related to that preamble ID has been given. Two possibilities exist, namely $L_{UE_{max}}-1$ versions have already been received, or less than $L_{UE_{max}}-1$ versions have already been received.

If $L_{UE_{max}}-1$ versions have already been received, then the gNB indicates via RAR (msg2) both the preamble ID #p and the RA-RNTI associated to the RO in which its strongest among the $L_{UE_{max}}$ received versions has been detected. If less than $L_{UE_{max}}-1$ versions have already been received, then the gNB waits until such value is attained before creating the RAR. Described herein are two embodiments related to this example, whose major difference is the minimum latency at which the procedure can be completed.

In a preferred embodiment, at least $L_{UE_{max}}$ ROs per SSB beam ID are configured per association pattern period. In this case, the UE completes one sweep of all its TX beams within one association pattern period and the minimum latency to receive msg2 from gNB would be identical to that of non-sweeping operations, e.g., as per Rel-15/Rel-16.

Figure 21:
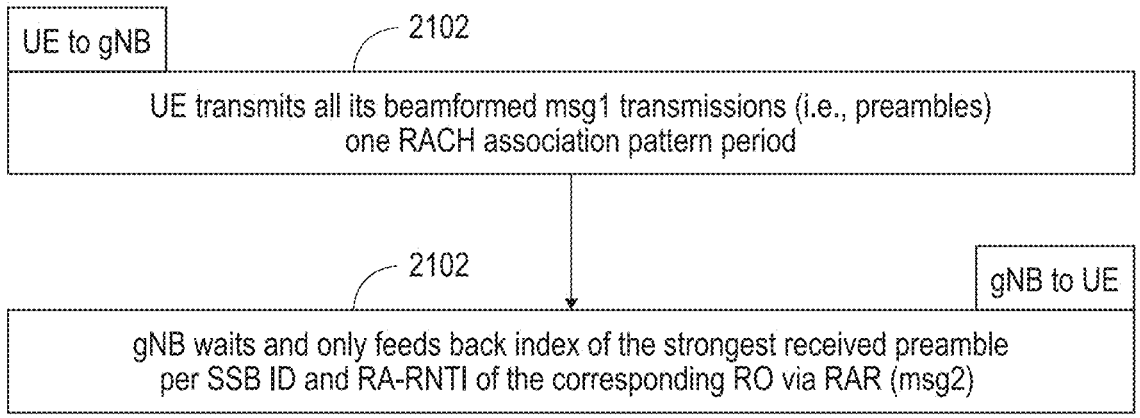
FIG. 21 shows another example minimum latency embodiment, based on the examples described herein.

A diagram describing the sequence of operations performed by both beam-sweeping UEs and gNB according to the preferred minimum-latency embodiment is provided in FIG. 21. At 2101, the UE transmits to the gNB all its beamformed msg1 transmissions (i.e., preambles) within one RACH association pattern period. At 2104, the gNB waits and only feeds back the index of the strongest received preamble per SSB ID and RA-RNTI of the corresponding RO via RAR (msg2).

In another embodiment, less than $L_{UE_{max}}$ ROs associated to SSB beam ID #x are configured per PRACH association pattern period. In this case, one TX beam sweep stretches over more than one PRACH association pattern period and the minimum latency to receive msg2 from gNB would be $\lfloor \min\{1,N\}\times L_{UE_{max}}\rfloor$ association pattern periods, i.e., larger than that of legacy state-of-the-art operations.

Figure 22:
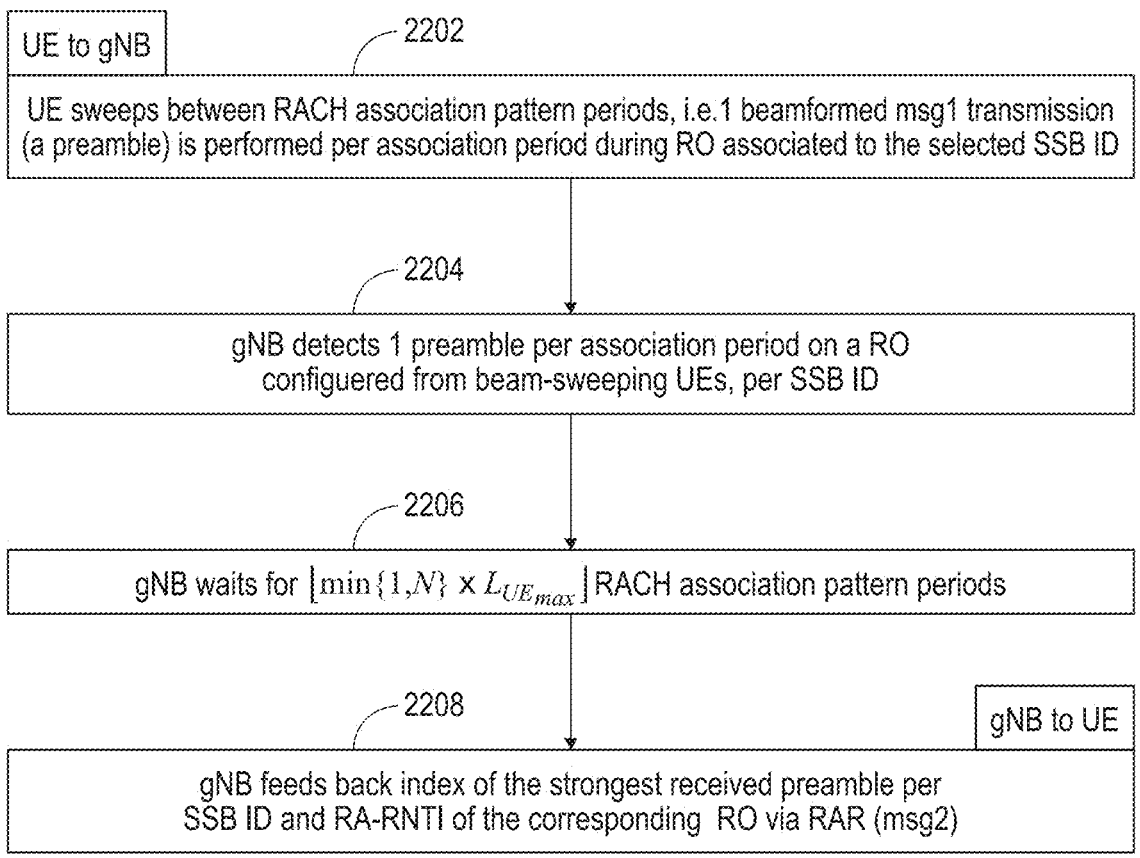
FIG. 22 shows another example normal latency embodiment, based on the examples described herein.

A diagram describing the sequence of operations performed by both beam-sweeping UEs and the gNB according to the normal latency embodiment is provided in FIG. 22. The signaling direction of items 2202, 2204, and 2206 is from the UE 110 to the gNB 170, and the signaling direction of item 2208 is from the gNB 170 to the UE 110. At 2202, the UE sweeps between RACH association pattern periods, i.e. 1 beamformed msg1 transmission (a preamble) is performed per association period during the RO associated to the selected SSB ID. At 2204, the gNB detects 1 preamble per association period on a RO configured from beam-sweeping UEs, per SSB ID. At 2206, the gNB waits for $\lfloor \min\{1,N\}\times L_{UE_{max}}\rfloor$ RACH association pattern periods. At 2208, the gNB feeds back the index of the strongest received preamble per SSB ID and RA-RNTI of the corresponding RO via RAR (msg2).

Another example is described herein that relates to how to identify the UE 110 as a beam sweeping UE or legacy UE. This method includes three approaches on PRACH resource placement in a component carrier or initial bandwidth part. In addition to knowledge about how ROs are derived from the PRACH settings, background is described herein about where those ROs are located with respect to component carriers (CCs) and bandwidth parts (BWPs).

Figure 23:
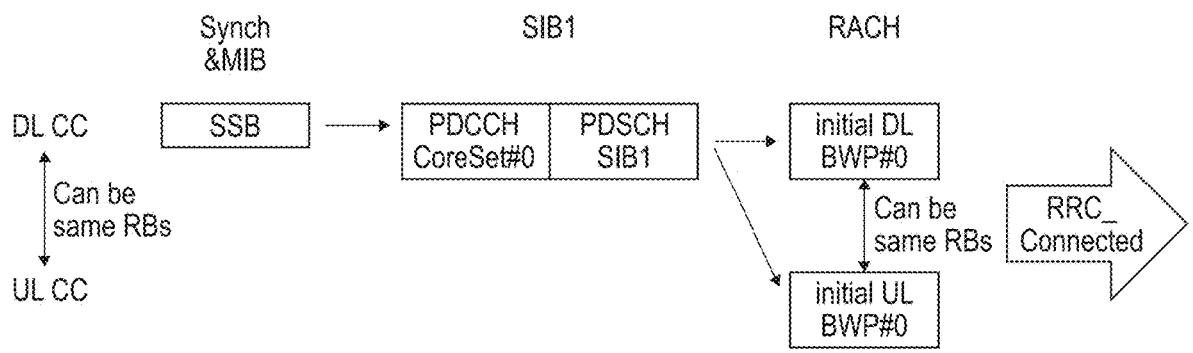
FIG. 23 shows a legacy (Rel-15/16) RACH setup procedure.

FIG. 23 describes how the SIB1 (system information block 1) is obtained following SSB/PBCH decoding. SIB1 contains (among other fields) information on the location and size of the initial UL BWP. The initial UL BWP accommodates the ROs on which the UE transmits the msg1 to start the message exchanges involved in RACH. After successful RACH, the UE is in RRC_Connected mode.

A data connection to a UE might comprise transmission on more than one CC, in carrier aggregation (CA) and supplemental uplink/downlink (SUL/SDL) operation.

Figure 24:
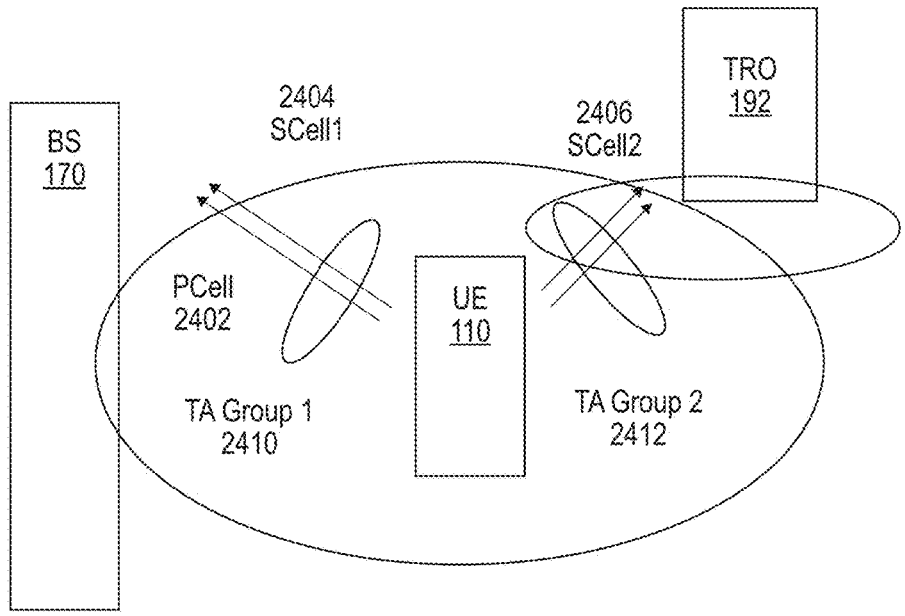
FIG. 24 shows an example setup of carrier aggregation with 4 CCs.

FIG. 24 shows an example of CA with four CCs (PCell 2402, SCell1 2404, SCell2 2406, SCell3 2408). Also shown in FIG. 24 are UE 110, RAN node 170 (e.g., a gNB), TRP 192, TA Group1 2410, and TA Group2 2412.

It is of note that SSBs are transmitted on all CCs of any 3GPP NR Rel-15/Rel-16 communication system; SSB less operation is a non-mandatory UE capability (e.g., FeatureSetDownlink>scellWithoutSSB), as Layer1/Layer3 measurements often rely on SSBs. In particular, the addition of a new CC in the case of CA requires measurement of the serving cell and neighbor cell signal strength or signal quality. On the other hand, CBRA is only possible on the CC constituting a special cell (SpCell), despite the presence of SSB in CCs that belong to (possible) SCells.

For dual connectivity (DC) operation, the term special cell refers to the PCell of the MCG or the PSCell of the SCG depending on if the MAC entity is associated to the MCG or the SCG, respectively. Otherwise the term Special Cell refers to the PCell 2402. A Special Cell supports PUCCH transmission and contention based random access and is always activated.

The SSB are transmitted on a coarser frequency raster than the normal RB raster. This helps limiting the number of blind decodings to be done by a UE 110 to find an SSB. It is optional for the MIB to contain a SIB1 "indication" or for a SIB1 to contain a ServingCellConfigCommonSIB field (or a ServingCellConfigCommonSIB>UplinkConfigCommon [SIB] field), hence it can be indicated that RACH cannot be done on some CCs that still carry SSB, e.g., because such CCs are intended to be used for SCells only. A certain CC could carry a PCell 2402 for one UE 110 and the SCell of a second UE at the same time. Such a configuration is, however, avoided in practical systems, especially when the PCell 2402 and SCell BWPs would overlap.

In case the UE 110 found (via blind detection) a SSB, whose MIB contains a field ssb-SubcarrierOffset, which indicates that SIB1 is absent (i.e., this cell does not support CBRA), then the SSB/MIB gives the UE an indication on where to look for a SSB leading to a CBRA opportunity (or at least where not to look). To do this, the MIB field pdcch-ConfigSIB1 changes its normal interpretation and now indicates the frequency positions where the UE may find an SSB with SIB1 or the frequency range where the network does not provide SSB with SIB1.

In summary, there are primary cells in certain CCs that indicate their readiness for CBRA via the MIB contained in the SSB (SS/PBCH block in this case, not only the SSB beam), and there are also secondary cells in certain CCs that indicate that they, i.e., their CCs, cannot be used for CBRA via SSB/MIB.

Two issues the examples described herein address and provide a solution for are issue 1) A comparison of different msg1 transmissions performed by the same UE over different TX beams, cannot be realized by the state-of-the-art gNB within a random-access attempt. This prohibits the adoption of a constructive method to maximize the UL beamforming gain for msg1/msg3 transmission, given a specific RF configuration at the UE; and issue 2) A 3GPP NR Rel-15/Rel-16 transparent way for beam sweeping initial access capable UEs to make the gNB aware that usage of the sweeping RACH procedure is requested, to extend coverage of msg1/3, does not exist either in specification or the prior art.

The solution to issue 2 includes a method of identifying UEs, which make use of the proposed new beam-sweeping RACH procedure that enables the gNB to identify the best uplink TX beam rather than the first beam that the gNB managed to detect. This involves creation of suitable non-sweeping UE transparent PRACH resource placement in the component carrier (CC) or initial bandwidth part (BWP) domain, used exclusively by beam-sweeping UEs. This ensures complete distinguishability between UEs using the new beam-sweeping RACH procedure and UEs using the non-sweeping RACH procedure.

The following bandwidth part based approaches to realize this new sweeping PRACH opportunity configuration are disclosed, including a new field in SIB1, that generates a new initial UL BWP (in the legacy SpCell CC) to be used exclusively for ROs used by sweeping PRACH. Non-sweeping UEs ignore fields that are unknown and are thus not aware of these ROs.

The following component carrier based approaches to realize this new sweeping PRACH opportunity configuration are disclosed, including some CC(s) in MCG SCells, i.e., in carrier aggregation, or SCG PsCells/SCells, i.e., in supplementary uplink, are exclusively carrying ROs for sweeping PRACH. To identify themselves, such cells place secondary SSBs off-raster to legacy SSBs (in time domain and/or frequency domain; time domain preferred). The secondary SSBs contain a MIB with valid SIB1 indication. A sweeping enabled UE searches also for off-raster SSBs and does sweeping RACH on the (traditionally configured) ROs of off-raster SSB SCells/CCs.

The following bandwidth part and component carrier based approaches to realize this new sweeping PRACH opportunity configuration are disclosed, including new fields in SIB1: one that links towards a specific CC, and one that generates a new initial UL BWP to be used exclusively for ROs used by sweeping PRACH in the specific CC. Usually the specific CC is a previously not-RACH-able SCell CC. I.e., the SIB1 on a primary CC points to an initial BWP on a secondary CC. Non-sweeping UEs ignore fields that are unknown and are thus not aware of these ROs.

The solution to issue 1 allows the gNB 170 to compare different msg1 transmissions performed by the same UE 110 over different TX beams, and within a random-access attempt, in turn allowing a method for maximizing the UL beamforming gain for msg1/msg3 transmission (thus, its coverage).

The solution to issue (2) shares elements and features the examples described previously related to the new preamble group and the new PRACH configuration. As described previously, a UE that is sweeping TX beams can use the same preamble index over multiple ROs associated to the same SSB beam ID #x, in the same PRACH association pattern period(s). This minimization of preamble usage is a main distinguishing factor over the state of the art and dominates the msg2 content.

The solution to issue 2 for the BWP or carrier configuration examples is similar to the examples described previously and as shown in FIG. 4 and FIG. 12, and can likewise be integrated into the current procedure illustrated in FIG. 2 in a similar way. However, for the BWP or carrier configuration examples, the gNB switches to the new UE beam sweeping RACH reception procedure for the msg1 index/RO combinations concerned upon reception of a preamble in a RO pertaining to the configured non-sweeping UE transparent CCs/BWPs for the new beam sweeping RACH procedure. Recall that for the new preamble group examples, the gNB switches to the new UE beam sweeping RACH reception procedure for the msg1 index/RO combinations concerned upon reception of a preamble from the new groups C (or D if defined), and for the PRACH configuration examples, the gNB switches to the new UE beam sweeping RACH reception procedure for the msg1 index/RO combinations concerned upon reception of a preamble in an RO configured for the new beam sweeping RACH procedure (or a preamble from group C, or D if defined, in case of shared ROs between the two sets of UEs). The BWP or carrier configuration examples use ROs on non-sweeping UE transparent BWPs and CCs to identify UEs transmitting RACH msg1 with multiple beams Accordingly, a non-sweeping UE transparent PRACH resource placement in CC or initial BWP domain method is described to guarantee complete distinguishability at the gNB between UEs using the new beam-sweeping RACH procedure and UEs using the non-sweeping RACH procedure. Three approaches to realize this new PRACH configuration are elaborated:

1.a. Place a new sweeping RACH enabled BWP in the legacy SpCell CC, including non-sweeping UE transparent communication of its existence via new SIB1 field. 1.b. Place a new sweeping RACH enabled BWP in a SCell CC, not previously usable for initial RACH. Non-sweeping UE transparent communication of its existence via off-raster SSB, leading to non-sweeping UE transparent SIB 1. 1.c. Place a new sweeping RACH enabled BWP in a CC, that was not previously usable for initial RACH. The sweeping RACH enabled CC/BWP is outside the CC used for initial SSB and non-sweeping initial RACH. The new CC/BWP is explicitly signaled via new fields in the initial SSB indicated SIB1.

Similar to the new preamble group and PRACH configuration examples, for the BWP and carrier configuration examples, a UE sweeping TX beams can use the same preamble index over multiple ROs associated to same SSB beam ID #x, in the same PRACH association pattern period(s). Also similar to the new preamble group and PRACH configuration examples, for the BWP and carrier configuration examples, a procedure is adopted by the gNB 170 to form a new RAR message, i.e., msg2.

Item 4—New Non-Sweeping UE Transparent PRACH Resource Placement in CC or Initial BWP Domain for Enabling Beam-Sweeping Msg1 Transmission Described is a method of identifying UEs that use a new beam-sweeping RACH procedure over exclusive pre-configured time-frequency resources. A suitable new PRACH configuration used exclusively by beam-sweeping UEs can be created according to the following three approaches labeled as subitem 4.a, subitem 4.b, and subitem 4.c Subitem 4.a—New Sweeping RACH Enabled BWP in the SpCell CC In the following the details to realize a purely bandwidth part based approach to create non-sweeping UE transparent initial PRACH opportunities are disclosed.

As stated before, the goal is to define a new field in the SIB1 message, carried by the legacy SSB's CC, that generates a new initial UL BWP (in the legacy SpCell CC) to be used exclusively for ROs used by sweeping PRACH. Non-sweeping UEs ignore fields that are unknown and are thus not aware of these new seeping ROs. Thus, backward compatibility with non-sweeping devices and procedures is ensured.

Figure 25:
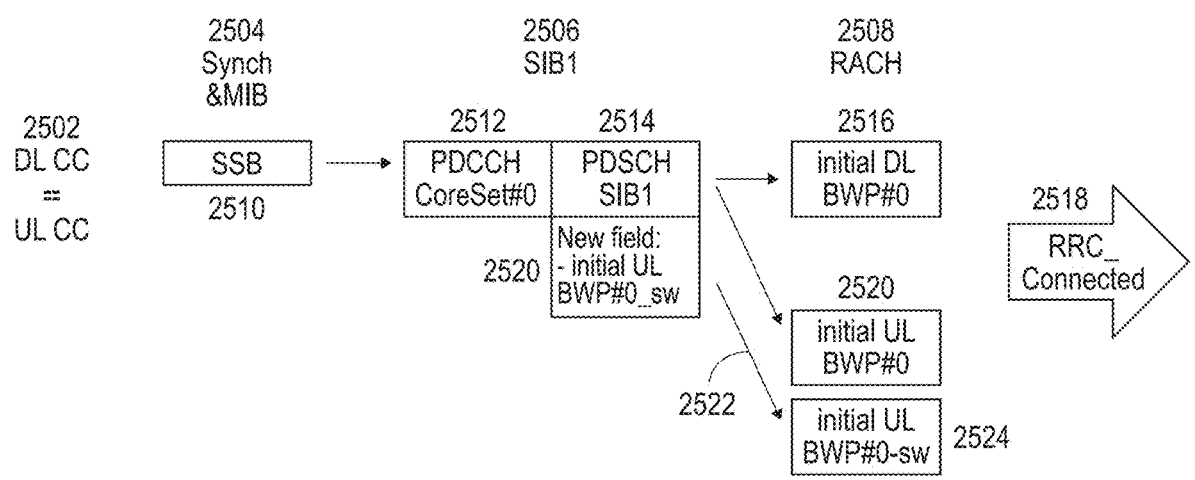
FIG. 25 shows an example sweeping RACH enabled BWP in the legacy SpCell CC.

The required new signaling and timing of said signaling is disclosed in FIG. 25. The new signaling includes 2520 (New field: initial UL BWP #0_sw), signaling 2522, and initial UL BWP #0_sw 2524.

The SIB1 2506 (system information block 1) is obtained following SSB decoding 2510. SIB1 2506 contains (among other things) information on the location and size of the initial UL BWP. The initial UL BWP accommodates the ROs on which the UE 110 transmits the msg1 to start the message exchanges involved in RACH 2508. After successful RACH 2508, the UE 110 is in RRC_Connected mode 2518. FIG. 25 shows DL CC and UL CC 250, and signaling associated with Synch & MIB 2504, SIB1 2506, and RACH 2508. Also shown in FIG. 25 is PDCCH CoReSet #0 2512, PDSCH SIB1 2514, initial DL BWP #0 2516, and initial UL BWP #0 2520.

The most likely implementation of the new SIB1 field in the RRC spec, would look as shown in FIG. 26 (this is an example implementation and the actual implementation of the new SIB1 field may differ somewhat). In one embodiment, two new IEs for beam-sweeping UEs are created, e.g., initialUplinkBWPSweeping-r18 2602 and timeAlignmentTimerCommonSweeping-r18 2604.

The first IE (initialUplinkBWPSweeping-r18 2602) uses the same content format as the classical IE "initialUplinkBWP" 2601 however contains an adapted configuration field "BWP>locationAndBandwidth" (frequency domain location and bandwidth of this bandwidth part) and "BWP-UplinkCommon>rach-ConfigCommon" that defines a new initial UL BWP and corresponding ROs to be used for sweeping RACH. The sweeping BWP may overlap the non-sweeping BWP, as long as the ROs do not overlap and the ROs, as well as other message exchanges, are not interfered by any new signaling.

The second IE (timeAlignmentTimerCommonSweeping-r18 2604 contains a value in ms of the timeAlignmentTimer for the sweeping BWP, in case it is different from the non-sweeping one 2603. Since sweeping UEs are more rare than classical UEs, might consume more resources, and might be on a relatively distant BWP, it is conceivable to adjust this timer (longer for less resources and low speed sweeping UEs, shorter in case of less favorable propagation conditions).

For item 4, subitem 4.a is the preferred implementation, since it has no obvious drawbacks. However, it lacks the flexibility to ask the sweeping UE to RACH on previously unusable CCs.

Subitem 4.b—New Sweeping RACH Enabled BWP in a SCell CC

In the following the details to realize a purely component carrier based approach to create non-sweeping UE transparent initial PRACH opportunities are disclosed. As described before, the goal is to use CCs that were not previously useable for initial RACH to exclusively carry ROs for sweeping PRACH. In particular, such CCs are MCG SCells, i.e., CCs usually only used in carrier aggregation, or SCG PsCells/SCells, i.e., CCs in supplementary uplink To identify these new CCs, such PsCells/SCells place secondary SSBs off-raster to legacy SSBs (in time domain and/or frequency domain; time domain preferred). The secondary SSBs contain a MIB with valid SIB1 indication. A sweeping enabled UE searches also for off-raster SSBs and does sweeping RACH on the (traditionally configured) ROs of off-raster SSB SCells/CCs. Non-sweeping UEs ignore off-raster SSBs and are thus not aware of the presence of these new sweeping ROs. Backward compatibility with non-sweeping devices and procedures is ensured.

Figure 27:
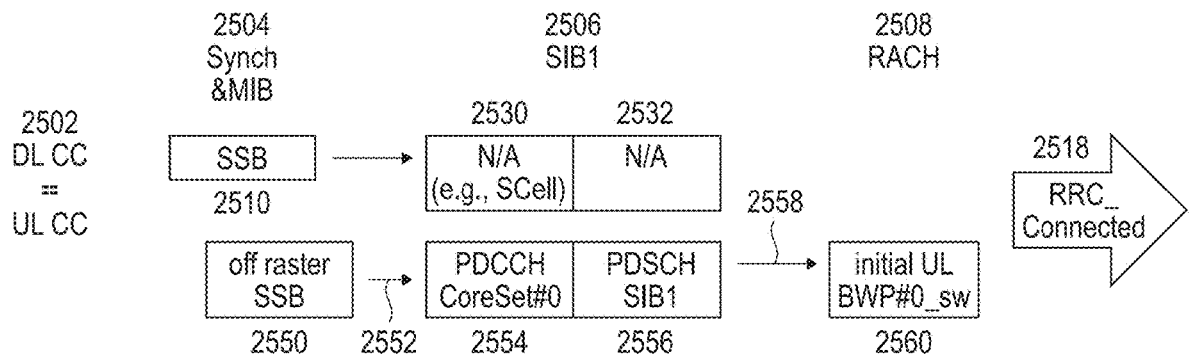
FIG. 27 shows an example sweeping RACH enabled BWP in a SCell CC.

The required new signaling and timing of said signaling is disclosed in FIG. 27. The new signaling and timing is shown as off raster SSB 2550, signaling 2552, PDCCH CoReSet #0 2554, PDSCH SIB1 2556, signaling 2558, and initial UL BWP #0_sw 2560. FIG. 27 shows items 2530 and 2532 as being N/A (e.g., SCell) and N/A, respectively.

Subitem 4.c—New Sweeping RACH Enabled BWP in a CC not Previously Usable for Initial RACH In the following, the details to realize a bandwidth part and component carrier based approach to create non-sweeping UE transparent initial PRACH opportunities that can re-use traditional SSBs, are disclosed.

As described previously, the goal is to define a new field in the SIB1 message, that generates a new initial UL BWP to be used exclusively for ROs used by sweeping PRACH. This new initial UL BWP can be (and often is) located in CCs that were previously not available for initial RACH and can be located outside the CC carrying the SIB1. The new CC/BWP is explicitly signaled via new fields in the initial SSB indicated SIB1.

Figure 28:
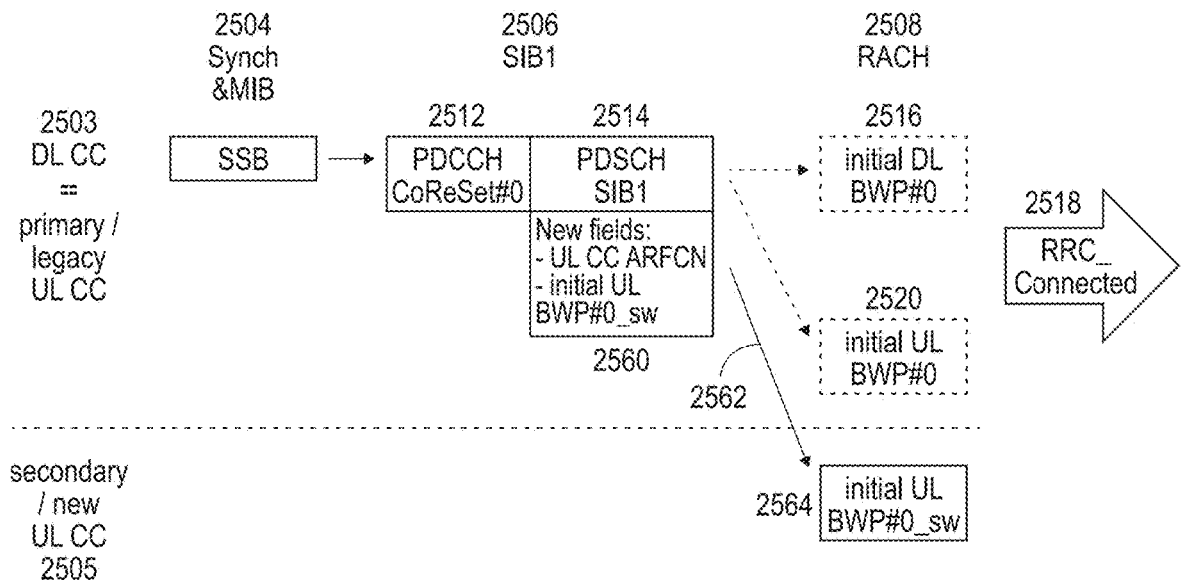
FIG. 28 shows an example sweeping RACH enabled BWP in a CC not previously usable for initial RACH.

In many ways this subitem is the combination/generalization of subitems 4.a and 4.b. Non-sweeping UEs ignore fields that are unknown and are thus not aware of these new seeping ROs. Thus, backward compatibility with non-sweeping devices and procedures is ensured. The required new signaling (labeled as items 2560, 2562, and 2564) and timing of said signaling is disclosed in FIG. 28. Items 2560 (New fields: UL CC ARFCN, initial UL and BWP #0_sw) and signaling 2562 is shown as being on the side of DL CC and primary/legacy UL CC 2503, while item 2564 (initial UL BWP #0_sw) is shown as being on the side of secondary/new UL CC 2505.

For subitem 4.c, the most likely implementation of the new SIB1 field in the RRC spec, would look as shown in FIG. 29A and FIG. 29B (this is an example implementation and the actual implementation of the new SIB1 field may differ somewhat).

In one embodiment, three new IEs for beam-sweeping UEs are created, e.g., initialUplinkBWPSweeping-r18 2602, timeAlignmentTimerCommonSweeping-r18 2604, and frequencyInfoULSweeping-R18 2610.

The first new IE (frequencyInfoULSweeping-r18 2610), uses the same content format as the classical IE "frequencyInfoUL" 2609, however the ARFCN-ValueNR 2612 is chosen such that it points towards a specific CC that, usually, is located outside the initial SSBs CC. It is encouraged to choose the value for ARFCN-ValueNR 2612 and SCS-SpecificCarrier 2614 so that it coincides with previously non-RACH-able SCells.

The second IE (initialUplinkBWPSweeping-r18 2602), uses the same content format as the classical IE "initialUplinkBWP" 2601, however contains an adapted configuration "BWP>locationAndBandwidth" (frequency domain location and bandwidth of this bandwidth part) and "BWP-UplinkCommon>rach-ConfigCommon" that defines a new initial UL BWP and corresponding ROs to be used for sweeping RACH.

The sweeping BWP may overlap the non-sweeping BWP, as long as the ROs do not overlap and the ROs, as well as other message exchanges, are not interfered by any new signaling.

The third IE (timeAlignmentTimerCommonSweeping-r18 2604) contains a value in ms of the timeAlignmentTimer for the sweeping BWP, in case it is different from the non-sweeping one 2603. Since sweeping UEs are more rare than classical UEs, might consume more resources, and might be on a relatively distant BWP, it is conceivable to adjust this timer (longer for less resources and low speed sweeping UEs, shorter in case of less favorable propagation conditions).

It is straightforward to see how subitem 4.c generalizes the previous two, at the cost of some more signaling in SIB, which might have a (minor) negative effect on cell coverage. This implementation also requires the sweeping UEs to be extremely flexible in their radio unit part.

There are several general advantages and technical effects of the examples described herein. A beam-sweeping UE would be able to capitalize on the described procedures, experiencing two major advantages, namely increased msg1 coverage and increased msg3 coverage. Regarding increased msg1 coverage, assuming a cell-edge scenario, a non-sweeping UE may not be able to reach gNB with its first transmission, whereas a beam-sweeping UE would. Regarding increased msg3 coverage, a beam-sweeping UE would use the beam associated to the preamble indicated by gNB via RAR, after the sweeping procedure, to transmit msg3 over the PUSCH. This would yield a longer coverage as opposed to the non-sweeping case.

Quantitatively, the actual gain in terms of maximum coupling loss for the UL transmission of a beam-sweeping UE according to the examples described herein depends on several factors. Among the most relevant include: the number of beams the UE sweeps during the procedure, i.e., $L_{UE_{max}}$, which in turn depends on the antenna array configuration at the UE; the alignment between the position of the receiver and the beam boresight; and the ground plane on which the antenna array is mounted.

Figure 30:
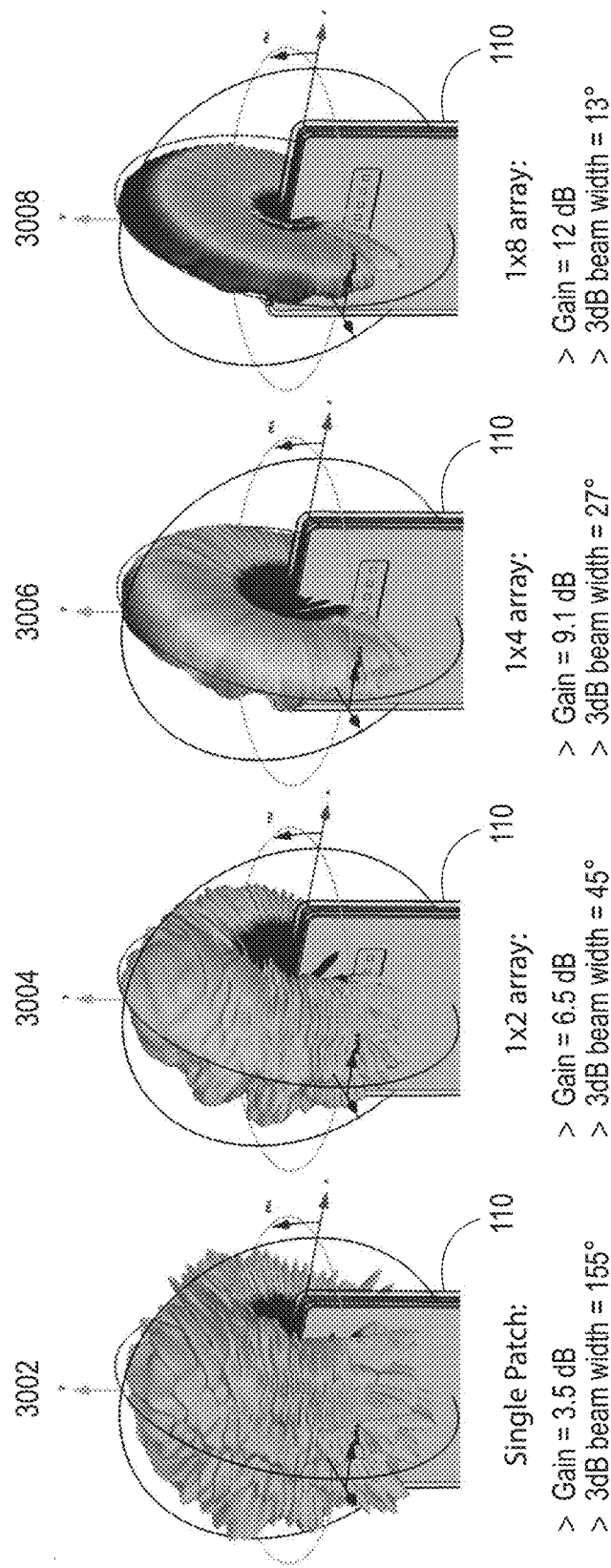
FIG. 30 illustrates an example of one TX beam for single patch, 1×2, 1×4 and 1×8 array, respectively.

FIG. 30 illustrates a graphical example in which four different UE antenna array configurations (actually, one possible implementation per configuration) are considered and corresponding maximum coupling loss gains (and 3 dB beam width) are given. FIG. 30 illustrates an example of one TX beam for single patch configuration 3002, 1×2 configuration 3004, 1×4 configuration 3006, and 1×8 array configuration 3008, respectively.

As can be seen by FIG. 30, the gain that can be experienced by a beam-sweeping UE 110 is very large. In practice, such gain may vary depending mostly on the position of the UE 110 with respect to the gNB 170, and some non-negligible variations can be observed.

Suitable simulations were performed to further characterize such variations, and assess the actual gain a UE would observe as a function of the number of swept beams and angular spread between the gNB's actual position and the UE beam boresight. The results of such simulations are given in Table 1, where the advantage of using the described examples is quite evident, regardless of the angular spread between the gNB's position and UE beam boresight.

Thus, Table 1 shows the maximum coupling loss gain a beam-sweeping UE would observe as a function of the number of swept beams and angular spread between the gNB's actual position and the UE beam boresight.

TABLE 1

| Number of beams | Max | Min | 0° | 15° | 30° | 45° |
| --- | --- | --- | --- | --- | --- | --- |
| 1 | 6.5 dBi | 4.9 dBi | 5.9 dBi | 5.2 dBi | 5.3 dBi | 6.5 dBi |
| 2 | 8.4 dBi | 7.0 dBi | 7.3 dBi | 7.9 dBi | 8.1 dBi | 7.8 dBi |
| 4 | 11.2 dBi | 9.5 dBi | 9.8 dBi | 10.9 dBi | 11.1 dBi | 10.0 dBi |
| 7 | 14.9 dBi | 10.7 dBi | 14.9 dBi | 14.3 dBi | 14.2 dBi | 14.3 dBi |

Figure 31:
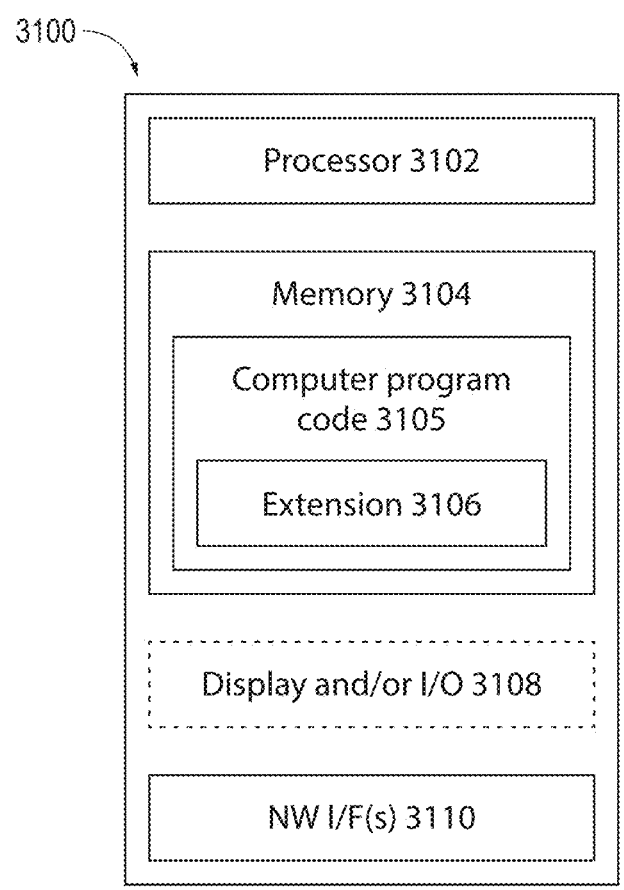
FIG. 31 is an example apparatus configured to implement UL RACH coverage extension, based on the examples described herein.

FIG. 31 is an example apparatus 300, which may be implemented in hardware, configured to implement UL RACH coverage extension, based on the examples described herein. The apparatus 3100 comprises a processor 3102, at least one non-transitory memory 3104 including computer program code 3105, wherein the at least one memory 3104 and the computer program code 3105 are configured to, with the at least one processor 3102, cause the apparatus to implement a process, component, module, or function (collectively extension 3106) to implement UL RACH coverage extension. The apparatus 3100 optionally includes a display and/or I/O interface 3108 that may be used to display aspects or a status of any of the methods described herein (e.g., as one of the methods is being performed or at a subsequent time). The apparatus 3100 includes one or more network (NW) interfaces (I/F(s)) 3110. The NW I/F(s) 3110 may be wired and/or wireless and communicate over the Internet/ other network(s) via any communication technique. The NW I/F(s) 3110 may comprise one or more transmitters and one or more receivers.

The apparatus 3100 may be UE 110, RAN node 170, or Network Element(s) 190. Thus, processor 3102 may correspond to processor(s) 120, processor(s) 152, or processor(s) 175, memory 3104 may correspond to memory(ies) 125, memory(ies) 155, or memory(ies) 171, computer program code 3105 may correspond to computer program code 123, module 140-1, module 140-2, computer program code 153, module 150-1, module 150-2, or computer program code 173, and NW I/F(s) 3110 may correspond to N/W I/F(s) 161 or N/W I/F(s) 180. Alternatively, apparatus 3100 may not correspond to either of UE 110, RAN node 170, or Network element(s) 190 (for example, apparatus 3100 may be a remote or a cloud apparatus).

References to a 'computer', 'processor', etc. should be understood to encompass not only computers having different architectures such as single/multi-processor architectures and sequential (Von Neumann)/parallel architectures but also specialized circuits such as field-programmable gate arrays (FPGA), systems on a chip (SoC), application specific circuits (e.g. ASIC), signal processing devices and other processing circuitry. References to computer program, instructions, code etc. should be understood to encompass software for a programmable processor or firmware such as, for example, the programmable content of a hardware device or instructions for a processor, or configuration settings for a fixed-function device, gate array or programmable logic device etc.

Figure 32:
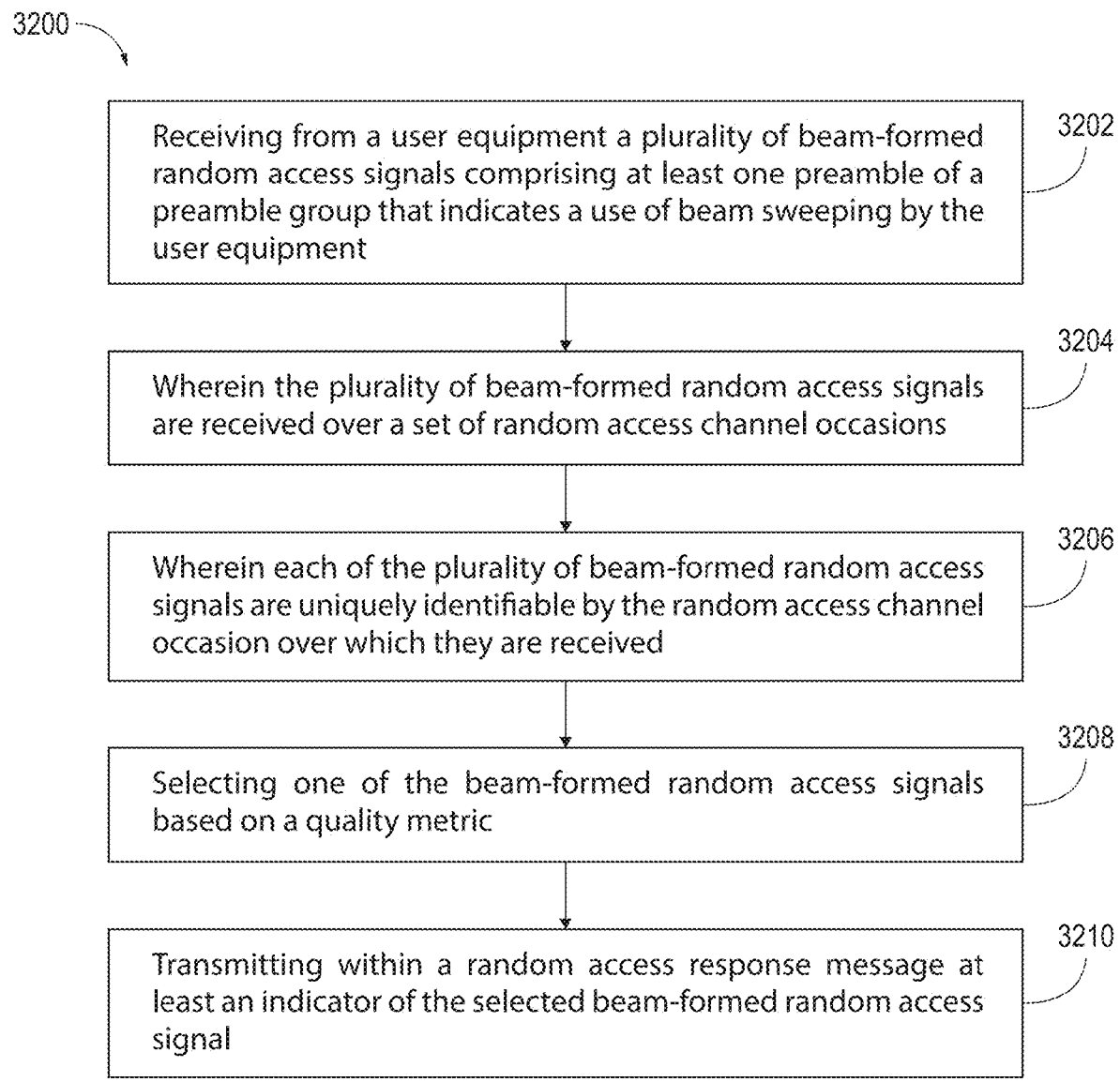
FIG. 32 shows an example method to implement UL RACH coverage extension, based on the examples described herein.

FIG. 32 is an example method 3200 to implement UL RACH coverage extension, based on the examples described herein. At 3202, the method includes receiving from a user equipment a plurality of beam-formed random access signals comprising at least one preamble of a preamble group that indicates a use of beam sweeping by the user equipment. At 3204, the method includes wherein the plurality of beam-formed random access signals are received over a set of random access channel occasions. At 3206, the method includes wherein each of the plurality of beam-formed random access signals are uniquely identifiable by the random access channel occasion over which they are received. At 3208, the method includes selecting one of the beam-formed random access signals based on a quality metric. At 3210, the method includes transmitting within a random access response message at least an indicator of the selected beam-formed random access signal.

Figure 33:
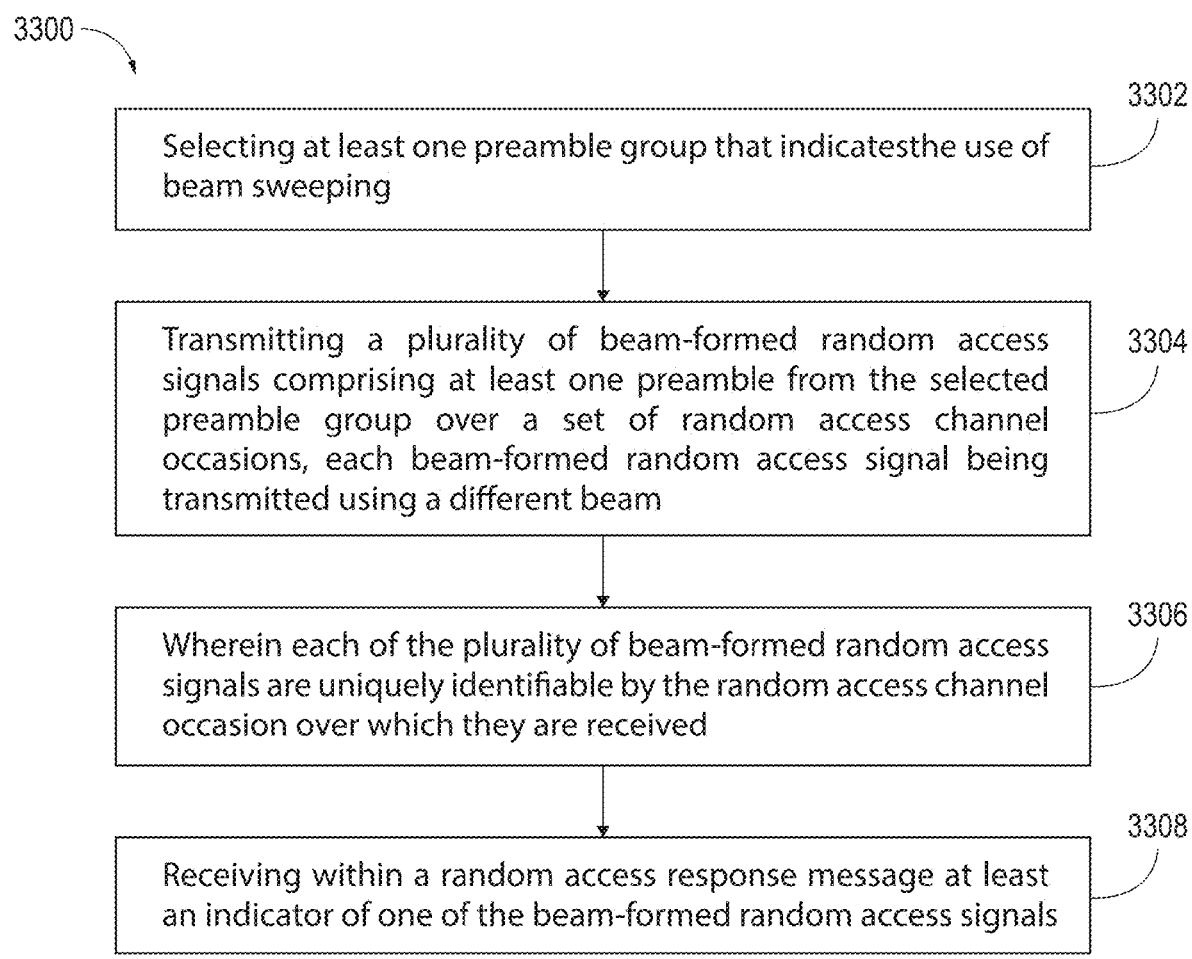
FIG. 33 shows another example method to implement UL RACH coverage extension, based on the examples described herein.

FIG. 33 is another example method 3300 to implement UL RACH coverage extension, based on the examples described herein. At 3302, the method includes selecting at least one preamble group that indicates the use of beam sweeping. At 3304, the method includes transmitting a plurality of beam-formed random access signals comprising at least one preamble from the selected preamble group over a set of random access channel occasions, each beam-formed random access signal being transmitted using a different beam. At 3306, the method includes wherein each of the plurality of beam-formed random access signals are uniquely identifiable by the random access channel occasion over which they are transmitted. At 3308, the method includes receiving within a random access response message at least an indicator of one of the beam-formed random access signals.

Figure 34:
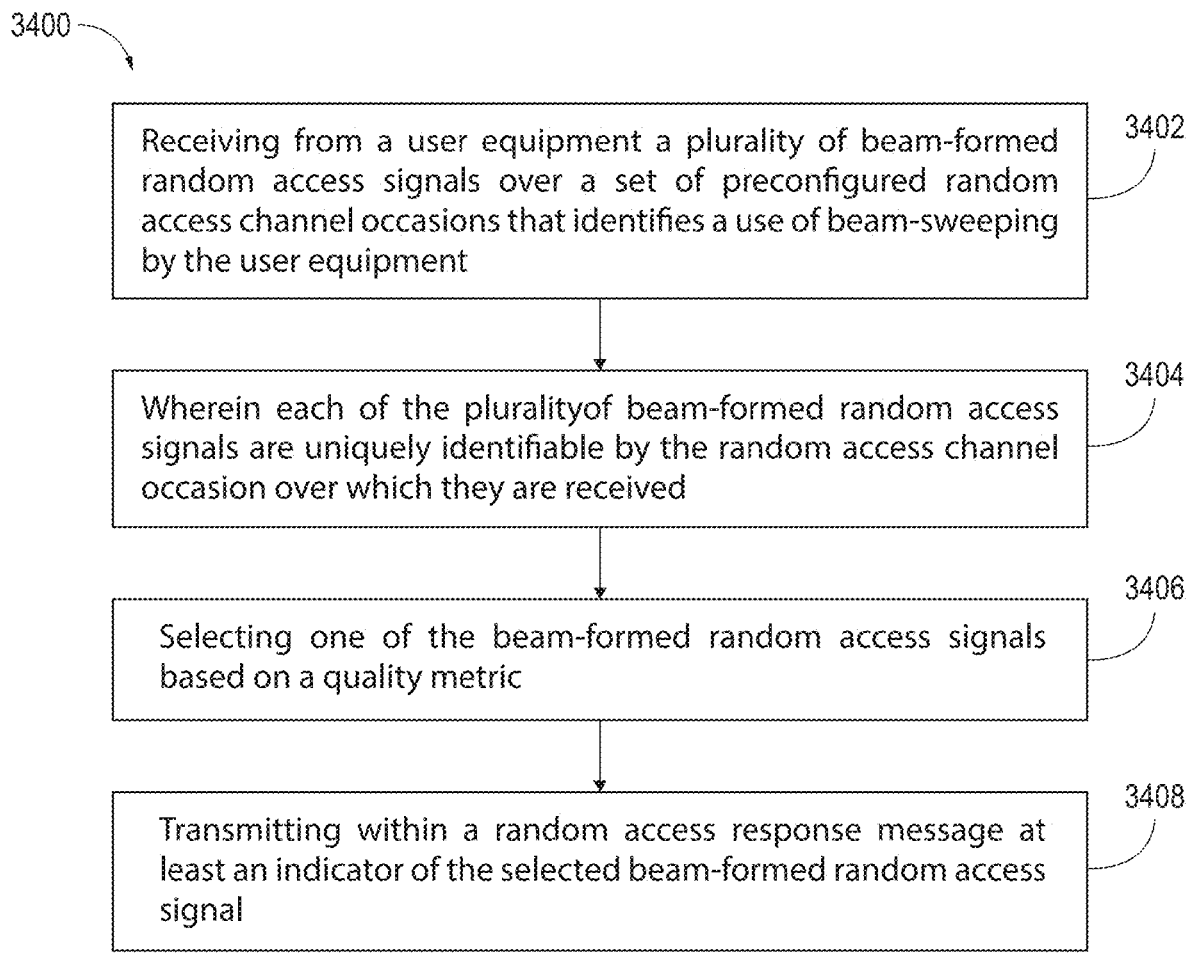
FIG. 34 shows another example method to implement UL RACH coverage extension, based on the examples described herein.

FIG. 34 is another example method 3400 to implement UL RACH coverage extension, based on the examples described herein. At 3402, the method includes receiving from a user equipment a plurality of beam-formed random access signals over a set of preconfigured random access channel occasions that identifies a use of beam-sweeping by the user equipment. At 3404, the method includes wherein each of the plurality of beam-formed random access signals are uniquely identifiable by the random access channel occasion over which they are received. At 3406, the method includes selecting one of the beam-formed random access signals based on a quality metric. At 3408, the method includes transmitting within a random access response message at least an indicator of the selected beam-formed random access signal.

Figure 35:
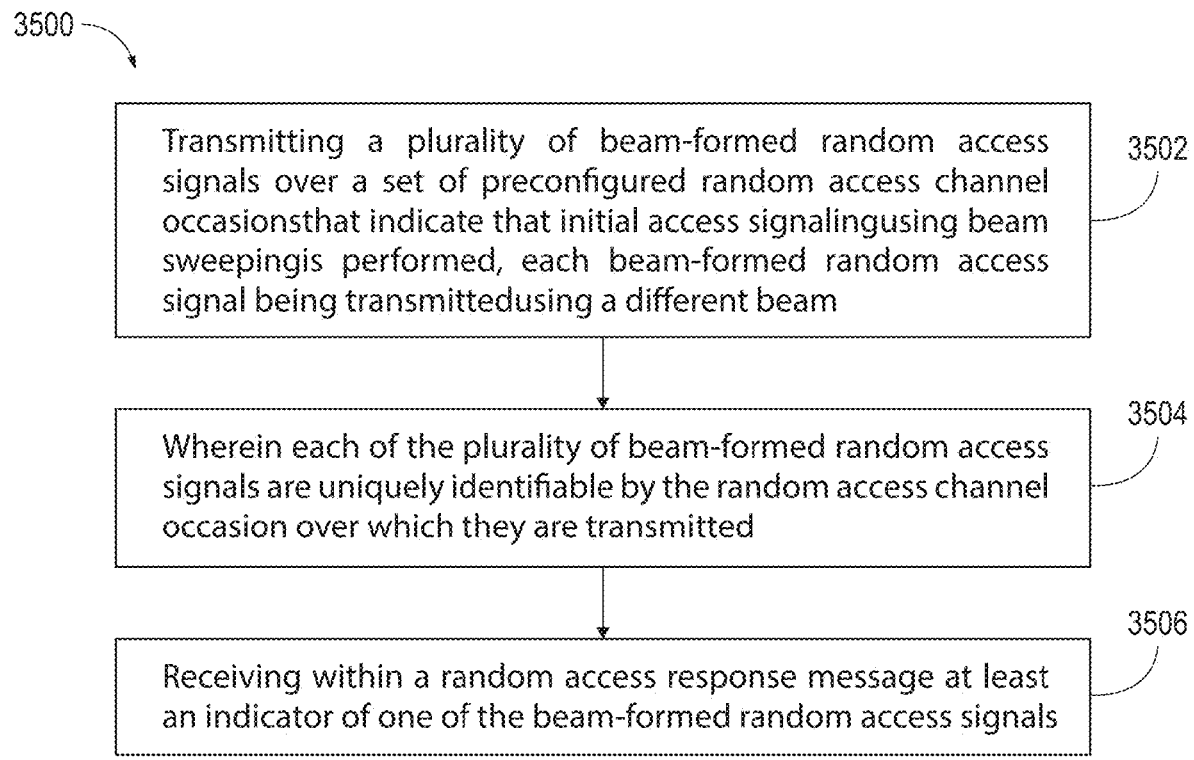
FIG. 35 shows another example method to implement UL RACH coverage extension, based on the examples described herein.

FIG. 35 is another example method 3500 to implement UL RACH coverage extension, based on the examples described herein. At 3502, the method includes transmitting a plurality of beam-formed random access signals over a set of preconfigured random access channel occasions that indicate that initial access signaling using beam sweeping is performed, each beam-formed random access signal being transmitted using a different beam. At 3504, the method includes wherein each of the plurality of beam-formed random access signals are uniquely identifiable by the random access channel occasion over which they are transmitted. At 3506, the method includes receiving within a random access response message at least an indicator of one of the beam-formed random access signals.

Figure 36:
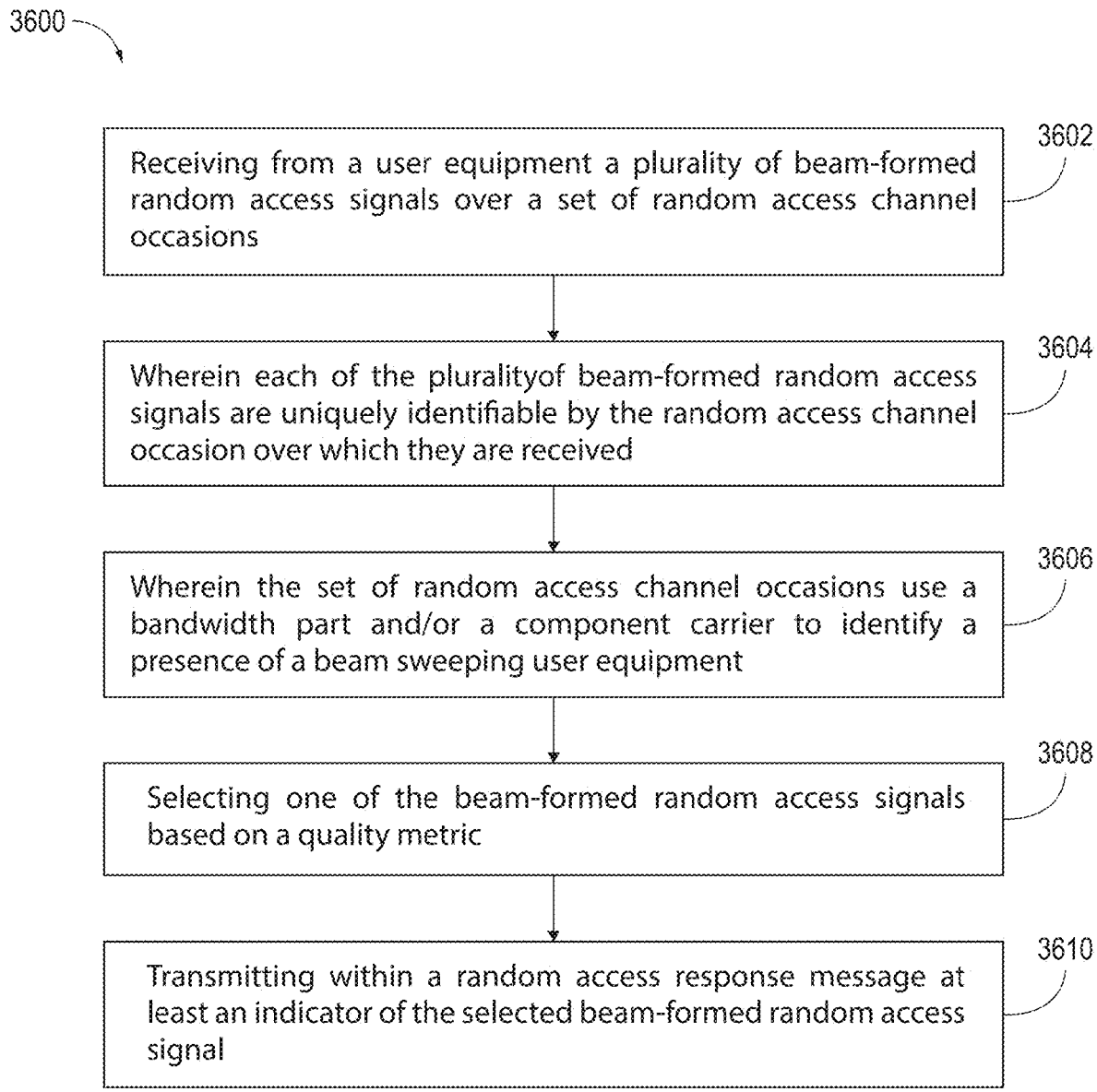
FIG. 36 shows another example method to implement UL RACH coverage extension, based on the examples described herein.

FIG. 36 is another example method 3600 to implement UL RACH coverage extension, based on the examples described herein. At 3602, the method includes receiving from a user equipment a plurality of beam-formed random access signals over a set of random access channel occasions. At 3604, the method includes wherein each of the plurality of beam-formed random access signals are uniquely identifiable by the random access channel occasion over which they are received. At 3606, the method includes wherein the set of random access channel occasions use a bandwidth part and/or a component carrier to identify a presence of a beam sweeping user equipment. At 3608, the method includes selecting one of the beam-formed random access signals based on a quality metric. At 3610, the method includes transmitting within a random access response message at least an indicator of the selected beam-formed random access signal.

Figure 37:
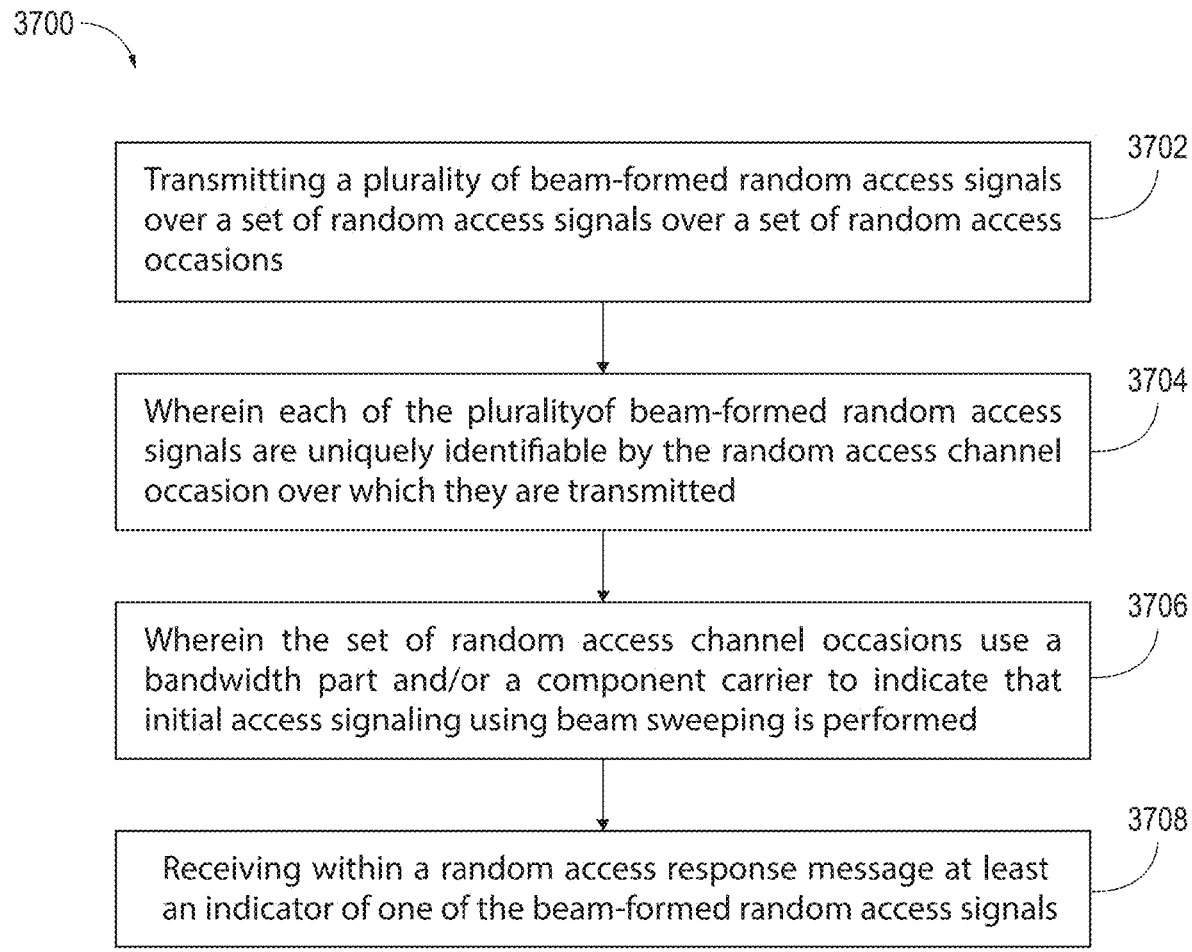
FIG. 37 shows another example method to implement UL RACH coverage extension, based on the examples described herein.

FIG. 37 is another example method 3700 to implement UL RACH coverage extension, based on the examples described herein. At 3702, the method includes transmitting a plurality of beam-formed random access signals over a set of random access channel occasions. At 3704, the method includes wherein each of the plurality of beam-formed random access signals are uniquely identifiable by the random access channel occasion over which they are transmitted. At 3706, the method includes wherein the set of random access channel occasions use a bandwidth part and/or a component carrier to indicate that initial access signaling using beam sweeping is performed. At 3708, the method includes receiving within a random access response message at least an indicator of one of the beam-formed random access signals.

An example method includes receiving from a user equipment a plurality of beam-formed random access signals comprising at least one preamble of a preamble group that indicates a use of beam sweeping by the user equipment; wherein the plurality of beam-formed random access signals are received over a set of random access channel occasions; wherein each of the plurality of beam-formed random access signals are uniquely identifiable by the random access channel occasion over which they are received; selecting one of the beam-formed random access signals based on a quality metric; and transmitting within a random access response message at least an indicator of the selected beam-formed random access signal.

The method may further include wherein the indicator of the selected beam-formed random access signal comprises an index of the preamble of the selected beam-formed random access signal and/or an identifier of the random access channel occasion over which the selected beam-formed random access signal has been received.

The method may further include wherein the set of random access channel occasions is associated with a synchronization signal block beam ID.

The method may further include wherein the preamble used is the same for all the plurality of beam-formed random access signals within an association period.

The method may further include in response to receiving one of the plurality of beam-formed random access signals: waiting to receive all the plurality of beam-formed random access signals before selecting the one of the beam-formed random access signals comprising the at least one preamble associated to the same synchronization signal block beam ID.

The method may further include wherein the preamble group is distinct from one or more legacy preamble groups that do not indicate that beam sweeping is used by a user equipment when transmitting a preamble from one of said legacy preamble groups.

The method may further include wherein the preamble group is selected from a plurality of preamble groups according to at least one of a parameter of a message to be received subsequently and a radio propagation parameter.

The method may further include wherein a total number of preambles in all configured preamble groups does not exceed one or more configured maximum numbers of preambles.

The method may further include wherein either: the preamble group is a subset comprising at least one preamble within one or more legacy preamble groups; the preamble group is outside the one or more legacy preamble groups; or the preamble group is a union of two or more subsets of legacy preamble groups.

The method may further include wherein the plurality of beam-formed random access signals are received within a set of at least as many random access channel occasions as are associated to a synchronization signal block beam ID.

The method may further include wherein the set of random access channel occasions associated to each available synchronization signal block beam ID lasts for a period of time of duration of one physical random access channel association pattern period; or beyond the physical random access channel association pattern period.

The method may further include wherein the indicator of the random access channel occasion over which the selected beam-formed random access signal has been received, is a random access radio network temporary identifier.

The method may further include wherein two or more preambles of a preamble group that indicate a use of beam sweeping by the user equipment are chosen when the random access radio network temporary identifier is not unique over the association period.

The method may be performed while a base station is sweeping its beams during contention based random access.

The method may further include wherein the preamble group comprises at least a number of preambles as large as the number of synchronization block beam IDs associated to one random access opportunity.

An example method includes selecting at least one preamble group that indicates the use of beam sweeping; transmitting a plurality of beam-formed random access signals comprising at least one preamble from the selected preamble group over a set of random access channel occasions, each beam-formed random access signal being transmitted using a different beam; wherein each of the plurality of beam-formed random access signals are uniquely identifiable by the random access channel occasion over which they are transmitted; and receiving within a random access response message at least an indicator of one of the beam-formed random access signals.

The method may further include wherein the indicator of one of the beam-formed random access signals comprises an index of the preamble of the indicated beam-formed random access signal, and/or an identifier of the random access channel occasion over which the indicated beam-formed random access signal was transmitted.

The method may further include transmitting a message, including at least a radio resource configuration request, using the same beam as that used for the beam-formed random access signal indicated within the received random access response message.

The method may further include wherein an index of the at least one preamble transmitted with the beam-formed random access signals over the set of random access channel occasions is associated with a synchronization signal block beam ID.

The method may further include wherein the preamble group is distinct from one or more legacy preamble groups.

The method may further include wherein selecting the preamble group further comprises selecting the preamble group among two or more preamble groups depending on at least one of a parameter of a subsequent message to be transmitted and a radio propagation parameter.

The method may further include wherein a total number of preambles in all configured preamble groups does not exceed one or more configured maximum numbers of preambles.

The method may further include wherein either: the preamble group is a subset comprising at least one preamble within one or more legacy preamble groups; the preamble group is outside the one or more legacy preamble groups; or the preamble group is a union of two or more subsets of legacy preamble groups.

The method may further include wherein the plurality of beam-formed random access signals are transmitted within a set of at least as many random access channel occasions as are associated to a synchronization signal block beam ID.

The method may further include wherein the set of random access channel occasions associated to each available synchronization signal block beam ID lasts for a period of time of duration of one physical random access channel association pattern period; or beyond the physical random access channel association pattern period.

The method may further include receiving a random access radio network temporary identifier related to the random access channel occasion over which the indicated beam-formed random access signal has been transmitted.

The method may further include wherein two or more preambles of a preamble group that indicate a use of beam sweeping by a user equipment are chosen when the random access radio network temporary identifier is not unique over the association period.

The method may be performed while a base station is sweeping its beams during contention based random access.

The method may further include wherein the beams used for transmission of the beam-formed random access signals are selected depending on a selection of a received sweeping synchronization signal block.

An example method includes receiving from a user equipment a plurality of beam-formed random access signals over a set of preconfigured random access channel occasions that identifies a use of beam-sweeping by the user equipment; wherein each of the plurality of beam-formed random access signals are uniquely identifiable by the random access channel occasion over which they are received; selecting one of the beam-formed random access signals based on a quality metric; and transmitting within a random access response message at least an indicator of the selected beam-formed random access signal.

The method may further include wherein the indicator of the selected beam-formed random access signal comprises an identifier of the random access channel occasion over which the selected beam-formed random access signal has been received.

The method may further include wherein the preconfigured random access channel occasions are a subset of random access channel occasions used for transmissions without beam-sweeping.

The method may further include wherein the preconfigured random access channel occasions used for transmissions with beam-sweeping are not used for transmissions without beam-sweeping.

The method may further include wherein the preconfiguration of random access channel occasions used for transmissions with beam-sweeping and preconfiguration of random access channel occasions used for transmissions without beam-sweeping are different.

The method may further include receiving the plurality of beam-formed random access signals comprising at least one preamble that identifies the presence of the beam sweeping user equipment.

The method may be performed while a base station is sweeping its beams during contention based random access.

The method may further include transmitting a bitmask to the user equipment that indicates which random access channel occasions indicate that initial access signaling using beam-sweeping is performed.

The method may further include transmitting a bitmask to the user equipment that indicates which random access channel occasions cannot be used for initial access signaling without beam-sweeping.

An example method includes transmitting a plurality of beam-formed random access signals over a set of preconfigured random access channel occasions that indicate that initial access signaling using beam sweeping is performed, each beam-formed random access signal being transmitted using a different beam; wherein each of the plurality of beam-formed random access signals are uniquely identifiable by the random access channel occasion over which they are transmitted; and receiving within a random access response message at least an indicator of one of the beam-formed random access signals.

The method may further include wherein the indicator of one of the beam-formed random access signals comprises an identifier of the random access channel occasion over which the indicated beam-formed random access signal was transmitted.

The method may further include wherein the preconfigured random access channel occasions are a subset of random access channel occasions used for transmissions without beam-sweeping.

The method may further include wherein the preconfigured random access channel occasions used for transmissions with beam-sweeping are not used for transmissions without beam-sweeping.

The method may further include wherein the preconfiguration of random access channel occasions used for transmissions with beam-sweeping and preconfiguration of random access channel occasions used for transmissions without beam-sweeping are different.

The method may further include selecting a preamble group that indicates that initial access signaling using beam sweeping is performed; and transmitting the plurality of beam-formed random access signals with at least one preamble from the selected preamble group.

The method may be performed while a base station is sweeping its beams during contention based random access.

The method may further include receiving a bitmask, wherein the bitmask is used to indicate which random access channel occasions indicate that initial access signaling using beam-sweeping is performed.

The method may further include wherein the beams used for transmission of the beam-formed random access signals are selected depending on the selection of a received sweeping synchronization signal block.

The method may further include receiving a bitmask that indicates which random access channel occasions cannot be used for initial access signaling without beam-sweeping.

An example method includes receiving from a user equipment a plurality of beam-formed random access signals over a set of random access channel occasions; wherein each of the plurality of beam-formed random access signals are uniquely identifiable by the random access channel occasion over which they are received; wherein the set of random access channel occasions use a bandwidth part and/or a component carrier to identify a presence of a beam sweeping user equipment; selecting one of the beam-formed random access signals based on a quality metric; and transmitting within a random access response message at least an indicator of the selected beam-formed random access signal.

The method may further include wherein the indicator of the selected beam-formed random access signal comprises an identifier of the random access channel occasion over which the selected beam-formed random access signal had been received.

The method may further include wherein the bandwidth part and/or component carrier that identifies the presence of the beam sweeping user equipment is signaled via at least one field in a system information block.

The method may further include wherein the set of random access channel occasions is associated with a secondary cell or component carrier with an off-raster synchronization signal block; wherein the off-raster synchronization signal block is offset with respect to a legacy raster.

The method may further include wherein the at least one field in the system information block comprises: a field that indicates a specific component carrier; and/or a field that indicates an initial uplink bandwidth part that contains random access channel occasions to be used for initial access signaling using beam sweeping within the specific component carrier.

The method may further include wherein the plurality of beam-formed random access signals received over the set of random access channel occasions use a preamble index associated with a synchronization signal block beam ID.

An example method includes transmitting a plurality of beam-formed random access signals over a set of random access channel occasions; wherein each of the plurality of beam-formed random access signals are uniquely identifiable by the random access channel occasion over which they are transmitted; wherein the set of random access channel occasions use a bandwidth part and/or a component carrier to indicate that initial access signaling using beam sweeping is performed; and receiving within a random access response message at least an indicator of one of the beam-formed random access signals.

The method may further include wherein the indicator of one of the beam-formed random access signals comprises an identifier of the random access channel occasion over which the indicated beam-formed random access signal was transmitted.

The method may further include wherein the bandwidth part used to indicate that initial access signaling using beam sweeping is performed is indicated using at least one field in a system information block.

The method may further include searching for at least one off-raster synchronization signal block in a secondary cell or component carrier; wherein the off-raster synchronization signal block is offset with respect to a legacy raster; and transmitting the plurality of beam-formed random access signals over the set of random access channel occasions indicated by system information signaled on the secondary cell or component carrier with the off-raster synchronization signal block.

The method may further include wherein the at least one field in the system information block comprises: a field that indicates a specific component carrier; and a field that indicates an initial uplink bandwidth part that contains random access channel occasions to be used for initial access signaling using beam sweeping within the specific component carrier.

The method may further include wherein the plurality of beam formed random access signals are transmitted over the set of random access channel occasions using a preamble index associated with a synchronization signal block beam ID.

The methods may further include wherein a number of preambles used to indicate the use of beam-sweeping are configured by means of an information element via higher-layer signaling.

The methods may further include wherein a physical random access channel configuration identifies via higher-layer signaling to beam-sweeping UEs a set of time-frequency resources which are orthogonal to the resources assigned to legacy UEs.

The methods may further include wherein a physical random access channel configuration identifies via higher-layer signaling to beam-sweeping UEs a set of time-frequency resources which are a subset of random access channel occasions used for transmissions without beam-sweeping.

The methods may further include wherein an information element signaled via higher layer signaling defines: a first initial UL BWP for SCells; or a second initial UL BWP for SpCells; and corresponding ROs to be used for beam-sweeping random access signals.

An example apparatus includes at least one processor; and at least one non-transitory memory including computer program code; wherein the at least one memory and the computer program code are configured to, with the at least one processor, cause the apparatus at least to perform: receive from a user equipment a plurality of beam-formed random access signals comprising at least one preamble of a preamble group that indicates a use of beam sweeping by the user equipment; wherein the plurality of beam-formed random access signals are received over a set of random access channel occasions; wherein each of the plurality of beam-formed random access signals are uniquely identifiable by the random access channel occasion over which they are received; select one of the beam-formed random access signals based on a quality metric; and transmit within a random access response message at least an indicator of the selected beam-formed random access signal.

An example apparatus includes at least one processor; and at least one non-transitory memory including computer program code; wherein the at least one memory and the computer program code are configured to, with the at least one processor, cause the apparatus at least to perform: select at least one preamble group that indicates the use of beam sweeping; transmit a plurality of beam-formed random access signals comprising at least one preamble from the selected preamble group over a set of random access channel occasions, each beam-formed random access signal being transmitted using a different beam; wherein each of the plurality of beam-formed random access signals are uniquely identifiable by the random access channel occasion over which they are transmitted; and receive within a random access response message at least an indicator of one of the beam-formed random access signals.

An example apparatus includes at least one processor; and at least one non-transitory memory including computer program code; wherein the at least one memory and the computer program code are configured to, with the at least one processor, cause the apparatus at least to perform: receive from a user equipment a plurality of beam-formed random access signals over a set of preconfigured random access channel occasions that identifies a use of beam-sweeping by the user equipment; wherein each of the plurality of beam-formed random access signals are uniquely identifiable by the random access channel occasion over which they are received; select one of the beam-formed random access signals based on a quality metric; and transmit within a random access response message at least an indicator of the selected beam-formed random access signal.

An example apparatus includes at least one processor; and at least one non-transitory memory including computer program code; wherein the at least one memory and the computer program code are configured to, with the at least one processor, cause the apparatus at least to perform: transmit a plurality of beam-formed random access signals over a set of preconfigured random access channel occasions that indicate that initial access signaling using beam sweeping is performed, each beam-formed random access signal being transmitted using a different beam; wherein each of the plurality of beam-formed random access signals are uniquely identifiable by the random access channel occasion over which they are transmitted; and receive within a random access response message at least an indicator of one of the beam-formed random access signals.

An example apparatus includes at least one processor; and at least one non-transitory memory including computer program code; wherein the at least one memory and the computer program code are configured to, with the at least one processor, cause the apparatus at least to perform: receive from a user equipment a plurality of beam-formed random access signals over a set of random access channel occasions; wherein each of the plurality of beam-formed random access signals are uniquely identifiable by the random access channel occasion over which they are received; wherein the set of random access channel occasions use a bandwidth part and/or a component carrier to identify a presence of a beam sweeping user equipment;

select one of the beam-formed random access signals based on a quality metric; and transmit within a random access response message at least an indicator of the selected beam-formed random access signal.

An example apparatus includes at least one processor; and at least one non-transitory memory including computer program code; wherein the at least one memory and the computer program code are configured to, with the at least one processor, cause the apparatus at least to perform: transmit a plurality of beam-formed random access signals over a set of random access channel occasions; wherein each of the plurality of beam-formed random access signals are uniquely identifiable by the random access channel occasion over which they are transmitted; wherein the set of random access channel occasions use a bandwidth part and/or a component carrier to indicate that initial access signaling using beam sweeping is performed; and receive within a random access response message at least an indicator of one of the beam-formed random access signals.

An example apparatus includes at least one processor; and at least one non-transitory memory including computer program code; wherein the at least one memory and the computer program code are configured to, with the at least one processor, cause the apparatus at least to perform: the method of any of claims 1-64.

An example non-transitory program storage device readable by a machine, tangibly embodying a program of instructions executable by the machine for performing operations may be provided, the operations comprising: receiving from a user equipment a plurality of beam-formed random access signals comprising at least one preamble of a preamble group that indicates a use of beam sweeping by the user equipment; wherein the plurality of beam-formed random access signals are received over a set of random access channel occasions; wherein each of the plurality of beam-formed random access signals are uniquely identifiable by the random access channel occasion over which they are received; selecting one of the beam-formed random access signals based on a quality metric; and transmitting within a random access response message at least an indicator of the selected beam-formed random access signal.

An example non-transitory program storage device readable by a machine, tangibly embodying a program of instructions executable by the machine for performing operations may be provided, the operations comprising: selecting at least one preamble group that indicates the use of beam sweeping; transmitting a plurality of beam-formed random access signals comprising at least one preamble from the selected preamble group over a set of random access channel occasions, each beam-formed random access signal being transmitted using a different beam; wherein each of the plurality of beam-formed random access signals are uniquely identifiable by the random access channel occasion over which they are transmitted; and receiving within a random access response message at least an indicator of one of the beam-formed random access signals.

An example non-transitory program storage device readable by a machine, tangibly embodying a program of instructions executable by the machine for performing operations may be provided, the operations comprising: receiving from a user equipment a plurality of beam-formed random access signals over a set of preconfigured random access channel occasions that identifies a use of beam-sweeping by the user equipment; wherein each of the plurality of beam-formed random access signals are uniquely identifiable by the random access channel occasion over which they are received; selecting one of the beam-formed random access signals based on a quality metric; and transmitting within a random access response message at least an indicator of the selected beam-formed random access signal.

An example non-transitory program storage device readable by a machine, tangibly embodying a program of instructions executable by the machine for performing operations may be provided, the operations comprising: transmitting a plurality of beam-formed random access signals over a set of preconfigured random access channel occasions that indicate that initial access signaling using beam sweeping is performed, each beam-formed random access signal being transmitted using a different beam; wherein each of the plurality of beam-formed random access signals are uniquely identifiable by the random access channel occasion over which they are transmitted; and receiving within a random access response message at least an indicator of one of the beam-formed random access signals.

An example non-transitory program storage device readable by a machine, tangibly embodying a program of instructions executable by the machine for performing operations may be provided, the operations comprising: receiving from a user equipment a plurality of beam-formed random access signals over a set of random access channel occasions; wherein each of the plurality of beam-formed random access signals are uniquely identifiable by the random access channel occasion over which they are received; wherein the set of random access channel occasions use a bandwidth part and/or a component carrier to identify a presence of a beam sweeping user equipment; selecting one of the beam-formed random access signals based on a quality metric; and transmitting within a random access response message at least an indicator of the selected beam-formed random access signal.

An example non-transitory program storage device readable by a machine, tangibly embodying a program of instructions executable by the machine for performing operations may be provided, the operations comprising: transmitting a plurality of beam-formed random access signals over a set of random access channel occasions; wherein each of the plurality of beam-formed random access signals are uniquely identifiable by the random access channel occasion over which they are transmitted; wherein the set of random access channel occasions use a bandwidth part and/or a component carrier to indicate that initial access signaling using beam sweeping is performed; and receiving within a random access response message at least an indicator of one of the beam-formed random access signals.

An example non-transitory program storage device readable by a machine, tangibly embodying a program of instructions executable by the machine for performing operations may be provided, the operations comprising: the method of any of claims 1-64.

An example apparatus includes means for receiving from a user equipment a plurality of beam-formed random access signals comprising at least one preamble of a preamble group that indicates a use of beam sweeping by the user equipment; wherein the plurality of beam-formed random access signals are received over a set of random access channel occasions; wherein each of the plurality of beam-formed random access signals are uniquely identifiable by the random access channel occasion over which they are received; means for selecting one of the beam-formed random access signals based on a quality metric; and means for transmitting within a random access response message at least an indicator of the selected beam-formed random access signal.

An example apparatus includes means for selecting at least one preamble group that indicates the use of beam sweeping; means for transmitting a plurality of beam-formed random access signals comprising at least one preamble from the selected preamble group over a set of random access channel occasions, each beam-formed random access signal being transmitted using a different beam; wherein each of the plurality of beam-formed random access signals are uniquely identifiable by the random access channel occasion over which they are transmitted; and means for receiving within a random access response message at least an indicator of one of the beam-formed random access signals.

An example apparatus includes means for receiving from a user equipment a plurality of beam-formed random access signals over a set of preconfigured random access channel occasions that identifies a use of beam-sweeping by the user equipment; wherein each of the plurality of beam-formed random access signals are uniquely identifiable by the random access channel occasion over which they are received; means for selecting one of the beam-formed random access signals based on a quality metric; and means for transmitting within a random access response message at least an indicator of the selected beam-formed random access signal.

An example apparatus includes means for transmitting a plurality of beam-formed random access signals over a set of preconfigured random access channel occasions that indicate that initial access signaling using beam sweeping is performed, each beam-formed random access signal being transmitted using a different beam; wherein each of the plurality of beam-formed random access signals are uniquely identifiable by the random access channel occasion over which they are transmitted; and means for receiving within a random access response message at least an indicator of one of the beam-formed random access signals.

An example apparatus includes means for receiving from a user equipment a plurality of beam-formed random access signals over a set of random access channel occasions; wherein each of the plurality of beam-formed random access signals are uniquely identifiable by the random access channel occasion over which they are received; wherein the set of random access channel occasions use a bandwidth part and/or a component carrier to identify a presence of a beam sweeping user equipment; means for selecting one of the beam-formed random access signals based on a quality metric; and means for transmitting within a random access response message at least an indicator of the selected beam-formed random access signal.

An example apparatus includes means for transmitting a plurality of beam-formed random access signals over a set of random access channel occasions; wherein each of the plurality of beam-formed random access signals are uniquely identifiable by the random access channel occasion over which they are transmitted; wherein the set of random access channel occasions use a bandwidth part and/or a component carrier to indicate that initial access signaling using beam sweeping is performed; and means for receiving within a random access response message at least an indicator of one of the beam-formed random access signals.

An example apparatus includes one or more means for performing the method of any of claims 1-64.

An example apparatus includes circuitry configured to receive from a user equipment a plurality of beam-formed random access signals comprising at least one preamble of a preamble group that indicates a use of beam sweeping by the user equipment; wherein the plurality of beam-formed random access signals are received over a set of random access channel occasions; wherein each of the plurality of beam-formed random access signals are uniquely identifiable by the random access channel occasion over which they are received; circuitry configured to select one of the beam-formed random access signals based on a quality metric; and circuitry configured to transmit within a random access response message at least an indicator of the selected beam-formed random access signal.

An example apparatus includes circuitry configured to select at least one preamble group that indicates the use of beam sweeping; circuitry configured to transmit a plurality of beam-formed random access signals comprising at least one preamble from the selected preamble group over a set of random access channel occasions, each beam-formed random access signal being transmitted using a different beam; wherein each of the plurality of beam-formed random access signals are uniquely identifiable by the random access channel occasion over which they are transmitted; and circuitry configured to receive within a random access response message at least an indicator of one of the beam-formed random access signals.

An example apparatus includes circuitry configured to receive from a user equipment a plurality of beam-formed random access signals over a set of preconfigured random access channel occasions that identifies a use of beam-sweeping by the user equipment; wherein each of the plurality of beam-formed random access signals are uniquely identifiable by the random access channel occasion over which they are received; circuitry configured to select one of the beam-formed random access signals based on a quality metric; and circuitry configured to transmit within a random access response message at least an indicator of the selected beam-formed random access signal.

An example apparatus includes circuitry configured to transmit a plurality of beam-formed random access signals over a set of preconfigured random access channel occasions that indicate that initial access signaling using beam sweeping is performed, each beam-formed random access signal being transmitted using a different beam; wherein each of the plurality of beam-formed random access signals are uniquely identifiable by the random access channel occasion over which they are transmitted; and circuitry configured to receive within a random access response message at least an indicator of one of the beam-formed random access signals.

An example apparatus includes circuitry configured to receive from a user equipment a plurality of beam-formed random access signals over a set of random access channel occasions; wherein each of the plurality of beam-formed random access signals are uniquely identifiable by the random access channel occasion over which they are received; wherein the set of random access channel occasions use a bandwidth part and/or a component carrier to identify a presence of a beam sweeping user equipment; circuitry configured to select one of the beam-formed random access signals based on a quality metric; and circuitry configured to transmit within a random access response message at least an indicator of the selected beam-formed random access signal.

An example apparatus includes circuitry configured to transmit a plurality of beam-formed random access signals over a set of random access channel occasions; wherein each of the plurality of beam-formed random access signals are uniquely identifiable by the random access channel occasion over which they are transmitted; wherein the set of random access channel occasions use a bandwidth part and/or a component carrier to indicate that initial access signaling using beam sweeping is performed; and circuitry configured to receive within a random access response message at least an indicator of one of the beam-formed random access signals.

An example apparatus includes one or more circuitries configured to perform the method of any of claims 1-64.

It should be understood that the foregoing description is only illustrative. Various alternatives and modifications may be devised by those skilled in the art. For example, features recited in the various dependent claims could be combined with each other in any suitable combination(s). In addition, features from different embodiments described above could be selectively combined into a new embodiment. Accordingly, the description is intended to embrace all such alternatives, modifications and variations which fall within the scope of the appended claims.

What is claimed is:

1. An apparatus comprising:
    at least one processor; and
    at least one non-transitory memory storing instructions that, when executed by the at least one processor, cause the apparatus at least to:
        receive, by the apparatus from a user equipment, a beam-formed random access signal comprising a preamble of a first preamble group that indicates a use of beam sweeping by the user equipment, wherein the beam-formed random access signal is received over a set of random access channel occasions, wherein beam-formed random access signals are uniquely identifiable by the random access channel occasion over which they are received;
        wherein the first preamble of the first preamble group received from the user equipment indicates that the user equipment is attempting access with beam sweeping, and a second preamble of a second preamble group different from the first group received from the user equipment indicates that the user equipment is attempting access without beam sweeping;
        based on the first preamble, determine, by the apparatus, that the user equipment is sending multiple beam-formed random access signals including versions of the first preamble;
        based on the determining, await, by the apparatus, reception of all possible beam-formed access signals including versions of the first preamble before selecting one of the beam-formed random access signals;
        after receipt of all of the beam-formed random access signals including versions of the first preamble, comparing, by the apparatus, a reference signal received power (RSRP) for each of the received beamed formed random access signals including versions of the first preamble;
        based on the comparing, select, by the apparatus, one of the beam-formed random access signals that has a highest RSRP; and
        transmit, by the apparatus within a random access response message to the user equipment, at least an indicator of the selected beam-formed random access signal.

2. The apparatus of claim 1, wherein the apparatus is a base station, and wherein each of the beam-formed random access signals are transmitted, from the user equipment, using a different TX beam, and wherein different random-access channel opportunities (ROs) are used for the transmission of each of the beam-formed random access signals.

3. The apparatus of claim 2 wherein the instructions, when executed by the at least one processor, cause the apparatus at least to:
    in response to receiving one of the plurality of beam-formed random access signals, wait to receive all the plurality of beam-formed random access signals before selecting the one of the beam-formed random access signals comprising the at least one preamble associated to the same synchronization signal block beam D.

4. The apparatus of claim 1, wherein the preamble group is distinct from one or more legacy preamble groups that do not indicate that beam sweeping is used by a user equipment when transmitting a preamble from one of said legacy preamble groups.

5. The apparatus of claim 1, wherein the preamble group is selected from a plurality of preamble groups according to at least one of a parameter of a message to be received subsequently and a radio propagation parameter.

6. An system comprising:
    user equipment configured to:
        select at least one preamble group that indicates a use of beam sweeping, wherein a preamble of a first group transmitted from the user equipment indicates that the user equipment is attempting access with beam sweeping; and
        transmit a plurality of beam-formed random access signals comprising at least one preamble from the selected preamble group over a set of random access channel occasions, each beam-formed random access signal being transmitted using a different beam, wherein each of the plurality of beam-formed random access signals are uniquely identifiable by the random access channel occasion over which they are transmitted; and
    a base station configure to:
        receive a first one of the plurality of beam-formed random access signals comprising at least one preamble from the selected preamble group over a set of random access channel occasions;
        based on a preamble of the received first one of the plurality of beam-formed random access signals, determine that the user equipment is attempting access with beam sweeping;
        based on the determining, await reception of all of the plurality of beam-formed access signals before selecting one of the plurality of beam-formed random access signals;
        after receipt of all of the plurality of beam-formed random access signals, comparing a reference signal received power (RSRP) for each of the plurality of beamed formed random access signals;
        based on the comparing, select one of the beam-formed random access signals that has a highest RSRP, and transmit, to the user equipment, within a random access response message to the user equipment, at least an indicator of the selected beam-formed random access signal.

7. The system of claim 6,
    wherein the user equipment is further configured to transmit a message, including at least a radio resource configuration request, using the same beam as that used for the beam-formed random access signal indicated within the received random access response message.

8. The system of claim 7, wherein the preamble group is distinct from one or more legacy preamble groups and the preamble used is the same for all the plurality of beam-formed random access signals within an association period.

9. The system of claim 8, wherein the user equipment is further configured to select the preamble group among two or more preamble groups depending on at least one of a parameter of a subsequent message to be transmitted and a radio propagation parameter.

10. The system of claim 9, wherein a total number of preambles in all configured preamble groups does not exceed one or more configured maximum numbers of preambles.

11. The system of claim 10, wherein the plurality of beam-formed random access signals are transmitted within a set of at least as many random access channel occasions as are associated to a synchronization signal block beam ID.

12. The system of claim 11, wherein the user equipment is further configured to receive a random access radio network temporary identifier related to the random access channel occasion over which the indicated beam-formed random access signal has been transmitted.

13. A method comprising:
selecting, by user equipment, at least one preamble group that indicates a use of beam sweeping, wherein a preamble of a first group transmitted from the user equipment indicates that the user equipment is attempting access with beam sweeping; and
transmitting, by the user equipment to a base station, a plurality of beam-formed random access signals comprising at least one preamble from the selected preamble group over a set of random access channel occasions, each beam-formed random access signal being transmitted using a different beam, wherein each of the plurality of beam-formed random access signals are uniquely identifiable by the random access channel occasion over which they are transmitted;
receiving, by the base station from the user equipment, a first one of the plurality of beam-formed random access signals comprising at least one preamble from the selected preamble group over a set of random access channel occasions;
based on a preamble of the received first one of the plurality of beam-formed random access signals, determine, by the base station, that the user equipment is attempting access with beam sweeping;
based on the determining, await, by the base station, reception of all of the plurality of beam-formed access signals before selecting one of the plurality of beam-formed random access signals;
after receipt of all of the plurality of beam-formed random access signals, comparing, by the base station, a reference signal received power (RSRP) for each of the plurality of beamed formed random access signals;
based on the comparing, selecting, by the base station, one of the beam-formed random access signals that has a highest RSRP; and
transmitting, by the base station to the user equipment, within a random access response message to the user equipment, at least an indicator of the selected beam-formed random access signal.

14. The method of claim 13, wherein the preconfigured random access channel occasions are a subset of random access channel occasions used for transmissions without beam-sweeping.

15. The method of claim 13, wherein the preconfigured random access channel occasions used for transmissions with beam-sweeping are not used for transmissions without beam-sweeping.

16. The method of claim 13, wherein the preconfiguration of random access channel occasions used for transmissions with beam-sweeping and preconfiguration of random access channel occasions used for transmissions without beam-sweeping are different.

17. The method of claim 13, further comprising:
selecting a preamble group that indicates that initial access signaling using beam sweeping is performed;
wherein a preamble of a first group transmitted from the apparatus indicates that the user apparatus is attempting access with beam sweeping, and a preamble of a second group different from the first transmitted from the apparatus indicates that the user equipment is attempting access without beam sweeping; and
transmitting the plurality of beam-formed random access signals with at least one preamble from the selected preamble group.

18. The method of claim 13, further comprising:
receiving a bitmask, wherein the bitmask is used to indicate which random access channel occasions indicate that initial access signaling using beam-sweeping is performed.

19. The method of claim 13, wherein the beams used for transmission of the beam-formed random access signals are selected depending on a selection of a received sweeping synchronization signal block.

20. The method of claim 13, further comprising:
receiving a bitmask that indicates which random access channel occasions cannot be used for initial access signaling without beam-sweeping.

* * * * *